(12) United States Patent
Yamashita et al.

(10) Patent No.: US 7,773,158 B2
(45) Date of Patent: Aug. 10, 2010

(54) VISUAL PROCESSING DEVICE, DISPLAY DEVICE, AND INTEGRATED CIRCUIT

(75) Inventors: Haruo Yamashita, Osaka (JP); Takeshi Ito, Osaka (JP); Yusuke Monobe, Kyoto (JP); Tatsumi Watanabe, Osaka (JP); Yasuhiro Kuwahara, Osaka (JP)

(73) Assignee: Panasonic Corporation, Osaka (JP)

( * ) Notice: Subject to any disclaimer, the term of this patent is extended or adjusted under 35 U.S.C. 154(b) by 974 days.

(21) Appl. No.: 11/544,736

(22) Filed: Oct. 10, 2006

(65) Prior Publication Data

US 2007/0080975 A1    Apr. 12, 2007

(30) Foreign Application Priority Data

Oct. 12, 2005  (JP)  ............................. 2005-297462
Oct. 12, 2005  (JP)  ............................. 2005-297463
Apr. 20, 2006  (JP)  ............................. 2006-116424

(51) Int. Cl.
  *H04N 5/57*  (2006.01)
  *H04N 1/58*  (2006.01)
  *H04N 5/21*  (2006.01)

(52) U.S. Cl. ................ 348/678; 348/673; 348/679; 348/687; 348/675; 348/256; 382/274; 345/589; 358/447

(58) Field of Classification Search ............... 348/679, 348/678, 674, 675, 687, 627, 630, 650, 254, 348/255, 256, 673; 382/274, 275, 167; 358/518, 358/519, 520, 447; 345/591, 589
See application file for complete search history.

(56) References Cited

U.S. PATENT DOCUMENTS

| | | | |
|---|---|---|---|
| 5,555,031 A | | 9/1996 | Van Rooij |
| 5,619,280 A | * | 4/1997 | Yamashita et al. .......... 348/645 |
| 5,661,575 A | | 8/1997 | Yamashita et al. |
| 5,691,779 A | * | 11/1997 | Yamashita et al. .......... 348/645 |
| 6,101,271 A | | 8/2000 | Yamashita et al. |
| 6,961,066 B2 | * | 11/2005 | James ........................ 345/589 |
| 6,965,416 B2 | | 11/2005 | Tsuchiya et al. |
| 7,227,559 B2 | * | 6/2007 | Aoki et al. .................. 345/690 |
| 7,701,475 B2 | * | 4/2010 | Aoki et al. .................. 345/690 |
| 2007/0188623 A1 | | 8/2007 | Yamashita et al. |
| 2008/0107360 A1 | | 5/2008 | Yamashita et al. |

FOREIGN PATENT DOCUMENTS

| | | |
|---|---|---|
| JP | 62-143567 | 6/1987 |
| JP | 63-151287 | 6/1988 |
| JP | 63-177662 | 7/1988 |
| JP | 4-150171 | 5/1992 |
| JP | 4-152788 | 5/1992 |
| JP | 6-350875 | 12/1994 |
| JP | 6-351035 | 12/1994 |
| JP | 7-111604 | 4/1995 |
| JP | 7-177530 | 7/1995 |
| JP | 2000-165686 | 6/2000 |

(Continued)

*Primary Examiner*—David L Ometz
*Assistant Examiner*—Jean W Désir
(74) *Attorney, Agent, or Firm*—Wenderoth, Lind & Ponack, L.L.P.

(57) ABSTRACT

The invention achieves a visual processing device that can execute precise contrast adjustment on image signals that have been input and that does not cause discrepancies in the output timing of the image signals that are output. The visual processing device is provided with a gain-type visual processing portion that outputs a first gain signal having predetermined gain characteristics with respect to the input image signal, and a correction portion that corrects the input image signal based on the first gain signal.

17 Claims, 53 Drawing Sheets

FOREIGN PATENT DOCUMENTS

| | | |
|---|---|---|
| JP | 2001-275015 | 10/2001 |
| JP | 2002-83294 | 3/2002 |
| JP | 2002-185771 | 6/2002 |
| JP | 2002-247413 | 8/2002 |
| JP | 2004-248250 | 9/2004 |
| JP | 2004-343643 | 12/2004 |
| JP | 2005-33698 | 2/2005 |
| WO | 2005/027043 | 3/2005 |

\* cited by examiner

| M register value | input |
|---|---|
| 1 | L1 |
| 2 | L2 |
| 3 | L3 |
| 4 | L4 |
| 5 | L5 |
| 6 | L6 |
| 7 | L1, L3 |
| ----- | |
| 11 | L1, L3, L5 |
| ----- | |
| 15 | L1, L3, L5, L6 |

| type | limit value L |
|---|---|
| news | 3.0 |
| sports | 2.0 |
| tabloid show | 1.5 |
| movie | 1.1 |
| ----- | |
| drama | 1.4 |

| M register value | input |
|---|---|
| 1 | K1 |
| 2 | K2 |
| 3 | K3 |
| 4 | K4 |
| 5 | K5 |
| 6 | K6 |
| 7 | K1, K3 |
| ----- | |
| 11 | K1, K3, K5 |
| ----- | |
| 15 | K1, K3, K5, K6 |

| type | correction value K |
|---|---|
| news | 1.3 |
| sports | 1.2 |
| tabloid show | 1.0 |
| movie | 0.7 |
| ----- | |
| drama | 0.9 | they are as the data of the lookup table.

VISUAL PROCESSING DEVICE, DISPLAY DEVICE, AND INTEGRATED CIRCUIT

BACKGROUND OF THE INVENTION

1. Field of the Invention

The present invention relates to visual processing devices, display devices, and integrated circuits, and in particular relates to visual processing devices, display devices, and integrated circuits in which the contrast of an image is adjusted.

2. Description of the Related Art

Conventional color television receivers have performed contrast adjustment in order to adjust the image contrast.

With contrast adjustment, RGB signals are separated into a luminance signal and color signals without disrupting the color balance, and then the contrast of the luminance signal is adjusted.

Color appears light in areas where the luminance signal level has been increased and, conversely, appears dark in areas where the luminance signal level has been reduced, and leads to an output that is unnatural, and thus the level of the color signal also is increased or decreased in correspondence with the change in the luminance signal level.

The contrast adjustment circuit of a conventional display device is described using FIG. 52. FIG. 52 is a block diagram showing the configuration of the contrast adjustment circuit of a conventional display device. In FIG. 52, a Y matrix 100 converts the R, G, and B signals to a luminance signal Ya. Similarly, a R-Y matrix 101 converts the R, G, and B signals to a R-Y color signal, and a B-Y matrix 102 converts the R, G, and B signals to a B-Y color signal. A gamma correction signal 104 converts the linearity of the luminance signal Ya to a luminance signal Yb. The gamma correction circuit 104 is constituted by a lookup table (hereinafter referred to as "LUT") such as that shown in FIG. 53, to which table values having gamma correction characteristics are written. Here, the horizontal axis is the input Ya and the vertical axis is the output Yb.

A division circuit 105 divides the luminance signal Yb by the luminance signal Ya to obtain the conversion ratio Yb/Ya. A coefficient unit 106 performs a computation with the conversion ratio Yb/Ya and a coefficient K to obtain a conversion coefficient Kc for amplifying the color signal, where Kc=1+K(Yb/Ya−1). Here, an increase in the color signal can be inhibited by changing the coefficient K. Multipliers 107 and 108 multiply the output of the R-Y matrix 101 and the output of the B-Y matrix 102 by the conversion coefficient Kc, creating a color (R-Y) signal and a color (B-Y) signal that correspond to the adjustment made to the luminance contrast (for example, see Japan Patent Application Publication JP-A-04-152788).

However, contrast adjustment circuits having the above configuration have the problem that for the color signal, the process of obtaining a coefficient for multiplication by the multiplier and then multiplying the color signal by the coefficient that has been obtained is performed after the luminance signal has been divided by the division circuit (the process of dividing the luminance signal includes numerous computations and as such it takes time before the result of the division is output, thus causing a delay), and therefore a discrepancy occurs between the output timing of the luminance signal to be output and the output timing of the color signals to be output, and, additionally, a delay means or the like for synchronizing the timing of the output luminance signal and the output color signals is necessary.

The issue to be solved by the invention is to achieve a visual processing device that can execute precise contrast adjustment on an input image signal and that does not lead to discrepancies in the output timing of the image signal that is output. Another object is to achieve a display device that is provided with this visual processing device, and an integrated circuit that includes this visual processing device.

SUMMARY OF THE INVENTION

A first aspect of the invention is a visual processing device for correcting and then outputting an image signal that is input, and that is furnished with a visual processing portion and a correction portion. The visual processing portion outputs a first gain signal having predetermined gain characteristics for the image signal. The correction portion corrects the image signal based on the first gain signal.

With this visual processing device, a first gain signal having predetermined gain characteristics for the image signal is output, and the image signal that has been input to the visual processing device is corrected based on the first gain signal, and thus it is possible to achieve precise correction processing with a simple structure. That is, image signals are corrected using a gain signal rather than through direct correction of the grayscale, and this allows image signals to be corrected through simple processing and allows the scale of the circuit to be reduced if hardware is used, for example. Since the correction of image signals is achieved through correction by the gain signal, the output timing of the output image signals after correction can be synchronized with ease.

A second aspect of the invention is the first aspect of the invention, further including a gain limit portion that limits the first gain signal at a predetermined limit value that has been set and outputs a second gain signal. The correction portion corrects the image signal based on the second gain signal.

With this configuration, the gain is suppressed at vivid colors by a predetermined limit value, and this allows the gain signal to be limited at vivid colors even when the contrast of the image is adjusted and it is possible to prevent color saturation at deep red or deep blue, for example. Further, since the predetermined limit value can be arrived at using simple hardware, the limit value can be changed for each pixel.

A third aspect of the invention is the first aspect or the second aspect of the invention, further including a spatial processing portion that performs a predetermined spatial processing on the image signal and outputs a processed signal. The visual processing portion outputs a first gain signal that has gain characteristics based on the image signal and the processed signal.

Thus, by using a processed signal that has been subjected to spatial processing, it is possible to correct the image signal with gain characteristics that are different for the dark regions and the light regions of the image, and thus the contrast of both can be adjusted ideally without saturating bright regions in the background when the dark regions of an image are made brighter. It is also possible to adjust the contrast in such a manner that bright pixels surrounded by dark do not overflow and become saturated.

A fourth aspect of the invention is any one of the first through third aspects of the invention, in which the visual processing portion includes a two-dimensional lookup table whose inputs are the image signal and the processed signal.

Thus, it is possible to achieve different visual characteristics by rewriting the data of the lookup table. It is also possible to achieve complex, non-linear two-dimensional gain characteristics with ease. Moreover, by storing data based on the two-dimensional gain characteristics, the memory capacity can be made smaller than if gamma conversion values are taken as they are as the data of the lookup table.

A fifth aspect of the invention is any one of the first through fourth aspects of the invention, in which the image signal is a luminance signal and a color signal, and the correction portion includes a first multiplication portion that multiplies the luminance signal and the second gain signal and outputs a corrected luminance signal and a second multiplication portion that multiplies the color signal and the second gain signal and outputs a corrected color signal.

With this configuration, the gain signal that has been kept down by the predetermined limit value can be corrected further by multiplying it with the luminance signal and with the color difference signal, and thus the contrast of the image can be corrected while suppressing color saturation and retaining the color balance.

A sixth aspect of the invention is any one of the first through fourth aspects of the invention, in which the image signal is an RGB signal, and the correction portion multiplies the RGB signal and the second gain signal and outputs a corrected RGB signal.

Accordingly, a gain signal that has been kept down by the predetermined limit value can be corrected further by multiplying it with the RGB signal, and thus the contrast of the image can be corrected while suppressing color saturation and retaining the color balance.

A seventh aspect of the invention is any one of the first through sixth aspects of the invention, further including a maximum value detection portion that detects a maximum value when the image signal is converted to an RGB signal, and a first limit value calculation portion that calculates a predetermined limit value for suppressing color saturation based on the maximum value that has been detected.

With this configuration, it is also possible to detect the maximum value of the gain signal at which the corrected image signal becomes color saturated, and calculate a limit value that does not result in color saturation.

An eighth aspect of the invention is any one of the first through seventh aspects of the invention, further including a signal level detection portion that calculates a predetermined limit value according to a mean value of the signal level that has been detected from the image signals in a single frame or a single field.

With this configuration, it is also possible to set the limit value according to the main signal that is detected from the image signal, and thus the gain signal can be limited in bright images to suppress the signal level. Thus, it is possible to increase the heat resistance and curb power consumption in a display device, such as a plasma display panel. Additionally, since it is possible to keep the gain signal below the level at which the function of lowering the overall screen brightness when the mean signal level of the image to be displayed exceeds a predetermined level is activated, even in a plasma display panel with this function, it is possible to achieve contrast adjustment that is effective.

A ninth aspect of the invention is any one of the first through eighth aspects of the invention, further including a skin color detection portion that calculates a predetermined limit value according to a degree of likeness to skin color that is detected based on a weight function that has been set in advance for the image signal.

With this configuration, it is possible to set the limit value after detecting skin color, and thus the limit value can be lowered for bright skin color to suppress color saturation and also to prevent faces from appearing shiny. It is also possible that the gradation of faces in bright regions is not saturated.

A tenth aspect of the invention is any one of the first through ninth aspects of the invention, further including a data reception portion that receives data that have been transmitted or broadcast, a program information separating portion that separates program information from the data that have been received, and a broadcast content detection portion that calculates a predetermined limit value according to the broadcast contents that are detected from the program information.

With this configuration, it is possible to set an ideal limit value for each content type, and it is possible to set a limit value that matches the contrast adjustment value necessary for each content type.

An eleventh aspect of the invention is any one of the first through tenth aspects of the invention, further including a data reception portion that receives data that have been transmitted or broadcast, and an electric field strength detection portion that detects an electric field strength value when the data are received and calculates a predetermined limit value according to the electric field strength value.

With this configuration, it is possible to detect images whose electric field is weak and the S/N ratio of received data is poor and then limit the gain signal for the entire image, and the enhancement of noise in images with a poor S/N ratio can be inhibited.

A twelfth aspect of the invention is a display device that includes a data reception portion that receives image data that have been transmitted or broadcast, a decoding portion that decodes the image data that are received into video data, the visual processing device according to any one of the first through eleventh aspects of the invention for visually processing the decoded video data and outputting an output signal, and a display portion for performing a display of the output signal that has been visually processed by the visual processing device.

With this configuration, it is possible to achieve a display device with which visual processing of the image through brightness adjustment in which color saturation is suppressed is possible. By limiting the gain signal, the signal level in bright images is suppressed and it is possible to increase the heat resistance and curb power consumption in the display portion, which for example is a plasma display panel. The same effects are attained in liquid crystal panels, in which the backlight is adjusted according to the brightness of the display screen.

A 13th aspect of the invention is a display device including a data input portion that inputs image data, the visual processing device according to any one of the first through eleventh aspects of the invention for visually processing the input image data and outputting an output signal, and a display portion for performing a display of the output signal that has been visually processed by the visual processing device.

With this configuration, it is possible to achieve the same effects with a display device as with the visual processing device. It should be noted that, aside from a display device, it is also possible to achieve an image-capturing device or a portable information terminal device that is provided with a visual processing device. The image-capturing device can have a structure that includes an image-capturing portion for capturing images, and a visual processing device that receives the images captured by the image-capturing portion as input images and performs visual processing.

With this configuration, it is possible to obtain the same effects with an image-capturing device as with a visual processing device.

It is possible for a portable information device to have a structure that includes a data reception portion that receives image data that have been transmitted or broadcast, a visual processing device that visually processes the image data that have been received and outputs an output signal, and a display portion for performing a display of the visually processed output signal.

With this configuration, it is possible to obtain the same effects with a portable information device as with a visual processing device.

It is also possible for a portable information device of the invention to have a configuration including an image-capturing portion for capturing images, a visual processing device that receives the images captured by the image-capturing portion as input images, performs visual processing, and outputs an output signal, and a data transmission portion for transmitting the visually processed output signal.

With this configuration, it is possible to obtain the same effects with a portable information device as with a visual processing device.

A 14th aspect of the invention is any one of the first through eleventh aspects of the invention, further including a spatial processing portion that performs a predetermined spatial processing on the image signal and outputs a processed signal. The visual processing portion outputs a gain signal that has predetermined gain characteristics based on the image signal and the processed signal. The correction portion corrects the grayscale of the image signal based on the gain signal.

With this configuration, using a processed signal, which is the shade information of local regions, it is possible to correct the image signal with gain characteristics that are different for the dark regions and the bright regions in the image, and thus ideal contrast adjustment for both regions is possible without saturating the bright regions in the background if dark regions in the image are made brighter, and color saturation is suppressed. The gain characteristics change more smoothly with respect to the image signal than do the grayscale conversion characteristics, and thus sufficient processing precision can be ensured even if the image signal and the processed signal are decimated roughly, and the bit precision of the signal can be lowered. Thus, the scale of the circuitry of the hardware of the visual processing portion can be reduced, and in a configuration where a lookup table is provided, the memory capacity can be reduced.

A 15th aspect of the invention is any one of the first through eleventh aspects, and the 14th aspect, of the invention, in which the visual processing portion outputs a gain signal in which the band of the spatial frequency that can respond to the image signal is limited.

With this configuration, a drop in the contrast of the corrected output can be inhibited even if the value of the luminance signal that is input is changed by a value that is significantly larger than the value of the processed signal. Thus, for example it is possible to correct and output an image signal having a tiny high-frequency component on a signal whose luminance signal level is high (such as an image signal corresponding to a detail portion with a high luminance) without lowering the contrast.

A 16th aspect of the invention is any one of the first through eleventh, 14th, and 15th aspects of the invention, in which the correction portion has a contrast enhancement portion that outputs an enhanced signal that is obtained by enhancing the contrast of the image signal, and the correction portion corrects the grayscale of the enhanced signal.

Thus, it is possible to further enhance to contrast of the image signal.

A 17th aspect of the invention is any one of the first through eleventh, and 14th through 16th aspects of the invention, in which the contrast enhancement portion outputs the enhanced signal based on the image signal and a band limited signal that is obtained by limiting the spatial frequency band of the image signal.

Thus, it is possible to enhance the contrast of the image signal based on the target pixels and the brightness around them.

An 18th aspect of the invention is any one of the first through eleventh, and 14th through 17th aspects of the invention, in which the contrast enhancement portion is provided with a two-dimensional lookup table whose inputs are the band limited signal and the image signal.

Thus, by setting the results of a plurality of different computations it is possible to perform various types of contrast enhancement.

A 19th aspect of the invention is any one of the first through eleventh, and 14th through 17th aspects of the invention, in which the contrast enhancement portion outputs an enhanced signal based on the ratio of the band limited signal to the image signal.

Thus, the contrast enhancement portion can enhance the contrast according to the ratio of the band limited signal to the image signal.

A 20th aspect of the invention is any one of the first through eleventh, and 14th through 17th aspects of the invention, in which the contrast enhancement portion outputs the enhanced signal based on the difference between the band limited image signal and the image signal.

Thus, the contrast enhancement portion can enhance the contrast according to the difference between the band limited signal and the image signal.

A 21st aspect of the invention is any one of the first through eleventh, and 14th through 20th aspects of the invention, in which the visual processing portion outputs a gain signal whose spatial frequency band that can respond to the image signal has been limited, and the correction portion has a contrast enhancement portion that outputs an enhanced signal that is obtained by enhancing the contrast of the image signal. The correction portion corrects the grayscale of the enhanced signal.

With this configuration, a drop in the contrast of the corrected output can be inhibited even if the value of the luminance signal that has been input is changed by a value that is significantly larger than the value of the processed signal. Thus, for example it is possible to correct and output an image signal having a tiny high-frequency component on a signal whose luminance signal level is high (such as an image signal corresponding to a detail portion with a high luminance) without lowering the contrast. It is also possible to enhance the contrast of the image signal.

A 22nd aspect of the invention is the first aspect of the invention, further including a gain control portion that corrects the first gain signal with a predetermined correction value that has been set and outputs a second gain signal. The correction portion corrects the image signal based on the second gain signal.

With this configuration, it is possible to enhance or suppress the contrast with a correction value for each region of an image. Thus, it is possible to enhance dark regions, and particularly the region of people's faces, in an image of a backlit scene to an appropriate brightness, and it is possible to suppress the brightness at the high vivid colors of the background region. Consequently, it is possible to perform optimal brightness adjustment while for example suppressing grayscale and color saturation at deep reds and deep blues. Also, since this configuration can be achieved through simple hardware, the correction value can be changed for each pixel.

A 23rd aspect of the invention is the 22nd aspect of the invention, in which the gain control portion magnifies or reduces the difference between the ×1 signal and the first gain signal with a predetermined correction value.

With this configuration, it is possible to increase or decrease the first gain signal with a predetermined correction value, allowing the contrast to be enhanced or suppressed.

A 24th aspect of the invention is the 22nd aspect of the invention, in which the gain control portion interpolates or extrapolates the ×1 signal and the first gain signal with the predetermined correction value.

With this configuration, it is possible to increase or decrease the first gain signal around the ×1 signal, allowing the contrast to be enhanced or suppressed.

A 25th aspect of the invention is any one of the 22nd to 24th aspects of the invention, further including a spatial processing portion that performs a predetermined spatial processing on the image signal and outputs a processed signal. The visual processing portion outputs a first gain signal having predetermined gain characteristics based on the image signal and the processed signal.

With this configuration, by using a processed signal, it is possible to correct the image signal with gain characteristics that are different for the dark regions and the light regions in the image, and thus the contrast of both can be adjusted ideally without saturating the signal of bright regions of the background if dark areas in the image are made brighter. Thus, dark regions, and particularly the facial region of people, in backlit images can be enhanced to an appropriate brightness, and it is possible to keep the signal of the bright background region from becoming saturated.

A 26th aspect of the invention is the 25th aspect of the invention, in which the visual processing portion has a two-dimensional lookup table.

With this configuration, by storing data based on the two-dimensional gain characteristics, the memory capacity can be made smaller than if gamma conversion values are stored as they are as table data. It is also possible to achieve different visual characteristics by rewriting the table data. It is also possible to achieve complex, non-linear two-dimensional gain characteristics with ease.

A 27th aspect of the invention is any one of the 22nd to 26th aspects of the invention, in which the image signal is a luminance signal and a color signal, and the correction portion includes a first multiplication portion that multiplies the luminance signal and the second gain signal and outputs a corrected luminance signal, and a second multiplication portion that multiplies the color signal and the second gain signal and outputs a corrected color signal.

With this configuration, correction is performed by multiplying a gain signal that has been enhanced or suppressed by a predetermined correction value with both the luminance signal and the color signal, and thus it is possible to enhance or suppress the contrast of the image while retaining the color balance and inhibiting color saturation.

A 28th aspect of the invention is any one of the 22nd to 26th aspects of the invention, in which the image signal is an RGB signal, and the correction portion multiplies the RGB signals and the second gain signal and outputs a corrected image signal.

With this configuration, correction is performed by multiplying a gain signal enhanced or suppressed by a predetermined correction value with the RGB signals, and thus it is possible to enhance or suppress the contrast of the image while retaining the color balance and inhibiting color saturation.

A 29th aspect of the invention is any one of the 22nd to 28th aspects of the invention, further including a maximum value detection portion that detects a maximum value when the image signal is converted to an RGB signal, and a correction value calculation portion that calculates the predetermined correction value for suppressing color saturation based on the maximum value that has been detected.

With this configuration, it is possible to detect the maximum value of the gain signal at which the corrected image signal becomes color saturated, and a correction value that does not result in color saturation can be corrected.

A 30th aspect of the invention is any one of the 22nd to 29th aspects of the invention, further including a signal level detection portion that calculates the predetermined correction value according to a mean value of the signal level that has been detected from the image signals in a single frame or a single field.

With this configuration, it is possible to set the correction value according to the mean value of the signal levels detected from the image signals, and thus the gain signal can be corrected in bright images to suppress the signal level. Thus, for example in display devices such as a plasma display panel, the heat resistance can be increased and power consumption can be curbed.

Additionally, since it is possible to keep the gain signal below the level at which the function of lowering the overall brightness of the screen when the mean signal level of the image to be displayed exceeds a predetermined level is activated, even in a plasma display panel with this function, it is possible to achieve contrast adjustment that is effective.

A 31st aspect of the invention is any one of the 22nd to 30th aspects of the invention, further including a skin color detection portion that calculates the predetermined correction value according to a degree of likeness to skin color that is detected based on a weight function that has been set in advance for the image signal.

With this configuration, skin color can be detected in a backlit scene and the correction value can be set, and thus it is possible to raise the correction value for dark skin to brighten the image, allowing facial regions to have an effect of illumination by auxiliary light with reflector board. It is also possible to prevent patchiness in facial skin color.

A 32nd aspect of the invention is any one of the 22nd to 31st aspects of the invention, further including a data reception portion that receives data that have been transmitted or broadcast, a program information separating portion that separates program information from the data that have been received, and a broadcast content detection portion that calculates the predetermined correction value according to the broadcast contents that are detected from the program information.

With this configuration, it is possible to set a correction value for each content type, and it is possible to set a correction value that fits with the ideal contrast for each content type.

A 33rd aspect of the invention is any one of the 22nd to 32nd aspects of the invention, further including a data reception portion that receives data that have been transmitted or broadcast, and an electric field strength detection portion that detects an electric field strength value when the data are received and calculates the predetermined correction value according to the electric field strength value.

With this configuration, it is possible to detect images whose electric field is weak and the S/N ratio of the received data is poor and then control the gain signal for the entire image, and the enhancement of noise can be inhibited.

A 34th aspect of the invention is a display device that includes a data reception portion that receives image data that have been transmitted or broadcast, a decoding portion that decodes the image data that are received into video data, the visual processing device according to any one of the 22nd to the 33rd aspects of the invention for visually processing the decoded video data and outputting an output signal, and a display portion for performing a display of the output signal that has been visually processed by the visual processing device.

With this configuration, it is possible to achieve a display device with which the brightness of the image can be adjusted through visual processing in which grayscale and color saturation is suppressed. By controlling the gain signal, it is possible to suppress the signal level in bright images and increase the heat resistance and curb power consumption in the display portion, which for example is a plasma display panel. The same effects are attained in liquid crystal panels, for example, in which the backlight is adjusted according to the brightness of the display screen.

A 35th aspect of the invention is a display device that includes a data input portion that inputs image data, the visual processing device according to any one of the 22nd to the 33rd aspects of the invention for visually processing the input image data and outputting an output signal, and a display portion for performing a display of the output signal that has been visually processed by the visual processing device.

With this configuration, it is possible to achieve the same effects with a display device as with the visual processing device. It should be noted that, aside from a display device, it is also possible to achieve an image-capturing device or a portable information terminal device that is provided with a visual processing device.

The image-capturing device can have a structure that includes an image-capturing portion for capturing images, and a visual processing device that receives the images captured by the image-capturing portion as input images and performs visual processing.

With this configuration, it is possible to obtain the same effects with an image-capturing device as with a visual processing device.

It is possible for the portable information device to have a structure that includes a data reception portion that receives image data that have been transmitted or broadcast, a visual processing device that visually processes the image data that have been received and outputs an output signal, and display means for performing a display of the visually processed output signal.

With this configuration, it is possible to obtain the same effects with a portable information device as with a visual processing device.

It is also possible for a portable information device of the invention to have a structure that includes an image-capturing portion for capturing images, a visual processing device that receives the images captured by the image-capturing portion as input images, performs visual processing, and outputs an output signal, and a data transmission portion for transmitting the visually processed output signal.

With this configuration, it is possible to obtain the same effects with a portable information device as with the visual processing device.

A 36th aspect of the invention is an integrated circuit that includes the visual processing device according to any one of the first through eleventh aspects, and the 14th through 33rd aspects, of the invention.

With this configuration, it is possible to obtain the same effects with an integrated circuit as with the visual processing device.

According to the invention, it is possible to achieve a visual processing device that can execute precise contrast adjustment on image signals that are input and that does not lead to discrepancies in the output timing of the image signals that are output. It is also possible to achieve a display device that is provided with this visual processing device, and an integrated circuit that includes this visual processing device.

BRIEF DESCRIPTION OF THE DRAWINGS

FIG. 7 is an explanatory diagram describing the operation of the limit value determination portion of the same.

FIG. 17 is an explanatory diagram describing the broadcast content detection portion of the same.

FIG. 37 is an explanatory diagram of the operation of the correction value determination portion of the fifth embodiment.

FIG. 46 is an explanatory diagram of the broadcast content detection portion of the sixth embodiment.

DETAILED DESCRIPTION OF THE PREFERRED EMBODIMENTS

Below, visual processing devices according to embodiments of the invention are described with reference to the drawings.

First Embodiment

First, the visual processing device according to a first embodiment is described. The visual processing performed here is processing for giving characteristics that are close to human vision, and is for determining the value of an output signal according to the contrast between the value of a target pixel of an image signal that has been input and the values of pixels around that target pixel.

Examples of processing that may be adopted include backlight correction, knee processing, D range compression, color processing, and brightness adjustment (including gradation processing and contrast adjustment). It should be noted that in this invention, the luminance signal is defined as the Y component (the luminance component and the brightness component) in a YCbCr color space, a YUV color space, a Lab color space, a Luv color space, a YIQ color space, and a YPbPr color space.

Similarly, the color signal is defined as the CbCr component in a YCbCr color space, the UV component in a YUV color space, the ab component in a Lab color space, the uv component in a Luv color space, and the IQ component in a YIQ color space.

Figure 1:
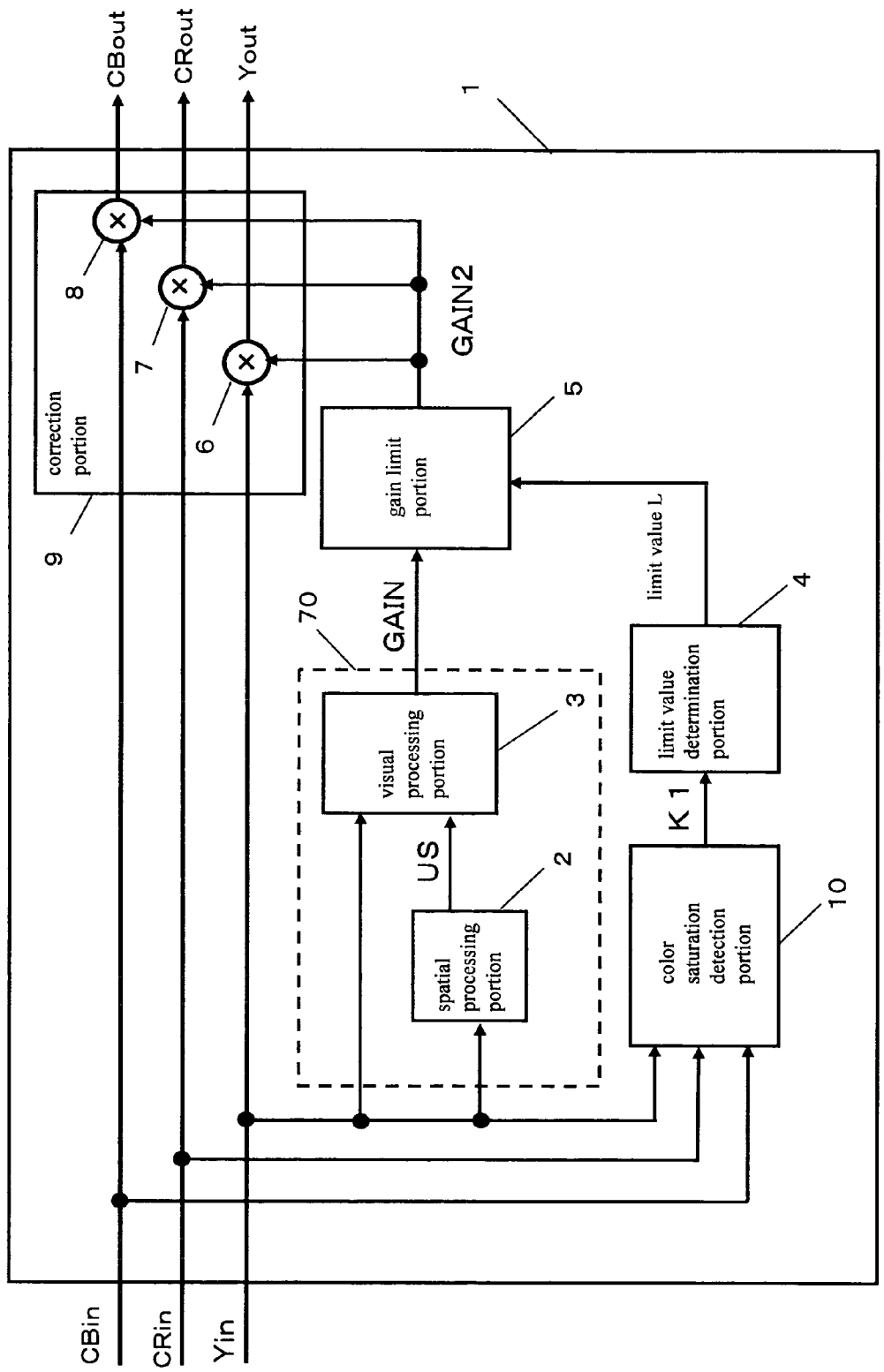
FIG. 1 is a block diagram showing the configuration of the visual processing device according to the first embodiment of the invention.

FIG. 1 is a block diagram of a visual processing device 1 according to the first embodiment of the invention.

In FIG. 1, the visual processing device 1 is provided with a gain-type visual processing portion 70 for outputting a first gain signal having specific gain characteristics for the image signal, a gain limit portion 5 for limiting the first gain signal at a predetermined limit value that has been set and outputting a second gain signal, and a correction portion 9 for correcting the image signal based on the second gain signal.

The visual processing device 1 is also furnished with a limit value determination portion 4 for calculating the limit value L for limiting the first gain signal GAIN, and a color saturation detection portion 10 for detecting color saturation.

The gain-type visual processing portion 70 is provided with a visual processing portion 3 and a spatial processing portion 2.

Thus, the visual processing device 1 performs visual processing on the image signals Yin, CRin, and CBin, and outputs visually processed images Yout, CRout, and CBout.

The spatial processing portion 2 obtains the values of target pixels to be targeted for spatial processing, and the values of pixels in the region around the target pixels (hereinafter, referred to as "surrounding pixels"), from the luminance signal Yin. The spatial processing portion 2 performs spatial processing on the luminance signal Yin for each pixel of the original image that was obtained and outputs an unsharp signal US. The unsharp signal US is a blur signal that is obtained through bandwidth limit of the luminance signal with a low-pass spatial filter, for example.

The visual processing portion 3 obtains the first gain signal GAIN from the luminance signal Yin and the unsharp signal US through a two-dimensional gain function, and outputs the first gain signal GAIN.

Figure 2:
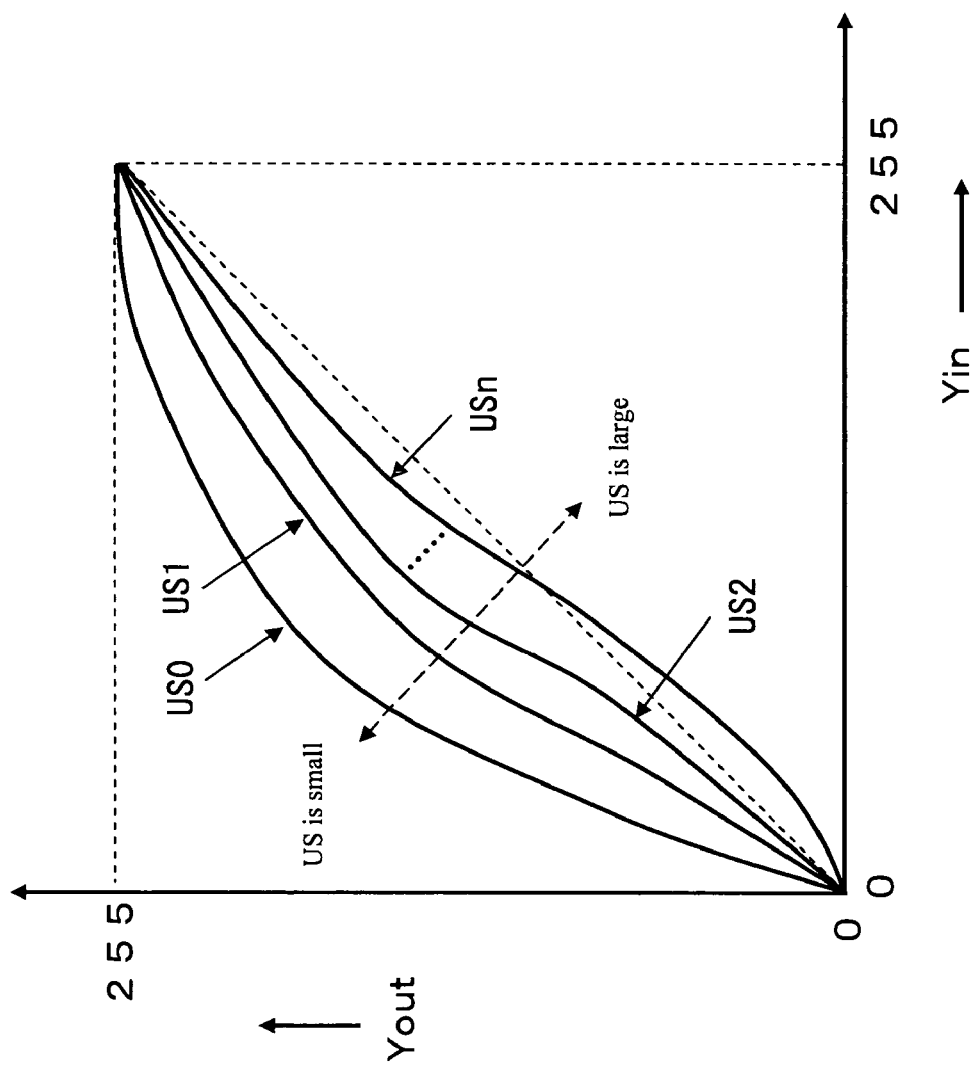
FIG. 2 is an explanatory diagram describing the two-dimensional grayscale characteristics of the same.

The two-dimensional gain function is set to a function in which the slope of the grayscale conversion curve is the gain so that input/output values equivalent to the grayscale conversion characteristics shown in FIG. 2, for example, are produced. Thus, by multiplying the value of the luminance signal Yin and the value of the output calculated by the two-dimensional gain function, it is possible to obtain input/output values equivalent to the grayscale conversion characteristics shown in FIG. 2.

The limit value determination portion 4 calculates the limit value L for limiting the first gain signal GAIN. The image signal is corrected by the limit value L to limit the contrast. For example, in bright images, the brightness of the image can be suppressed to inhibit grayscale saturation and color saturation.

The gain limit portion 5 limits the first gain signal GAIN by the limit value L and outputs a second gain signal GAIN2. By limiting the first gain signal GAIN, color saturation can be kept from occurring when the brightness is adjusted.

The correction portion 9 is provided with a multiplication portion 6, a multiplication portion 7, and a multiplication portion 8, and corrects the image signal according to the second gain signal GAIN2.

The multiplication portion 6 multiplies the second gain signal GAIN2 and the luminance signal Yin, and outputs a corrected luminance signal Yout. This corrected luminance signal Yout is an output that is equivalent to the grayscale conversion characteristics shown in FIG. 2. The multiplication portion 7 and the multiplication portion 8 multiply the second gain signal GAIN2 and the input color signals CRin and CBin, and output corrected color signals CRout and CBout.

Next, the visual processing device 1 of the first embodiment is described in further detail.

In this embodiment of the invention, the visual processing device 1 is set so as to have the two-dimensional grayscale conversion characteristics shown in FIG. 2. Here, the horizontal axis of FIG. 2 is the luminance signal Yin that is input, and the vertical axis is the converted luminance signal Yout.

The two-dimensional grayscale conversion characteristics are the input/output characteristics of the grayscale conversion for determining the value of an output with respect to an input, where the input is the value of the unsharp signal US and the value of the luminance signal Yin. For example, it has predetermined grayscale conversion characteristics according to the signal level of the unsharp signals US0, US1, US2 . . . USn in FIG. 2. Thus, when the pixel value of the luminance signal Yin is an 8-bit value, the pixel value of the output signal Yout for the value of the luminance signal Yin separated into 256 levels is determined based on the predetermined two-dimensional grayscale conversion characteristics. The grayscale conversion characteristics are expressed by a grayscale conversion curve that has predetermined gamma properties, and the relationship is such that the output monotonically decreases along with the subscript of the unsharp signal. It should be noted that the output of the grayscale conversion curve may have the substantial monotonic decrease characteristics with the subscript of the unsharp signal even if the output does not decrease in some part with the subscript of the unsharp signal. As shown in FIG. 2, in the two-dimensional grayscale conversion characteristics, the relationship where (the output value when US=US0) $\geq$ (the output value when US=US1) $\geq$ . . . $\geq$ (the output value when US=USn) holds for all brightness values of the luminance signal Yin. In this way, visual processing that is close to the characteristics of human vision can be achieved through gradation processing that determines the output signal based on the contrast between the target pixel values and the surrounding pixel values of the image signal that has been input.

Figure 3:
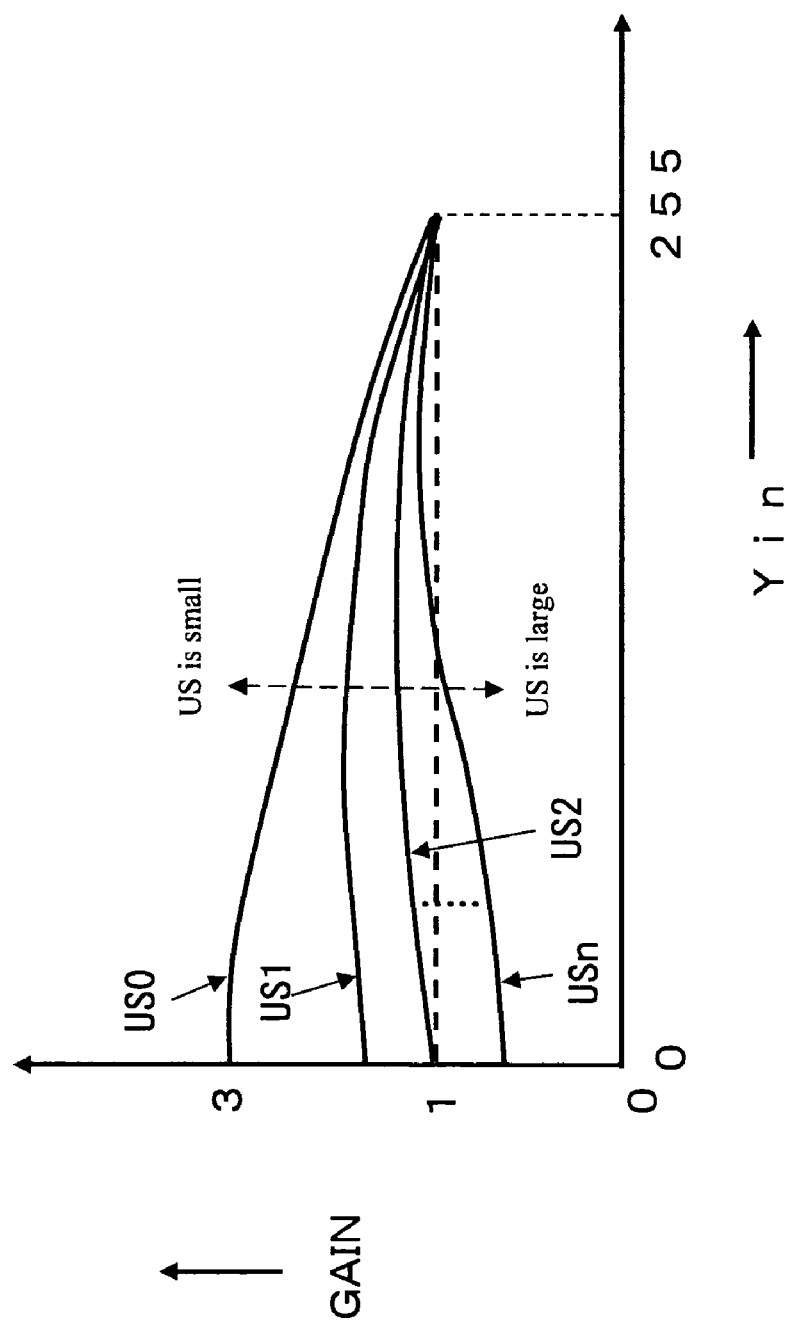
FIG. 3 is an explanatory diagram describing the two-dimensional gain characteristics of the same.

The visual processing portion 3 is described next. FIG. 3 shows the output of the first gain signal GAIN of the visual processing portion, and has two-dimensional gain characteristics in which the gain is the slope of the grayscale conversion curve of FIG. 2. Here, the horizontal axis of FIG. 3 is the input luminance signal Yin and the vertical axis is the output of the first gain signal GAIN. Here, the relationship is such that the output monotonically decreases along with the subscript of the unsharp signal. In the Yin-Gain input/output characteristics shown in FIG. 3, the relationship where (the value of the output GAIN when US=US0) $\geq$ (the value of the output GAIN when US=US1) $\geq$ . . . $\geq$ (the value of the output GAIN when US=USn) holds for all brightness values of the luminance signal Yin.

The visual processing device 1 of the first embodiment of the invention processes image signals using a gain signal, and using a gain signal has the advantage that it is possible to reduce the circuit scale. This is because the Yin-Gain input/output curve (for example, the Yin-Gain input/output curve shown in FIG. 3) changes more smoothly with respect to the luminance value Yin than does the grayscale conversion curve (for example, the Yin-Yout input/output curve shown in FIG. 2), and thus sufficient processing precision can be ensured even if the luminance signal Yin and the unsharp signal US are decimated roughly, and the bit precision of the luminance signal Yin that is input to the visual processing portion 3 can be lowered. In particular, if Yin is a small value (corresponding to a dark portion), then the curve for determining the input/output characteristics has a steep slope. For example, in the Yin-Yout input/output curve shown in FIG. 2, the steep curve portion in the lower left part of FIG. 2 corresponds to this. To achieve grayscale conversion with input/output characteristics based on such a steep curve, high resolution is necessary in the grayscale conversion. When executing such grayscale conversion, it is necessary to achieve a high resolution in the steep curve portion of the Yin-Yout input/output curve, and thus it becomes necessary for the input and the output to be given many bit numbers. On the other hand, with the Yin-Gain input/output curve (for example, the Yin-Gain input/output curve shown in FIG. 3), there are no steep portions in the input/output characteristics even if the Yin value is small, and thus high resolution is not necessary for grayscale conversion. Consequently, in Yin-Gain input/output characteristic conversion such as that shown in FIG. 3, it is not necessary to assign many bit numbers to the input and the output. Thus, the scale of the circuit can be reduced in the hardware and logic design.

It should be noted that the visual processing portion 3 is constituted by a two-dimensional lookup table (hereinafter, referred to as "2D LUT") that gives the relationship between the first gain signal GAIN and the luminance signal Yin and the unsharp signal US, and it is possible to output the first gain signal GAIN with respect to a luminance signal and an unsharp signal US by referencing the 2D LUT. Thus, by storing gain values rather than grayscale conversion values in the 2D LUT, it is possible to reduce the number of bits of the two input signals, and this allows the memory capacity to be significantly reduced.

Having a 2D LUT serve as the visual processing portion 3 allows complex gain characteristics to be created in advance, and allows the visual processing portion 3 to be provided as a read-only memory (hereinafter, "ROM"). To make it possible to update the gain characteristics, it is also possible to use a rewritable memory such as a random access memory (hereinafter, "RAM") for the visual processing portion 3. The 2D LUT stores gain data having two-dimensional gain characteristics that have been set in advance.

Further, it is possible to obtain various visual effects by changing the two-dimensional gain characteristics.

It is also possible to register the two-dimensional gain data as profile data from the outside. By rewriting the two-dimensional gain data, in devices that handle images, such as a computer, television, digital camera, portable telephone, PDA, printer, or scanner, it is possible to achieve visual effects, such as gradation processing of the image signal, compression of the dynamic range (hereinafter, referred to as the "D range"), knee processing, and color processing with the same visual processing circuit and visual processing program, and thus the visual processing device 1 can be achieved by a generalized integrated circuit or a generalized visual processing program. Rewriting and registering two-dimensional gain data from the outside will be explained in detail later.

Next, the spatial processing portion 2 obtains the pixel values of the target pixels to be targeted for spatial processing and the pixel values of the pixels surrounding the target pixels from the luminance signal Yin. The spatial processing portion 2 then executes spatial processing on the luminance value Yin for each pixel in the original image that was obtained and outputs an unsharp signal US.

The spatial processing portion 2 obtains the unsharp signal US by performing a low-pass spatial filter computation on the target pixels of the luminance signal Yin that passes only the low-region space. In this filter computation, the pixel values of the target pixels and the surrounding pixels are calculated by Formula I, for example.

$$US = (\Sigma[Wij] \times [Aij]) / (\Sigma[Wij]) \qquad \text{Formula I}$$

Here, [Wij] is the weight coefficient of the pixel of the target pixels and surrounding pixels that is located in the i-th row j-th column, and [Aij] is the pixel value of the pixel of the target pixels and surrounding pixels that is located in the i-th row j-th column. The symbol $\Sigma$ means to take the sum of the pixels of the target pixels and the surrounding pixels.

More specifically, a case in which the weight coefficient [Wij] is 1 and the pixel value [Aij] is expressed as A(i, j) is described. As for the pixel values of the target pixels, A(1, 1) is 128, A(0, 0) is 110, A(0, 1) is 115, A(0, 2) is 117, A(1, 0) is 123, A(1, 2) is 120, A(2, 0) is 120, A(2, 1) is 127, and A(2, 2) is 125. At this time, to obtain an unsharp signal from this region of 3 pixels×3 pixels, the unsharp signal is obtained through Formula I by performing the calculation US=(128+110+115+117+123+120+120+127+125)/9.

It should be noted that it is possible to assign a weight coefficient with a smaller value the larger the absolute value of the difference between the pixel values, and it is also possible to assign a smaller weight coefficient the greater the distance from the target pixels.

The region of the surrounding pixels is a size that is set in advance depending on the effect. The surrounding pixel region is extracted from a relatively large region in order to obtain the visual effect, and for example, when the size of the image is XGA (1024×768), the surrounding pixel region is at least 80 pixels×80 pixels.

As the low-pass spatial filter it is possible to use a FIR (Finite Impulse Responses)-type low-pass spatial filter or an IIR (Infinite Impulse Responses)-type low-pass spatial filter, which are commonly used to create unsharp signals US.

Figure 4:
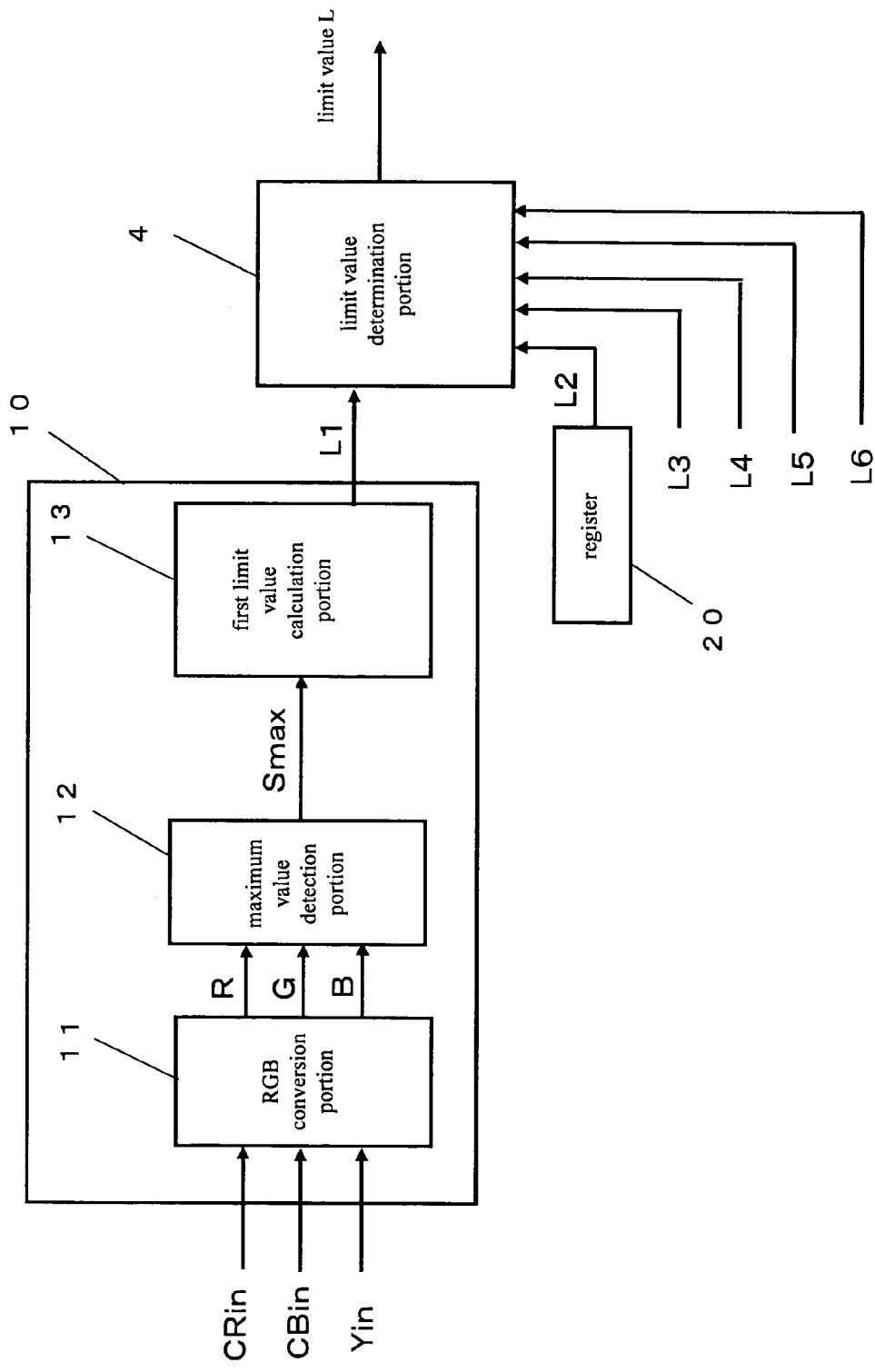
FIG. 4 is a block diagram showing the configuration of the color saturation detection portion of the same.

The color saturation detection portion 10 is described next using FIG. 4 and FIG. 5. FIG. 4 is a block diagram of the color saturation detection portion 10.

In FIG. 4, an RGB conversion portion 11 creates an RGB signal from the luminance signal Yin and the color signals CBin and CRin. A maximum value detection portion 12 detects the highest value among the red signal (hereinafter, "R signal"), the green signal (hereinafter, "G signal"), and the blue signal (hereinafter, "B signal"). A first limit value calculation portion 13 calculates a limit value L1 from the maximum value of the RGB signals that have been detected. A limit value determination portion 4 determines the limit value L in reference to the limit value L1, a limit value L2 that has been set in a register 20, and limit values L3 to L6 that are input from the outside, and outputs the limit value L. The limit value determination portion 4 is described in detail later.

Figure 5:
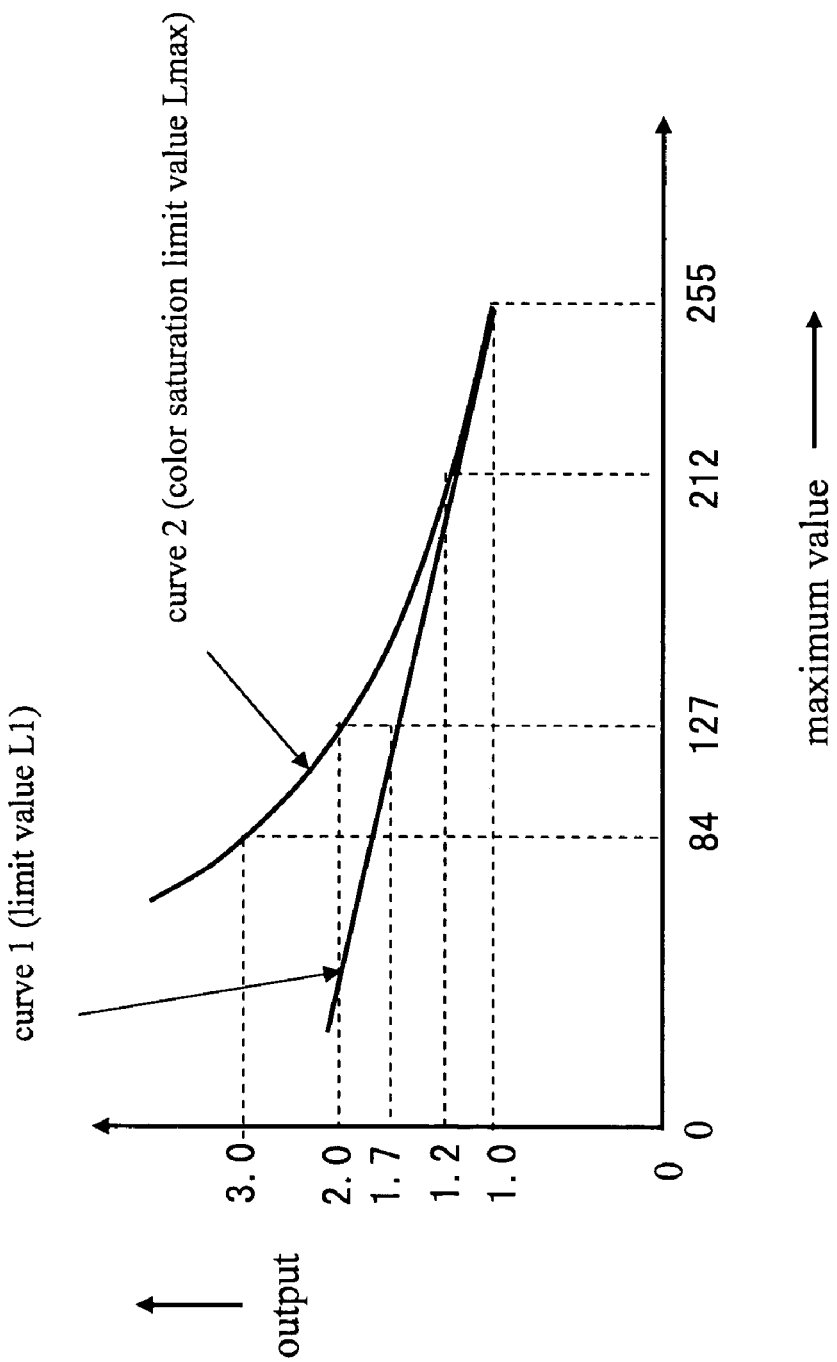
FIG. 5 is an explanatory diagram describing the first limit value calculation portion of the same.

Specifically, the first limit value calculation portion 13 calculates a limit value L1 for each pixel of the image signal that has been input based on a curve 1 that has been set so that the maximum value of the gain signal GAIN2 after control is equal to or lower than the value of the curve 2 shown in FIG. 5. Here, curve 2 indicates the maximum value of the limit value that does not cause color saturation.

As long as the ratio of the R signal, the G signal, and the B signal of the RGB signal can be kept constant, the color will not change even if the RGB signals are multiplied by the first gain signal GAIN. However, when the maximum value of any one of the signals become saturated it is not possible to increase the signal level further, and thus the balance of the ratio of the RGB signals is disrupted and an unnatural color change occurs as a result. To prevent such color saturation, the maximum value of the signal level should not be exceeded, even when the maximum value of the RGB signals is multiplied by the first gain signal GAIN. For example, the limit value is 2.0 when the maximum value of the RGB signals that have been detected is 127. Similarly, the limit value is 3.0 when the maximum value is 84, and the limit value is 1.2 when the maximum value is 212. Here, the RGB signals are signals within the range of 0 to 255. Thus, taking Smax as the maximum value of the RGB signals, and Lmax as the maximum value of the limit value L after control for suppressing grayscale saturation and color saturation, the following relationship exists.

$$Lmax = 255/Smax$$

In this way, grayscale saturation and color saturation can be inhibited and the color balance can be maintained by setting a limit value L1 (curve 1) that satisfies the condition of gain signal GAIN2<Lmax (curve 2). In addition, unnatural color changes do not occur in the image when its contrast is enhanced.

It should be noted that the curve 1 of the limit value L1 can be a straight line approximation, or a straight line that is a broken line approximation, of curve 2. When the maximum value of the RGB signal is a small value, preferably it is kept to a value at which the noise is not enhanced.

In this way, the Yin signal, the CBin signal, and the CRin signal are converted to RGB signals, and from the RGB signals it is possible to determine whether or not grayscale saturation and color saturation, for example, will ultimately occur in the image when displayed by a display device or the like. That is, since the signals that are ultimately displayed on a display device or the like are RGB signals, by obtaining RGB signals in advance and determining whether or not grayscale saturation and color saturation, for example, will occur in the RGB signals, it is possible to reliably know in advance the state of the image that will ultimately be displayed on the display device or the like. Thus, the procedure of obtaining RGB signals in advance from the Yin signal, the CBin signal, and the CRin signal, and determining the limit value L for limiting the GAIN value based on the RGB signals that have been obtained, is effective.

The operation of the limit value determination portion 4 is described next using FIG. 6 and FIG. 7. It is possible for the limit value determination portion 4 to input the limit values L1 to L6 and perform computations to determine a limit value L that corresponds to the image type of the image signal, the characteristics of the image, and the self-diagnosis by the integrated circuit.

Figure 6:
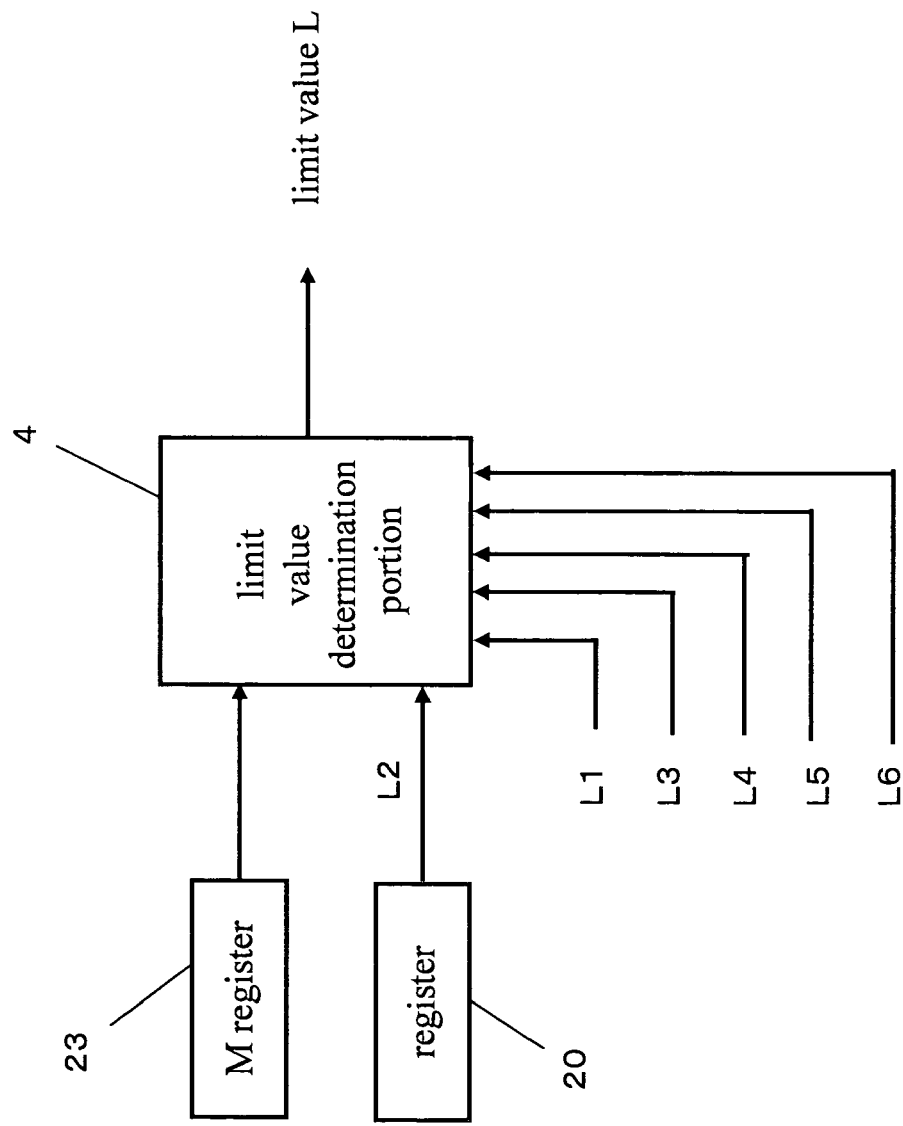
FIG. 6 is an explanatory diagram describing the limit value determination portion of the visual processing device of the same.

In FIG. 6, an M register 23 chooses the operation mode of the limit value determination portion 4. For example, when the value 2 is set in the M register 23 as shown in Table 24 of FIG. 7, the limit value determination portion 4 inputs the value of the limit value L2 that has been set to the register 20. Thus, the limit value L is set to the fixed limit value L2. When an unsatisfactory abnormality is observed in the visually processed image, the visual processing device 1 masks the internal signals L1 and L3 to L6 of the integrated circuit to set the limit value L2 from the outside so as to perform a self-diagnosis such as evaluating the impact of the limit value. It is also possible to forcibly set the limit value L to the limit value L2 by masking the internal signals L1 and L3 to L6, and thus it can be used as a test signal for confirming the signals in the integrated circuit.

If the M register 23 is set to the value 1, then the limit value determination portion 4 inputs the limit value L1 and outputs L1 as the limit value L. Similarly, if the M register 23 is set to the value 3, then the limit value determination portion 4 inputs the limit value L3 and outputs L3 as the limit value L. If the M register 23 is set to the value 7, then the limit value determination portion 4 inputs the limit values L1 and L3 and performs a computation using L1 and L3 and outputs the limit value L. This computation can be a computation for calculating the minimum value MIN (L1,L3), or can be a computation for calculating the average value Ave (L1,L3).

Thus, the limit value determination portion 4, depending on the value that has been set to the M register 23, selects and outputs a signal that has been input from the outside, or perform a computation and then outputs a limit value L. The limit values L3 to L6 that are input from the outside are described in detail later.

It should be noted that if the limit value determination portion 4 selects and outputs a signal that has been input from the outside, then the limit value that has been input can be used as it is as the limit value L, and the limit value determination portion 4 can be obviated.

Next, the gain limit portion 5 limits the first gain signal GAIN with the limit value L, and outputs a second gain signal GAIN2.

Figure 8:
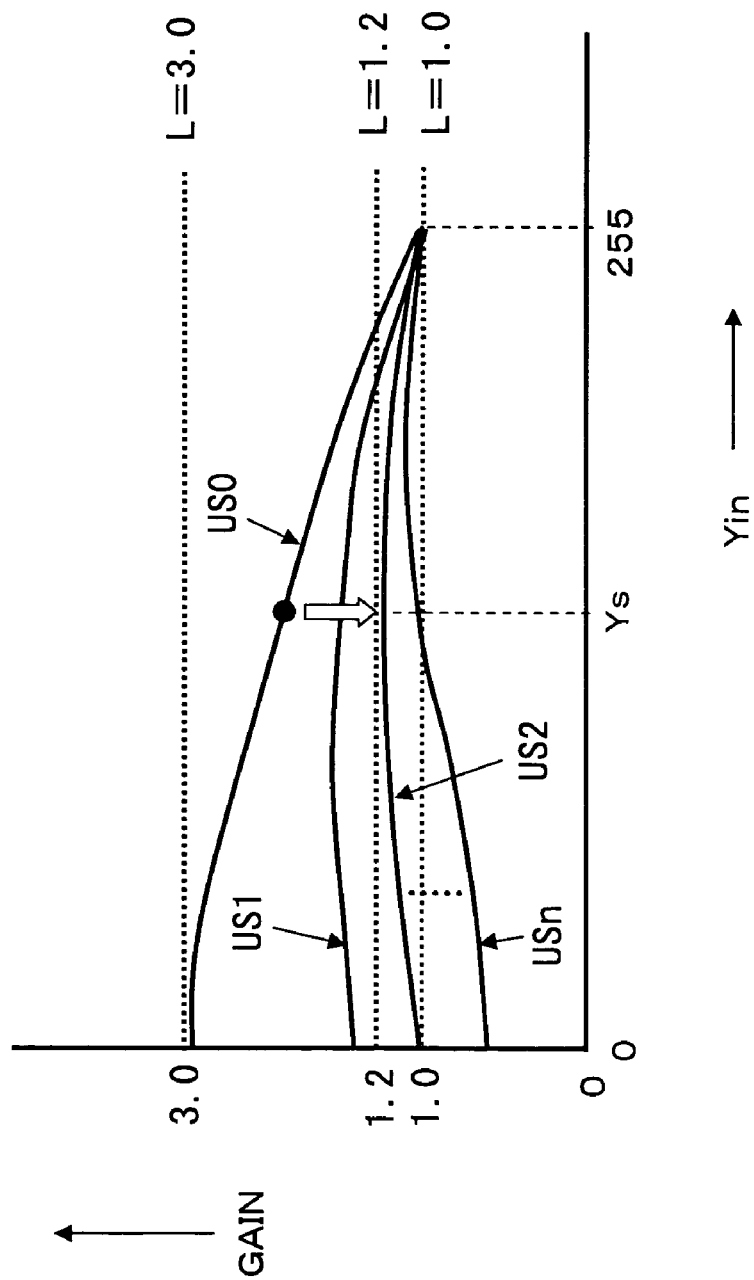
FIG. 8 is an explanatory diagram describing the gain limit value with the gain characteristics of the same.
Figure 9:
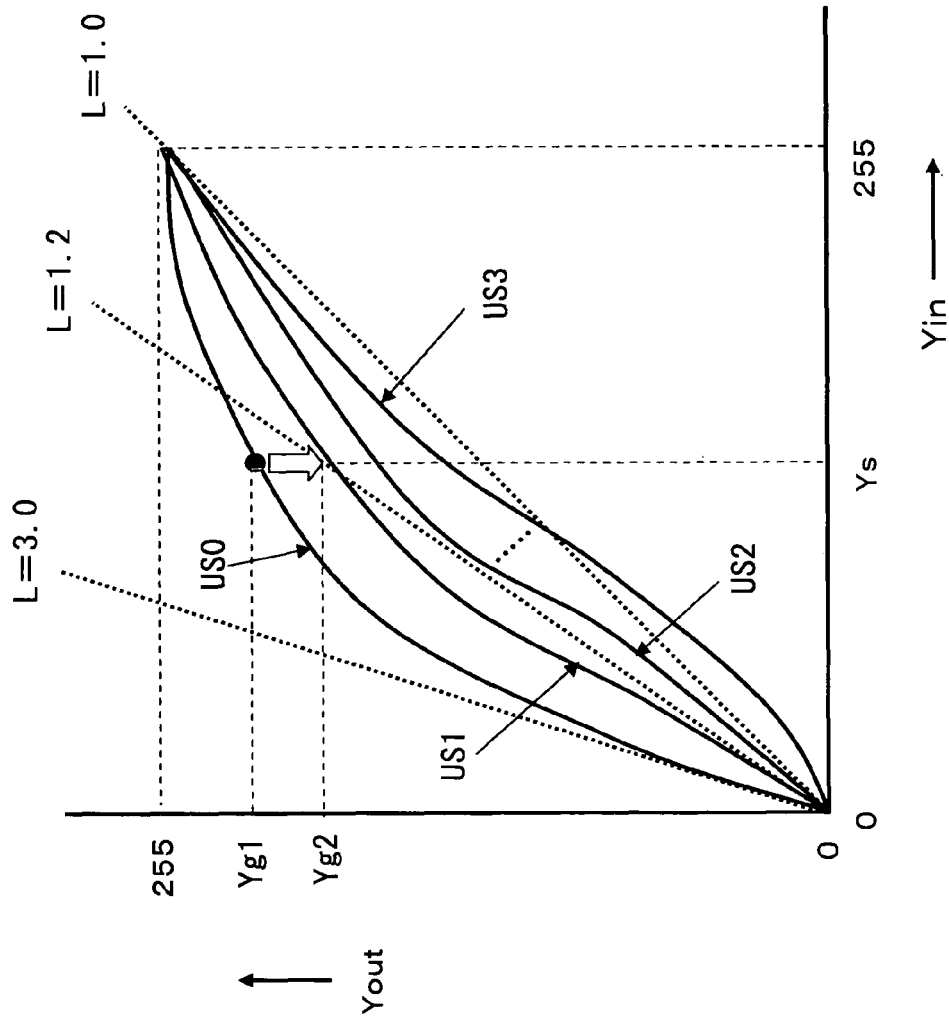
FIG. 9 is an explanatory diagram describing the gain limit value with the grayscale characteristics of the same.

Specifically, as shown in FIG. 8, if the first gain signal GAIN exceeds the various limit values L shown by the dashed lines, then the gain output is kept at or below all of the limit values. For example, when the limit value L=1.2, then the output in the case of the luminance signal Ys and an unsharp signal US of US0 is limited at L=1.2 and output. Due to this limit, the output signal Yout for the luminance signal Ys is limited from Yg1 to Yg2 as shown in FIG. 9. That is, the output is limited to equal or less than the slopes of the limit values L.

Next, the correction portion 9 corrects the image signal according to the second gain signal GAIN2. The correction portion 9 is made of a multiplication portion 6, a multiplication portion 7, and a multiplication portion 8.

The multiplication portion 6 multiplies the second gain signal GAIN2 and the luminance signal Yin, and outputs a luminance signal Yout. The multiplication portion 7 and the multiplication portion 8 multiply the second gain signal GAIN2 with the color signals CRin and CBin, respectively, and output color signals CRout and CBout.

It should be noted that the Yout signal, the CRout signal, and the CBout signal are each obtained through multiplication with the same gain value, that is, GAIN2, by one of the multiplication portions (multiplication portions 6 to 8) and are output from the correction portion 9, and thus discrepancies in the output timing of the Yout signal, the CBout signal, and the CRout signal do not occur. Consequently, it is not necessary to provide separate delay means or the like for synchronizing the output timing of the Yout signal, the CBout signal, and the CRout signal.

The correction portion 9 corrects the image signal in this fashion. Consequently, in brightness adjustment, the correction portion 9 also increases the color signals in the areas in which it increases the luminance level, and thus the color does not appear light in these areas. Conversely, it also reduces the color signal in the areas in which it reduces the luminance level, thus the color does not appear dark in these areas. It is also possible to inhibit color saturation in areas where the luminance level has been increased by correcting the input image signal according to the second gain signal GAIN2.

It should be noted that it is also possible for the visual processing portion 3 of the visual processing device 1 (FIG. 1) to receive only the luminance signal Yin as input, and to output a gain signal that is equivalent to an output obtained by performing gamma conversion of the luminance signal Yin. With this configuration, the visual processing portion 3 can be constituted by a LUT storing data having one-dimensional gain characteristics. More specifically, the data stored in the LUT can be obtained by selecting a conversion curve having any one of the gain characteristics US0 to USn in FIG. 3, or the data can be created through a one-dimensional gain function that has been set in advance. It is also possible to create the data to be stored in the LUT through a gain function that yields an output that is equivalent to the grayscale conversion curve that is obtained from the histogram distribution of the luminance signal in the image.

Thus, since the visual processing portion 3 stores data based on the gain characteristics, the memory capacity can be made smaller than if the gamma correction values are stored as they are as tabulated data.

Figure 10:
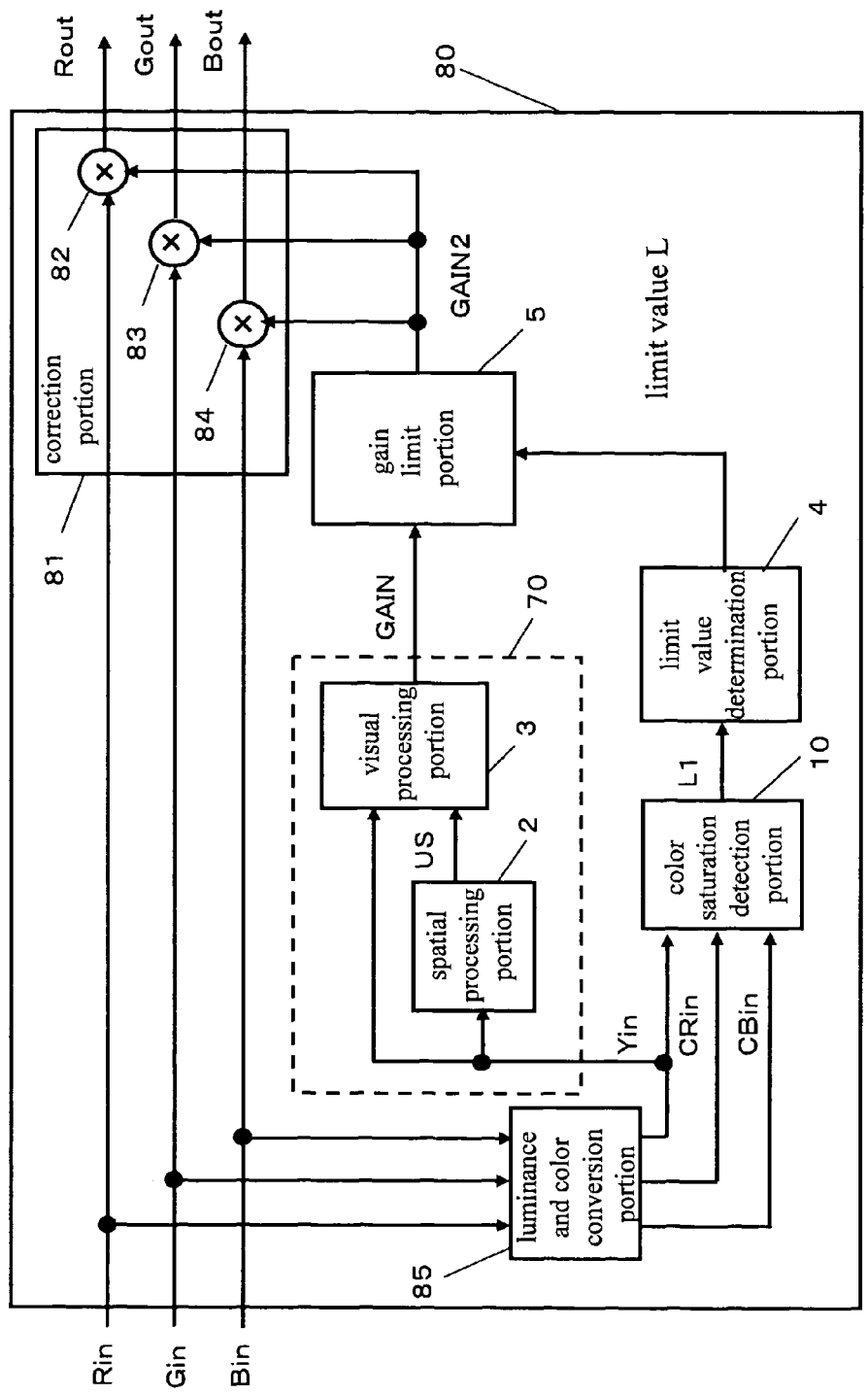
FIG. 10 is a block diagram showing the configuration of a first modified example of the visual processing device of the same.

It is also possible for the image signals that are input and output to be RGB signals, that is, primary color signals. FIG. 10 shows a block diagram of a visual processing device 80 according to a first modified example. To avoid repetition, the discussion of procedures that are identical to those of the visual processing device 1 has been omitted. The visual processing device 80 inputs an RGB signal as the image signal, and outputs an RGB signal that has been corrected through visual processing.

The luminance and color conversion portion 85 converts the image signals Rin, Gin, and Bin that have been input into a luminance signal Yin and color signals CRin and CBin. Here, as for extracting the luminance component information, it is created from the Rin, Gin, and Bin to match human vision characteristics. The following is an example of the luminance signal Yin.

$$Yin = 0.3 \times Rin + 0.59 \times Gin + 0.11 \times Bin$$

The color signals (CRin, CBin) are as follows.

$$CRin = (-0.1687) \times Rin + (-0.3313) \times Gin + 0.5 \times Bin$$

$$CBin = 0.5 \times Rin + (-0.4187) \times Gin + (-0.0813) \times Bin$$

The color saturation detection portion 10 (FIG. 1) calculates the correction value K1 from the converted luminance signal Yin, the color signal CRin, and the color signal CBin. It should be noted that although the RGB conversion portion 11 (FIG. 4) of the color saturation detection portion 10 creates an RGB signal from the luminance signal Yin, the color signal CRin, and the color signal CBin, it is also possible to directly use the image signals Rin, Gin, and Bin that have been input. In a case where the image signals Rin, Gin, and Bin that are input are used directly, the RGB conversion portion 11 can be omitted.

The limit value determination portion 4 (FIG. 6) determines the limit value L by referencing the limit value L1. The limit value determination portion 4 selects the signal that has been input from the outside and outputs this as the limit value L, or performs a computation and then outputs the limit value L, according to the value that has been set in the M register 23.

The visual processing portion 3 receives the output of the spatial processing portion 2 and the luminance signal Yin as input, and calculates the first gain signal GAIN.

The gain limit portion 5 outputs a second gain signal GAIN2 that is obtained by correcting the first gain signal GAIN that has been input with the limit value L.

A correction portion 81 is made of multiplication portions 82, 83, and 84. The multiplication portions 82, 83, and 84 multiply the second gain signal GAIN2 and the image signals Rin, Gin, and Bin, respectively, and output visually corrected RGB signals Rout, Gout, and Bout.

Thus, with the visual processing device 80, it is possible to adjust the brightness, such as the contrast, while retaining the ratio of Rin, Gin, and Bin. Further, with the visual processing device 80, the gain signal can be limited by the limit value L, and thus it is possible to inhibit saturation of the gradation of the grayscale and color saturation even when the brightness, such as the contrast, is adjusted.

It is also possible for the output of the visual processing portion 3 (FIG. 1) to be changed to a difference signal of the difference with the luminance signal Yin. A visual processing device 60 according to a second modified example is described using FIG. 11 and FIG. 12.

Figure 11:
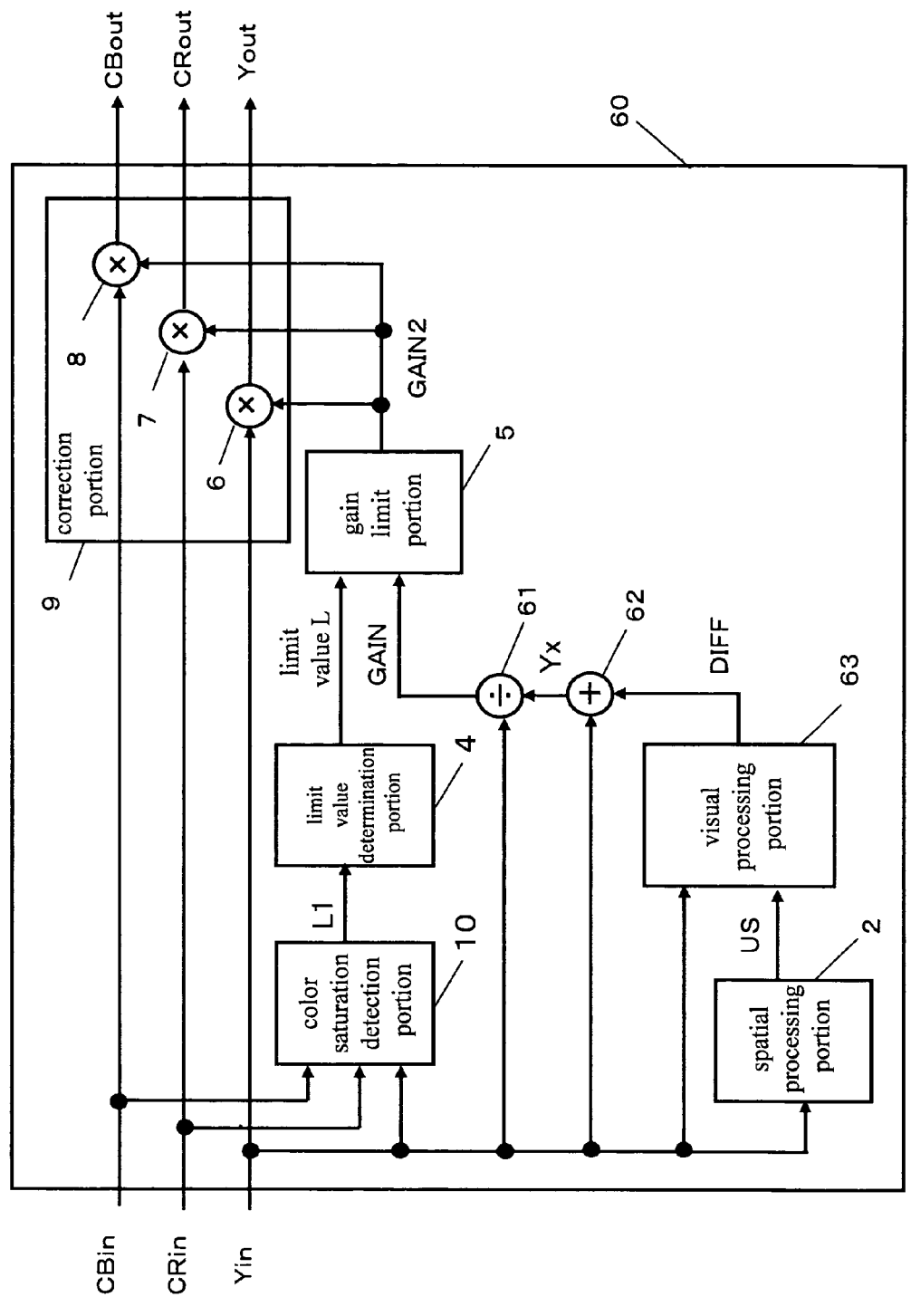
FIG. 11 is a block diagram showing the configuration of a second modified example of the visual processing device of the same.

FIG. 11 is a block diagram of the visual processing device 60 of the second modified example.

Figure 12:
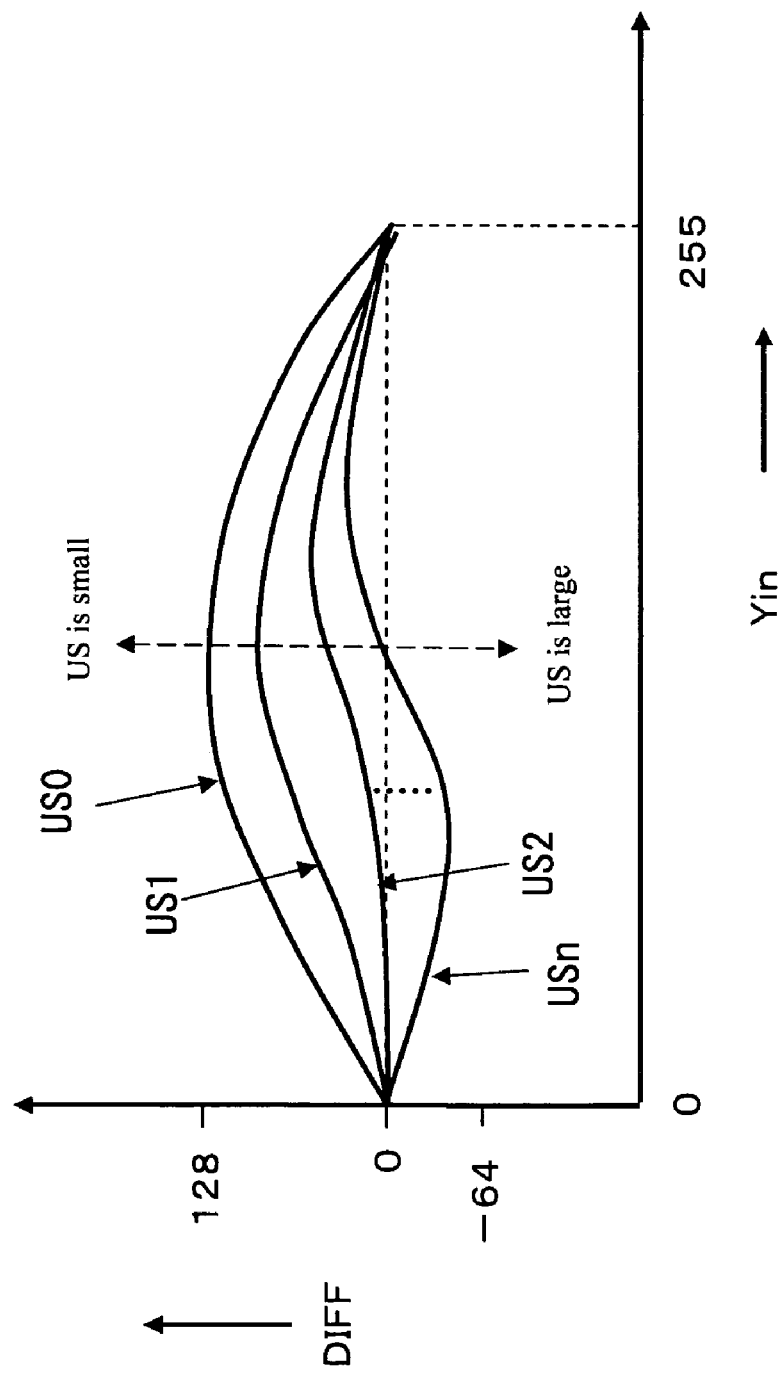
FIG. 12 is an explanatory diagram describing the difference signal DIFF of the same.

A visual processing portion 63 is designed such that it outputs the difference between the output signal resulting from the grayscale conversion shown in FIG. 2 and the luminance signal Yin as a difference signal DIFF. The difference signal DIFF is the difference between the output signal resulting from the grayscale conversion shown in FIG. 2 and the luminance signal Yin, and as shown in FIG. 12, is determined based on the unsharp signal USn and the luminance signal Yin. Thus, the signal that is obtained by an addition portion 62 adding the difference signal DIFF and the luminance signal Yin is the same as the output signal resulting from the grayscale conversion shown in FIG. 2.

The addition portion 62 calculates an addition value Yx by taking the sum of the difference signal DIFF and the luminance signal Yin. The addition value Yx is a signal that is equivalent to the output signal after the grayscale conversion of FIG. 2.

A division portion 61 calculates the first gain signal GAIN by dividing the addition value Yx by the value of the luminance signal Yin. That is, the first gain signal GAIN is obtained as follows.

$$GAIN = Yx/Yin$$

The first gain signal GAIN is equivalent to adopting the slope of the grayscale conversion curve of FIG. 2 as the gain.

The color saturation detection portion 10 (FIG. 1) calculates the limit value L1 from the converted luminance signal Yin, the color signal CRin, and the color signal CBin.

The limit value determination portion 4 (FIG. 6) determines the limit value L in reference to the limit value L1. The limit value determination portion 4 selects the signal that has been input from the outside and outputs this as the limit value L, or performs a computation and outputs the limit value L, according to the value that has been set in the M register 23.

The gain limit portion 5 outputs a second gain signal GAIN2 that is obtained by correcting the first gain signal GAIN that has been input with the limit value L.

The multiplication portion 6, the multiplication portion 7, and the multiplication portion 8 of the correction portion 9 multiply the second gain signal GAIN2 and the luminance signal Yin, the color signal CRin, and the color signal CBin, respectively, and output the luminance signal Yout, the color signal CRout, and the color signal CBout.

It should be noted that the visual processing portion 63 can be constituted by a two-dimensional LUT or can be constituted by a one-dimensional LUT storing a function of the luminance signal Yin and the difference signal DIFF.

By storing the difference between the output of the grayscale conversion curve and the luminance signal Yin in the LUT, the memory capacity can be reduced more than if gamma correction values are stored.

Thus, with the first embodiment of the invention, it is possible to achieve a visual processing device 1 that can execute precise contrast adjustment with respect to image signals that have been input and that does not lead to discrepancies in the output timing of the image signals that are output. Further, since it is possible to limit the first gain GAIN by a predetermined limit value that has been set, the brightness can be adjusted while suppressing color saturation. In particular, the gain signal can be limited at colors having high vividness, and this allows color saturation at dark red and dark blue to be prevented.

Since the maximum value detection portion detects the maximum value when the image signal is converted to RGB signals, and the first gain signal is limited based on the maximum value of the RGB signal that is detected, it is possible to detect the level of the gain signal that leads to color saturation, and a limit value that does not result in color saturation can be calculated.

By using the unsharp signal US, which is information on the shading of a local area, the visual processing portion 3 can correct the image signal with gain characteristics that are different for the dark regions and the light regions in the image, and thus the contrast of both can be adjusted ideally, even if dark areas in the image are made brighter, without saturating the bright area regions in the background of the image signal, and by doing so, color saturation is suppressed. Thus, it is possible to perform contrast adjustment in such a manner that dark areas in an image of a backlit scene, and in particular skin-color regions such as a person's face, can be adjusted to an appropriate brightness and the image signals of the background region are not saturated.

The visual processing portion 3 was made to perform an output that is based on the gain characteristics. The gain characteristics change more smoothly with respect to the image signal than do the grayscale conversion characteristics, and thus sufficient processing precision can be ensured even if the image signal and the processed signal are decimated roughly, and the bit precision of the signal can be lowered. Thus, the circuit scale of the hardware of the visual processing portion 3 can be reduced, and in a configuration where this is a lookup table, the memory capacity can be reduced.

Having a LUT serve as the visual processing portion 3 allows different visual characteristics to be achieved by rewriting the data that are stored in the LUT. It is also possible to achieve complex, non-linear gain characteristics with ease.

In addition, since the effects of the contrast can be weakened by the limit value L, it is not necessary to recreate gain characteristic data that correspond to the strength of an effect. It therefore is not necessary to provide the LUT with data for various strengths, and this allows the capacity of the memory to be reduced. Further, since it is not necessary to replace the contents of the LUT, the limit value L can be changed in real-time and the strength of the effect can be changed for each region of the image. Specifically, the limit value L can be changed per frame or per pixel.

Second Embodiment

A display device according to a second embodiment of the invention is described next using FIGS. 13 to 17. Components that are the same as in the first embodiment have been assigned the same reference numerals and are not described in detail.

Figure 13:
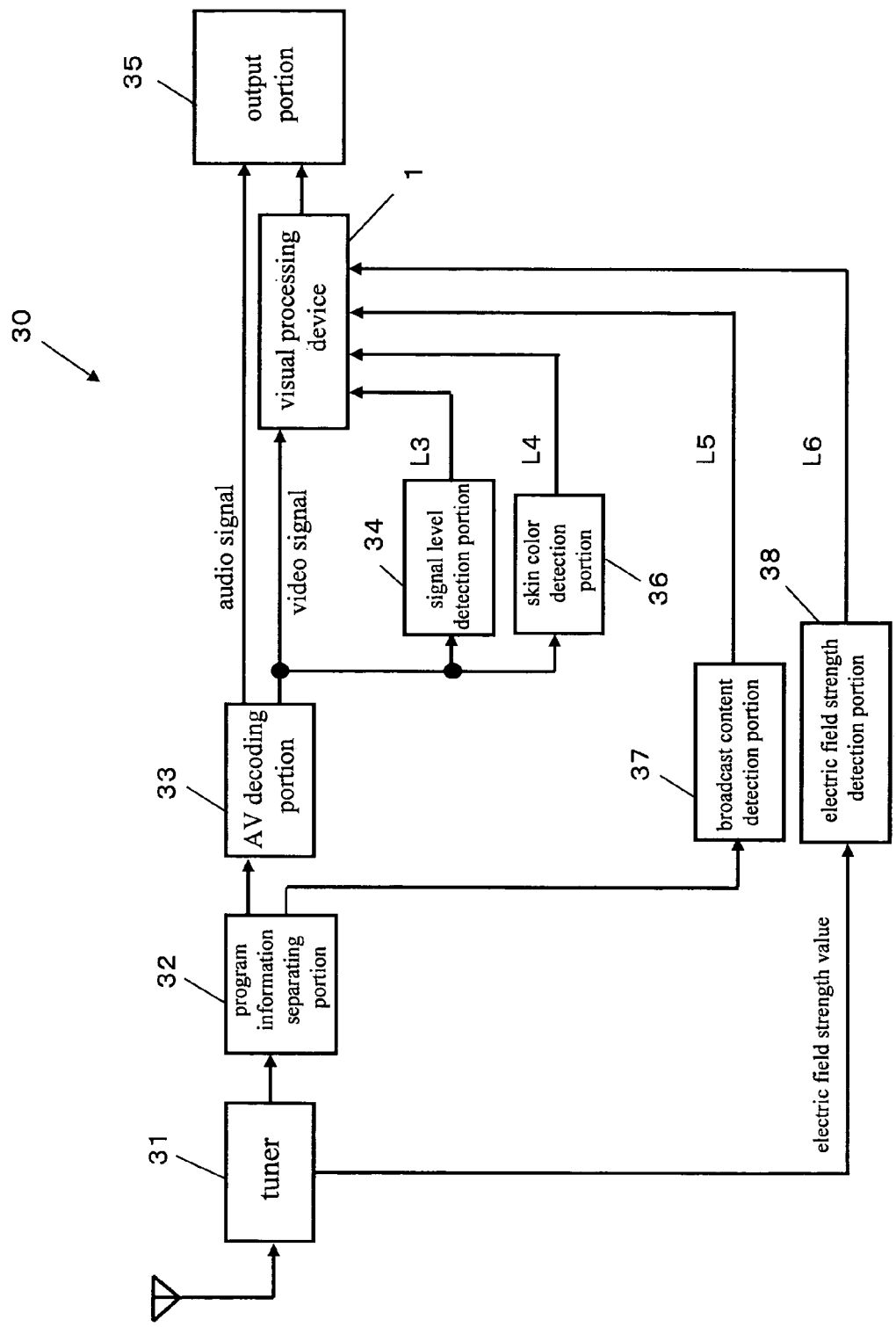
FIG. 13 is a block diagram showing the configuration of a display device according to a second embodiment of the invention.

In this second embodiment of the invention, an example of determining the limit value of the first gain signal GAIN of the visual processing device 1 is described using FIG. 13. FIG. 13 is a block diagram showing the configuration of a display device 30 according to a second embodiment of the invention.

In FIG. 13, the display device 30 is provided with a tuner 31 for receiving program information, a program information separating portion 32 for separating the program information, an AV decoding portion 33 for decoding video data and audio data, the visual processing device 1 for visually processing the video data, and an output portion 35 for displaying the processed image.

The display device 30 can also be furnished with some or all of a signal level detection portion 34 for detecting the mean signal level of the video signal, a skin color detection portion 36 for detecting skin color regions, a broadcast content detection portion 37 for detecting genre information and program description information, and an electric field strength detection portion 38 for detecting the strength of the electric field of the received electromagnetic wave.

The tuner 31 selects the electromagnetic wave of a target broadcasting station from the received electromagnetic waves that have been received by the antenna, and modulates this to restore a single transport stream (hereinafter, referred to as "TS").

The program information separating portion 32 descrambles the TS and separates the video data, the audio data, the various data for digital broadcast, and the data for the EPG display, for example, by program content.

The AV decoding portion 33 decodes the video data and the audio data that have been separated by the program information separating portion 32 into a video signal and an audio signal. The video signal is for example composed of a luminance signal and color signals such as in YCbCr.

The visual processing device 1 visually processes the video signal that has been input and outputs the result to the output portion 35. The output portion 35 is for example provided with a display portion such as a CRT, a plasma display panel, or a liquid crystal panel, and a sound output portion such as a speaker, and outputs the audio signal that has been input and displays the visually processed video signal. It should be noted that it is also possible for the output portion 35 to convert and then display the input signal to match the display colors of the display. For example, it can convert a luminance and color signals into RGB signals, which are primary color signals, and then display these signals.

It should be noted that modified examples of the visual processing device 1 are conceivable depending on the structure of the signal that is handled by the output portion 35. For example, if the output portion 35 handles luminance signals and color signals, then the visual processing device 1 (FIG. 1) is preferable, whereas if it handles RGB signals, then the visual processing device 80 (FIG. 10) is preferable. In this way, a configuration that is suited for the video signal can be used.

The method of determining the limit value for the first gain signal GAIN of the visual processing device 1 is described next using FIGS. 13 to 17.

The signal level detection portion 34 shown in FIG. 13 stores the video signal in a frame memory and computes the mean value of the video signals per frame or per field to detect the mean signal level. The signal level detection portion 34 then calculates the limit value L3 according to the mean signal level that has been detected. For example, an image in which the mean signal level is higher than a predetermined value PH is defined as a "bright image," and in a bright image the limit value L3 is set to 1.0, whereas an image in which the mean signal level is lower than a predetermined value PL is defined as a "dark image," and in a dark image the limit value L3 is set to 2.0. Thus, the limit value can be set based on the characteristics of the image. The mean signal level can be a mean value that is obtained by averaging the luminance signals, or it is also possible to use a value that is obtained by averaging the signals of the RGB signal. The mean signal level also can be a value that is obtained by further averaging the three average values of the RGB signals.

Thus, limiting the gain signal in bright images to suppress the signal level increases the heat resistance and curbs power consumption in the display device, which for example may be a plasma display panel.

To raise the heat resistance and lower power consumption in the plasma display panel, the drive portion is provided with a display control function of performing a control on the display panel side to lower the overall brightness of the screen when the average luminance level of the image to be displayed exceeds a predetermined level. This display control function operates independent of the video signal processing.

Thus, raising up regions of a predetermined brightness in the image through visual processing activates the display control function and the drive portion lowers the overall brightness of the screen, darkening even those regions that were sufficiently bright before visual processing, and resulting in an image that overall is unsharp and has worse picture quality. In other words, there is a risk that the effects due to the visual processing that has been performed will be nullified. For this reason, in the visual processing device 1, the gain signal is kept below the mean signal level that activates the display control function of the drive portion, and thus contrast adjustment that is effective is possible.

Figure 14:
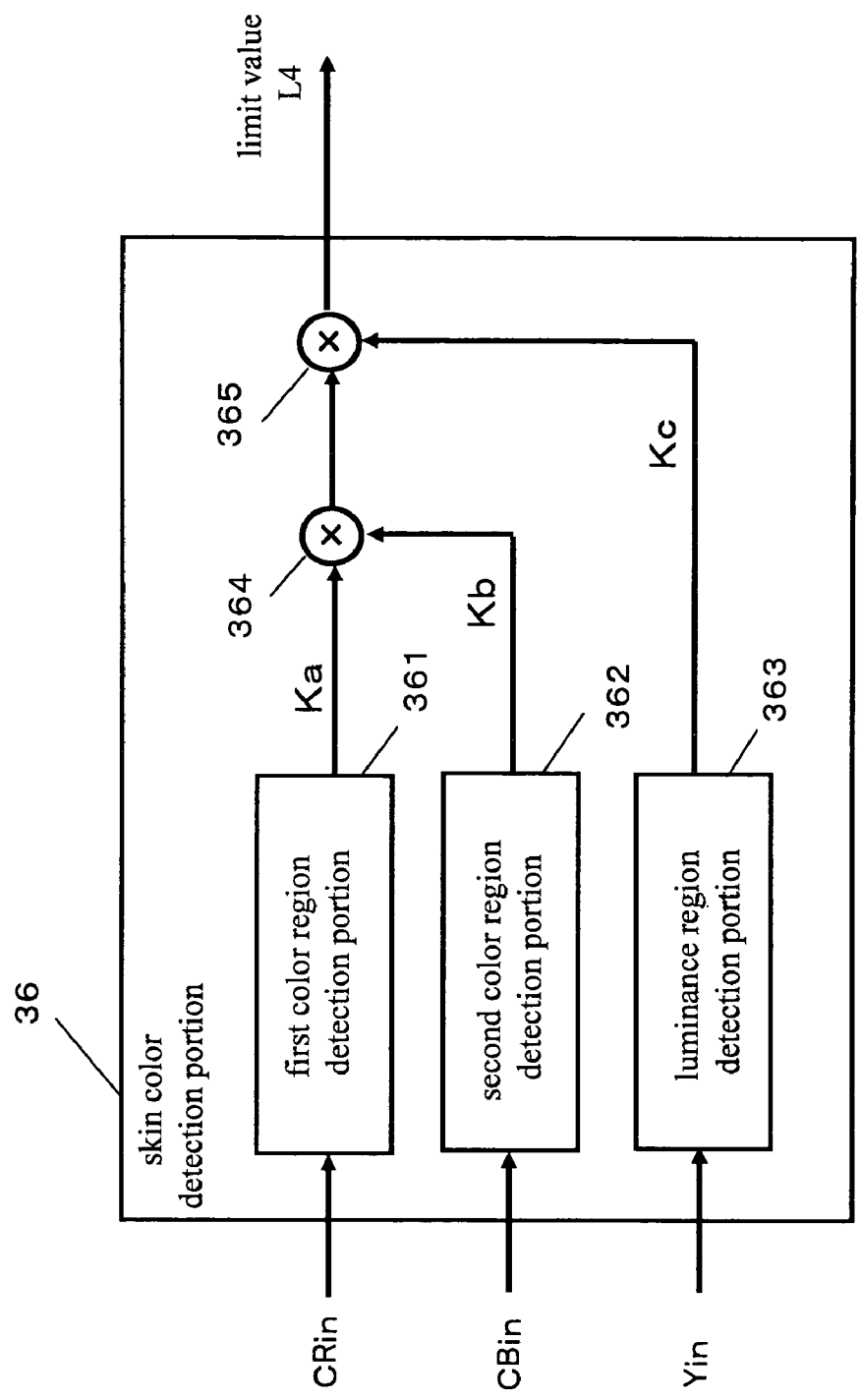
FIG. 14 is a block diagram showing the configuration of the skin color detection portion of the same.

The skin color detection portion 36 is described next using FIGS. 14 to 16.

The skin color detection portion 36 detects skin color regions from the luminance signal Yin, the color signal CBin, and the color signal CRin, and calculates a limit value L4. As shown in FIG. 14, the skin color detection portion 36 is provided with a first color region detection portion 361 that detects a predetermined first color region from the color signal CRin and outputs a weight value Ka, a second color region detection region 362 that detects a predetermined second color region from the color signal CBin and outputs a weight value Kb, and a luminance region detection portion 363 that detects a predetermined brightness region from the luminance signal Yin and outputs a weight value Kc, and the skin color detection portion 36 obtains the limit value L4 by defining the degree of likeness to skin as the product of the various weight values. For example, the limit value L4 is calculated by multiplication portions 364 and 365 as limit value L4=Ka×Kb×Kc.

Figure 15:
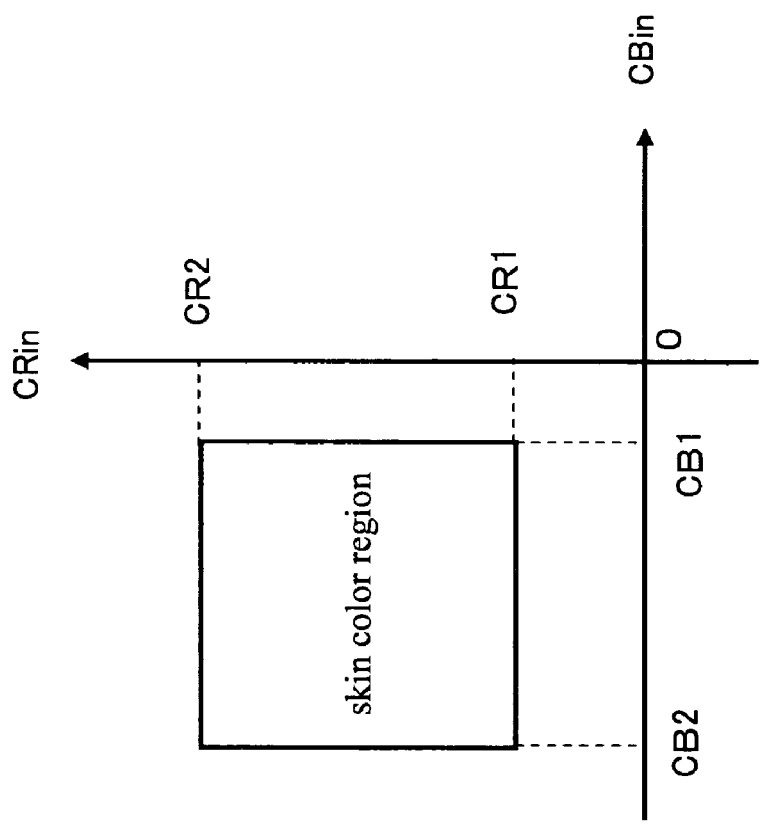
FIG. 15 is an explanatory diagram describing the skin color detection portion of the same.

As shown in FIG. 15, here the skin color region is a region having a predetermined range in the color signals that has been defined in advance. The skin color detection portion 36 detects whether the video signal to be detected (luminance signal Yin, color signal CBin, and color signal CRin) falls within the skin color region. For example, the region enclosed by CB1 to CB2 of the color signal CBin and CR1 to CR2 of the color signal CRin is defined as the skin color region. The range of the image signal that belongs to the range of Yq to Yp of the luminance is regarded as the skin color region. Thus, it is possible to set the limit value L according to the brightness of the image, in addition to the color. In particular, one effect is that it is possible perform limit so as to inhibit face shininess, grayscale saturation, and color saturation in the skin color region of the face of people who are bright.

The operation of the skin color detection portion 36 is described in detail using FIG. 16.

Figure 16A:
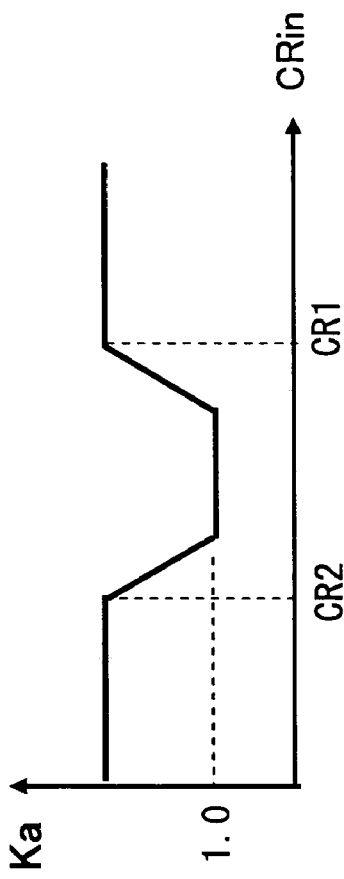
FIG. 16A is an explanatory diagram describing the weight value Ka for the color signal CR of the same.
Figure 16B:
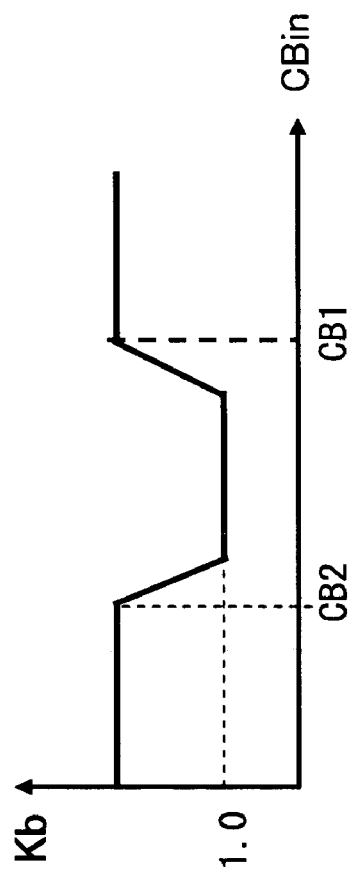
FIG. 16B is an explanatory diagram describing the weight value Kb for the color signal CB of the same.
Figure 16C:
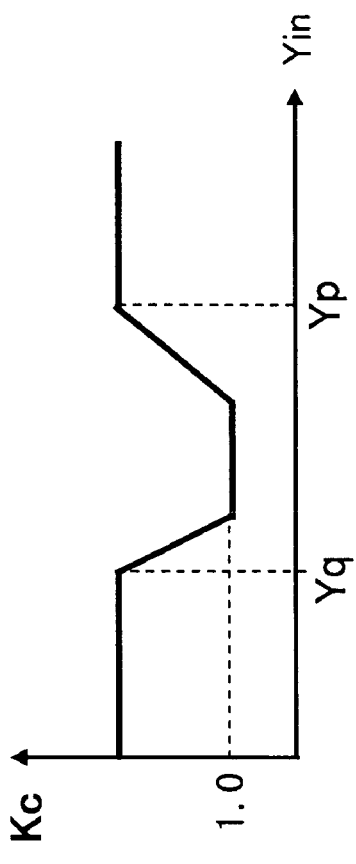
FIG. 16C is an explanatory diagram describing the weight value Kc for the luminance signal Y of the same.

The first color region detection portion 361 inputs the color signal CRin and outputs a weight value Ka according to the weight function shown in FIG. 16A. Similarly, the second color region detection region 362 inputs the color signal CBin and outputs a weight value Kb according to the weight function shown in FIG. 16B. The luminance region detection portion 363 inputs the luminance signal Yin and outputs a weight value Kc according to the weight function shown in FIG. 16C. The degree of likeness to skin is defined as the product of the various weight functions, and is calculated as limit value L4=Ka×Kb×Kc. The weight at the boundary of the target skin color region is changed gradually so that the color near the boundary between the skin color region and the outside does not become unnatural. It should be noted that the weight function can have the shape of a trapezoid or a triangle. Image evaluation, for example, can be employed to set the ideal function. It should be noted that it is also possible for the limit value L4 to be the smallest of value among Ka, Kb, and Kc, or it can be the average of the three. Image evaluation, for example, can be employed to set the ideal function.

The limit value L can be suppressed in skin color regions by lowering the weight coefficients in the skin color region, such as setting the minimum value to 1.0. The skin color of people's faces in bright images is therefore prevented from shining even if contrast adjustment is performed, and it is possible that the gradation of their faces is not saturated. It should be noted that the minimum values of the weight coefficients and the shapes of the weight functions can be different from one another.

The broadcast content detection portion 37 is described next using FIG. 17.

The broadcast content detection portion 37 detects EPG display data that have been separated from the program information separating portion 32, and the genre information and the program description information of the data that are currently being received, and calculates the limit value L5. It should be noted that the genre information of the data and the image information also may be detected from MPEG stream information.

The broadcast content detection portion 37 detects the type of content that has been received, such as "News," "Sports," "Tabloid Show," Movie," and "Drama" as shown in FIG. 17, and calculates a limit value L5 for each of these. The limit value that is set depends on the content type, and for example, a limit value of 3.0 is set for news, a limit value of 2.0 is set for sports, a limit value of 1.5 is set for a tabloid show, a limit value of 1.1 is set for a movie, and a limit value of 1.4 is set for a drama. The limit value is set high for news and sports in order to sharpen the picture, an approximately normal limit value is set for tabloid shows because many are recorded in studios and the video has also been adjusted, and for movies, the limit value is kept low in order to reproduce thick images. By setting the limit value to match the content in this way, it is possible to set the most ideal limit value for the video. The limit values L5 also may be tabulated in advance. In this way, it is possible to set the most ideal limit value L5 for the image type. It should be noted that it may also be possible for this table to be changed from the outside.

The electric field strength detection portion 38 is described next.

The electric field strength detection portion 38 detects the strength of the electric field of the received electromagnetic wave that is received by the tuner 31, and calculates a limit value L6 according to the strength of the electric field. For example, if the electric field strength is "strong," then the limit value L6 can be set to 3.0, whereas if the electric field strength is "weak," then the limit value L6 can be set to 1.0.

Thus, the limit value L6 can be set so that noise in images with a weak electric field and a poor S/N ratio is not enhanced.

As described above, according to the second embodiment of the invention, the signal level detection portion 34 can calculate the limit value L3 in accordance with the mean signal level that is detected from the image signals in a single frame or a single field, and the visual processing device 1 can limit the first gain signal GAIN according to the limit value L3.

Thus, the limit value can be set according to the mean signal level that is detected from the image signal, and in bright images the gain signal can be limited to suppress the signal level. By suppressing the signal level, the heat resistance can be increased and power consumption can be curbed in the display device, such as a plasma display panel. In addition, by keeping the gain signal below the level at which the function corresponding to the APL (Average Picture Level) that has been set for the display panel is activated, it is possible to achieve contrast adjustment that is effective.

The skin color detection portion 36 calculates the limit value L4 in accordance with the degree of likeness to skin color by performing computations with the weight coefficients Ka and Kb corresponding to the color signals, and the weight coefficient Kc corresponding to the luminance signal, which are set in advance. The visual processing device 1 can limit the first gain signal GAIN according to the limit value L4.

Thus, since the limit value can be set after detecting the skin color, it is possible to lower the limit value in the skin color regions of bright images, suppress color saturation, and also prevent face shine. It is also possible that the gradation of faces in bright settings is not saturated.

The broadcast content detection portion 37 calculates the limit value L5 according to the broadcast content that has been detected from the program information separating portion 32, which separates program information from the data that have been received. The visual processing device 1 can limit the first gain signal GAIN according to the limit value L5.

Thus, an optimal correction value can be set for each content type, and it is possible to set correction values that match the contrast adjustment values necessary for the content.

The electric field strength detection portion 38 calculates the limit value L6 according to the value of the electric field strength when the tuner 31 receives image data. The visual processing device 1 can limit the first gain signal GAIN according to the limit value L6.

Thus, the limit value can be set based on the value of the electric field strength, it is possible to detect images whose electric strength is weak and whose received data have a poor S/N ratio and then limit the gain signal for the entire image, and it is possible to suppress the enhancement of noise in images with a poor S/N ratio.

The display device 30 of the invention is provided with the tuner 31 for receiving image data that have been transmitted or broadcast, the AV decoding portion 33 for decoding the image data to video signals, the visual processing device 1 for visually processing the decoded video signals and outputting the result, and the output portion 35 for displaying the visually processed video signals.

With this configuration, it is possible to achieve a display device 30 with which visual processing through contrast adjustment of the image in which color saturation is inhibited is possible. Further, by suppressing the gain signal, it is possible to keep down the signal level in bright images and increase the heat resistance and curb power consumption in the display portion, such as a plasma display panel. Additionally, by keeping the gain signal below the mean signal level at which the display control function of the display panel is activated, it is possible to achieve contrast adjustment that has a high effect.

The following description is of a modified example of the gain-type visual processing portion 70 of the first embodiment of the invention and the gain-type visual processing portion 70 of the second embodiment of the invention.

Third Embodiment

Figure 18:
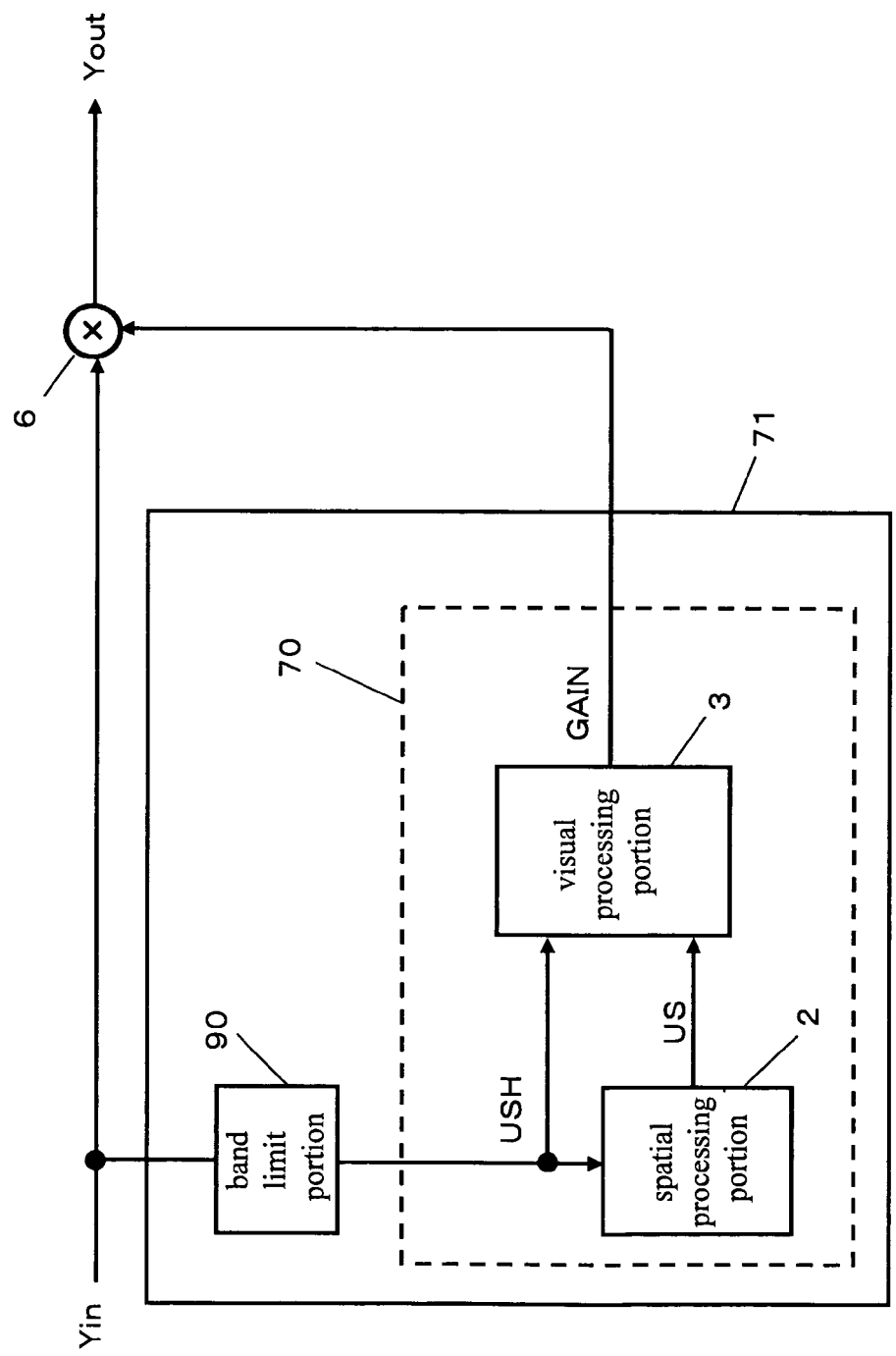
FIG. 18 is a block diagram showing the configuration of the gain-type visual processing portion according to a third embodiment of the invention.

As a third embodiment of the invention, a method of suppressing a drop in the contrast of the output signal Yout in a case where the spatial frequency band of the gain signal GAIN that is output from the gain-type visual processing portion 70 is limited and the value (signal level) of the luminance signal Yin that has been input is changed by a value (signal level) that is significantly larger than the value (signal level) of the unsharp signal US is described using FIGS. 18 to 20.

Figure 19A:
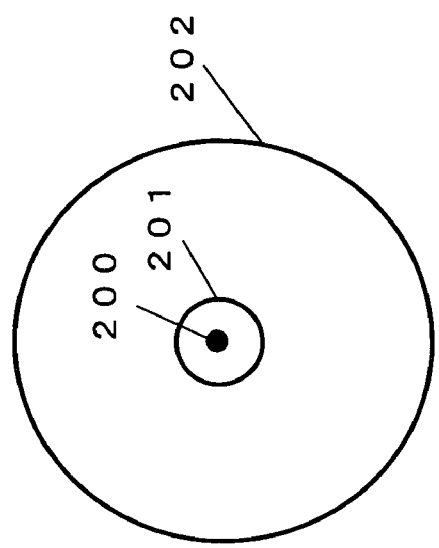
FIG. 19A is an explanatory diagram describing the range in which the brightness information around the target pixels is extracted in the gain-type visual processing portion of the same.
Figure 19B:
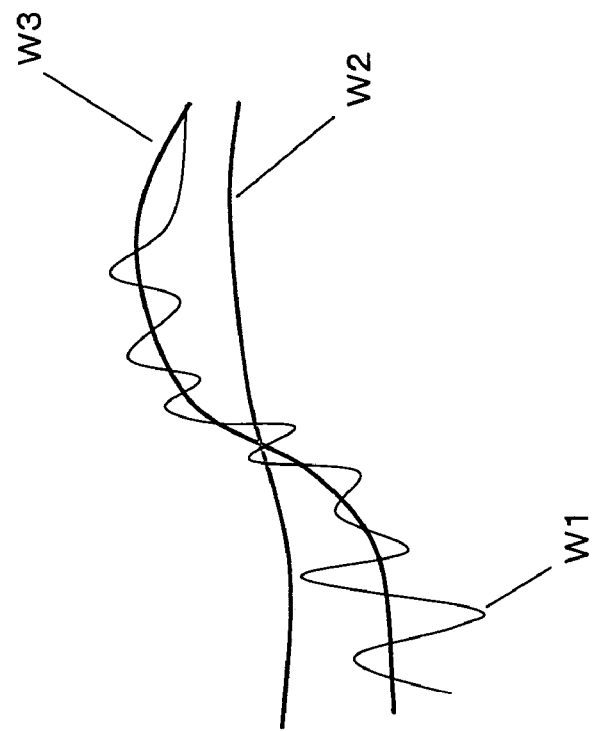
FIG. 19B shows examples of the signal waveforms of the Yin signal, the US signal, and the USH signal in the gain-type visual processing portion 71 of the same.
Figures 20A, 20B:
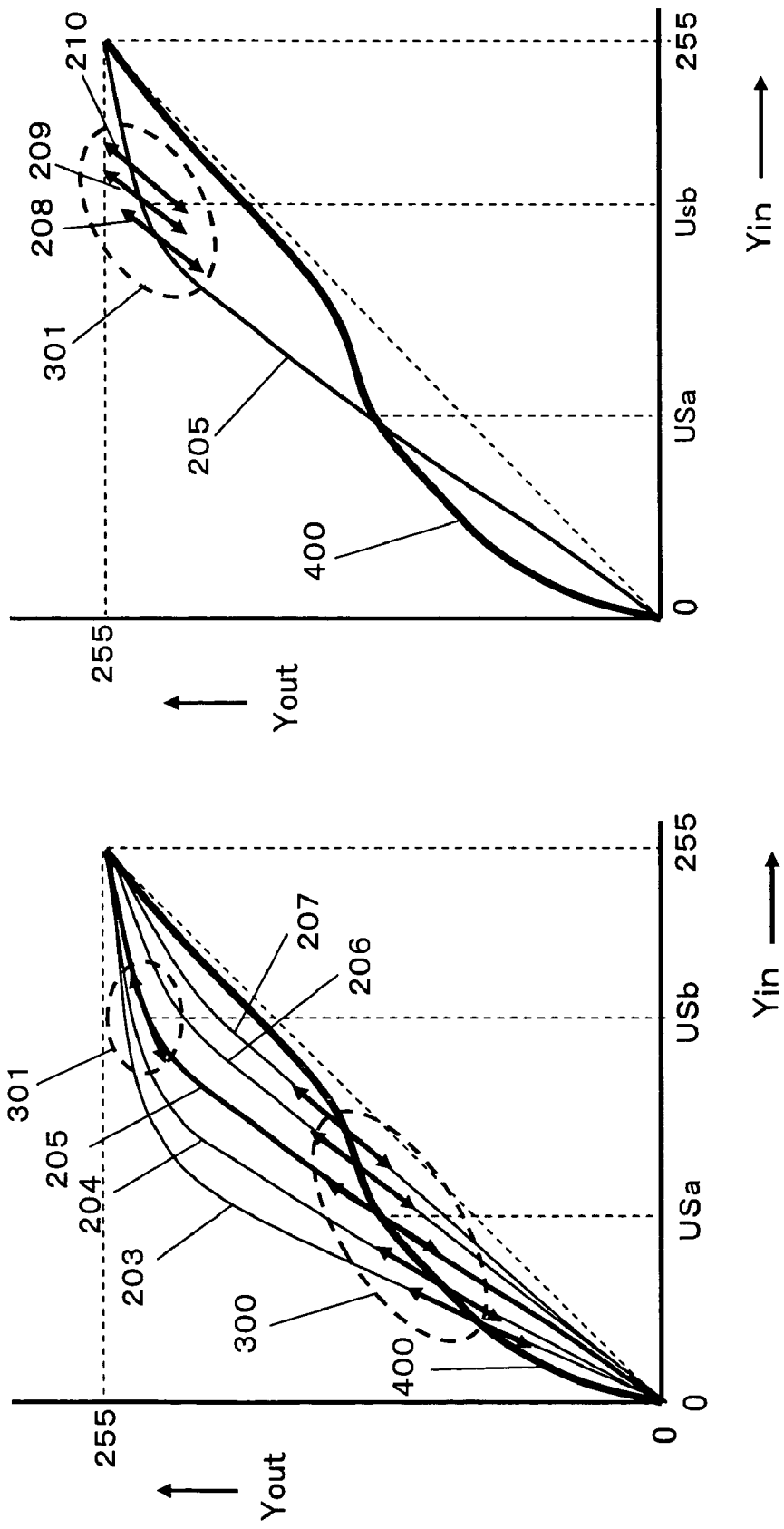
FIG. 20A is an explanatory diagram describing the grayscale conversion characteristics when the gain signal is not band limited.
FIG. 20B is an explanatory diagram describing the grayscale conversion characteristics when the gain signal has been band limited.

FIG. 18 is a block diagram showing the configuration of a gain-type visual processing portion 71, FIG. 19A is an explanatory diagram describing the range over which the gain-type visual processing portion 71 extracts the brightness information around the pixel in question, FIG. 19B is a diagram showing an example of the signal waveform of the Yin signal, the US signal, and the USH signal in the gain-type visual processing portion 71, FIG. 20A is an explanatory diagram describing the grayscale conversion characteristics when the gain signal GAIN is not band limited, and FIG. 20B is an explanatory diagram describing the grayscale conversion characteristics when the gain signal GAIN has been band limited. Hereinafter, components that are the same as in the first embodiment and the second embodiment have been assigned the same reference numerals as before and are not described in detail.

In FIG. 18 the gain-type visual processing portion 71 is provided with a band limit portion 90 for limiting the band of the spatial frequency of the gain signal GAIN that can respond to the luminance signal Yin, and the gain-type visual processing portion 70 for outputting a gain signal GAIN for amplifying the luminance signal Yin from a band limited signal USH whose band has been limited. Here, in the gain-type visual processing portion 70, the spatial processing portion 2 creates an unsharp signal US from the band limited signal USH and the visual processing portion 3 creates the gain signal GAIN based on the band limited signal USH and the unsharp signal US.

The gain signal GAIN that has been band limited and the luminance signal Yin that has been input are multiplied by the multiplication portion 6, yielding a luminance signal Yout whose gradation has been converted.

Thus, by performing grayscale conversion by multiplying the luminance signal Yin and the gain signal GAIN whose spatial frequency band that can respond to the luminance signal Yin has been limited, a drop in the contrast of the output signal Yout is suppressed even if the value of the luminance signal Yin that has been input is significantly larger than the unsharp signal US. This drop in contrast is discussed in greater detail later.

As shown in FIG. 19A, the band limit portion 90 calculates the average value of the pixels in a target region 201 proximate to the pixel in question 200, for example, to create a band limited signal USH (for example, this corresponds to the signal waveform W3 in FIG. 19B) whose spatial frequency band that can respond to the luminance signal Yin that has been input (for example, this corresponds to the signal waveform W1 in FIG. 19B) has been limited.

As illustrated in FIG. 19A, the spatial processing portion 2 extracts the values of the pixels from a wider target region 202 than the target region 201 of the band limited signal USH, and creates an unsharp signal US (for example, this corresponds to the signal waveform W2 in FIG. 19B) as the brightness information in the region surrounding the pixel in question 200. For example, it is preferable that the target region 202 is 10 to 100 times as large as the target region 201. Thus, the band of the spatial frequency of the unsharp signal US will be limited to a band that is significantly lower than the band of the spatial frequency of the band limited signal USH.

A method for suppressing a drop in the contrast in the output signal Yout in a case where the value of the luminance signal Yin that has been input is significantly larger than the unsharp signal US is described in detail below.

First, a case in which the output signal Yout experiences a drop in contrast is described using FIG. 20A. FIG. 20A is an explanatory diagram for describing the grayscale conversion characteristics when the gain signal GAIN is not band limited. The horizontal axis in FIG. 20A is the luminance signal Yin that has been input, and the vertical axis is the gradation converted output signal Yout.

In FIG. 20A, "USa" is the value of the unsharp signal US, which is the brightness information extracted from the wide target region 202 that is used for visually processing the area surrounding the pixel in question 200. "USb" is the value of the brightness information that has been extracted from the target region 201 near the pixel in question 200 that is input at this time. The value Yin of the pixel in question 200 that has been input is closer to USb, which is the near value, than USa, which is the value of a normally wide region.

In the visual processing portion 3, the gradation curve 400 in FIG. 20A illustrates the output characteristics in a case where the value of the luminance signal Yin of the pixel in question 200 and the value of the unsharp signal US match, and is a curve that is determined by the gradation curve that has been selected based on the brightness information extracted from the target region 202 around the pixel in question 200. The change in the overall screen brightness is determined from the gradation curve 400.

The visual processing portion 3 selects the gradation curve represented by a gradation curve 205 when the value of the unsharp signal US is USa, selects a curve 203 or a curve 204 when the unsharp signal US is less than USa (the region around the pixel in question 200 is darker than USa), and selects a curve 206 or a curve 207 when the unsharp signal US is greater than USa (the region around the pixel in question 200 is brighter than USa).

In this way, the visual processing portion 3 selects the gradation curve that is represented by the gradation curve 205 when the value of the unsharp signal US is USa, and unless there is a change in the unsharp signal US, the output signal Yout corresponding to the value of the luminance signal Yin of the pixel in question 200 is output in accordance with the gradation curve 205. Thus, the visual processing portion 3 maintains the contrast of the output signal Yout when the value of the luminance signal Yin of the pixel in question 200 is near USa because grayscale conversion is performed with a gain corresponding to the slope in the straight line section 300 of the gradation curve 205. With a configuration in which the band limit portion 90 has not been provided, however, when the brightness near the pixel in question 200 is USb and the luminance signal Yin takes a value that also is near USb, that is, when the luminance signal Yin is significantly away from the value of the unsharp signal US, the slope of the gradation curve 205 flattens out and the visual processing portion 3 outputs a gain signal GAIN that corresponds to the slope in the region 301. Thus, the visual processing device 1 performs grayscale conversion with this gain signal GAIN, and a drop in the contrast of the output signal Yout occurs as a result.

A method for suppressing a drop in the contrast of the output signal Yout is described using FIG. 20B. FIG. 20B is an explanatory diagram for describing the grayscale conversion characteristics of the visual processing device 1 when the gain signal GAIN has been band limited. The horizontal axis in FIG. 20B is the luminance signal Yin that has been input, and the vertical axis is the gradation converted output signal Yout.

In FIG. 20B, USa is the value of the unsharp signal US, which is the brightness information extracted from the target region 202 surrounding the pixel in question 200. The brightness near the pixel in question 200 is USb at this time, and the luminance value Yin also takes on a value near USb.

The visual processing portion 3 selects the gradation curve that is represented by the gradation curve 205 when the value of the unsharp signal US is USa, and unless there is a change in the unsharp signal US, the visual processing portion 3 determines the output signal Yout corresponding to the value of the band limited signal USH in which the band of the spatial frequency of the luminance signal Yin has been limited, and outputs this according to the gradation curve 205.

At this time, the band limited signal USH is the brightness USb near the pixel in question 200.

Thus, with the visual processing portion 3, even if the luminance signal Yin of the pixel in question 200 changes in a range around USb, which is significantly higher than the value of the unsharp signal US, the gain signal GAIN that is output by the visual processing portion 3 does not change because in that narrow region the value of the band limited signal USH is fixed at USb due to band limit. In other words, in the narrow region near the pixel in question 200, a substantially constant value (the slope of the line 209) is output as the gain signal GAIN. In this way, by multiplying the band-limited gain signal GAIN and the luminance signal Yin to perform grayscale conversion, it is possible to maintain the contrast of the output signal Yout. That is, in this case, the gain signal GAIN is a substantially constant value and thus the output signal Yout that is output is substantially proportional to the change in the signal level of the input luminance signal Yin. The contrast of the input luminance signal Yin is therefore maintained in the output signal Yout. It should be noted that the slope of the line 209 is closest to the slope of the straight line section 300 of the curve 205 in FIG. 20A, but the line 208 is closest when the band limited signal USH is less than USb, and the line 210 is closest when the band limited signal USH is greater than USb.

Thus, according to the third embodiment of the invention, grayscale conversion is performed by multiplying the luminance signal Yin and the gain signal GAIN in which the base of the spatial frequency that can respond to the luminance signal Yin has been limited, and thus a drop in the contrast of the output signal Yout can be suppressed, even if the value (signal level) of the luminance signal Yin that has been input is changed by a value (signal level) that is significantly larger than the value (signal level) of the unsharp signal US.

It should be noted that the manner in which the gain signal GAIN whose spatial frequency band that can respond to the luminance signal Yin has been limited is created is not limited to the configuration of the gain-type visual processing portion 71.

Another modified example of the configuration of the gain-type visual processing portion 71 is described below.

Figure 21:
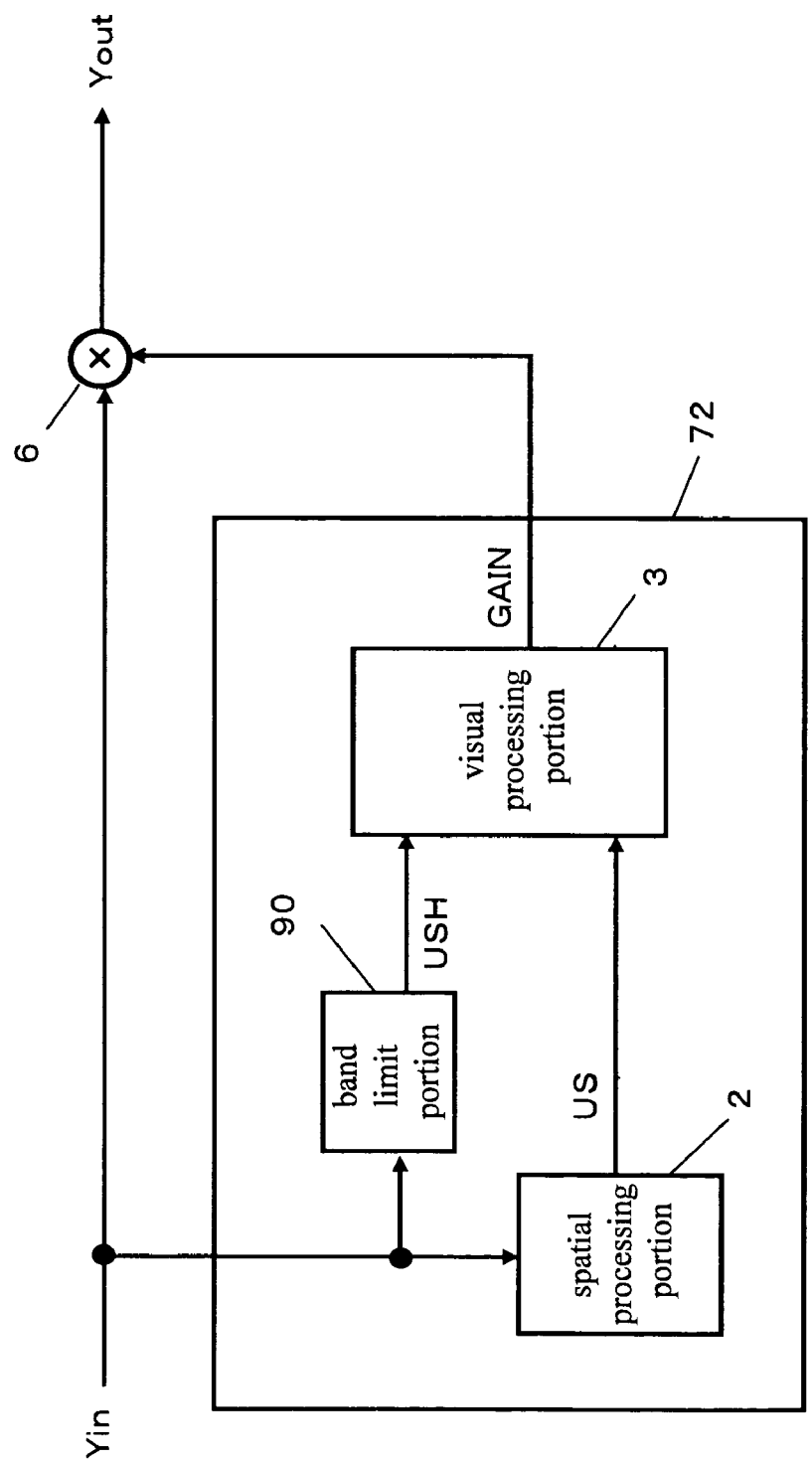
FIG. 21 is a block diagram showing the configuration of a gain-type visual processing portion serving as a third modified example.

First, a modified example of the gain-type visual processing portion 71 is described as a third modified example using FIG. 21. FIG. 21 is a block diagram showing the configuration of a gain-type visual processing portion 72 serving as a third modified example.

In FIG. 21, the gain-type visual processing portion 72 is provided with a band limit portion 90 for outputting a band limited signal USH whose band that can respond to the luminance signal Yin has been limited, a spatial processing portion 2 for creating an unsharp signal US from the luminance signal Yin, and a visual processing portion 3 for creating a gain signal GAIN based on the band limited signal USH and the unsharp signal US.

The multiplication portion 6 multiplies the luminance signal Yin and the band-limited gain signal GAIN to yield a gradation-converted output signal Yout.

With this configuration as well, it is possible to create a gain signal GAIN whose spatial frequency band that can respond to the luminance signal Yin has been limited, and like the gain-type visual processing portion 71, a drop in the contrast of the output signal Yout can be suppressed even if the value (signal level) of the luminance signal Yin that has been input is changed by a value (signal level) that is significantly larger than the value (signal level) of the unsharp signal US.

Figure 22:
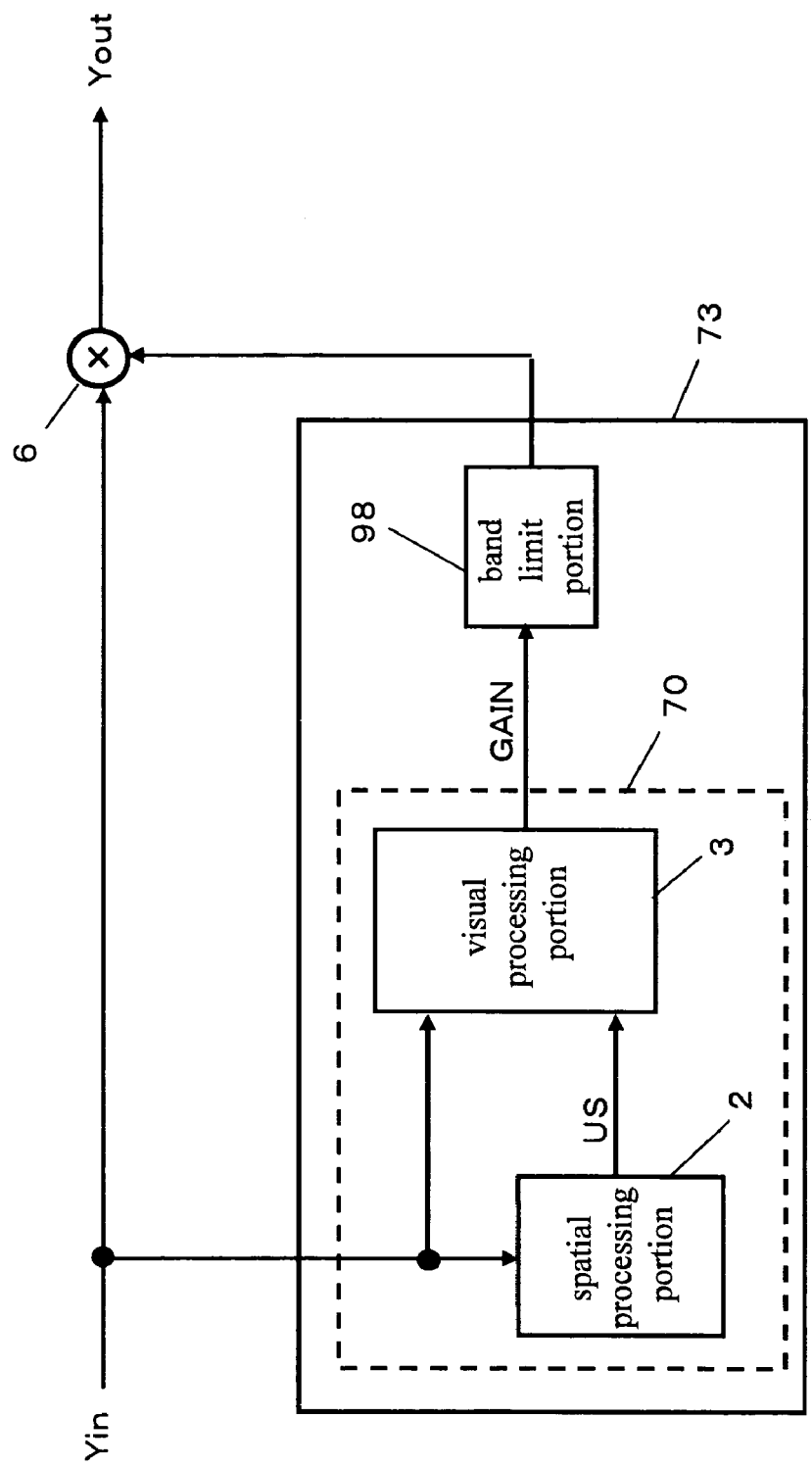
FIG. 22 is a block diagram showing the configuration of a gain-type visual processing portion serving as a fourth modified example.

Next, a modified example of the gain-type visual processing portion 71 is described as a fourth modified example using FIG. 22. FIG. 22 is a block diagram showing the configuration of a gain-type visual processing portion 73 serving as a fourth modified example.

In FIG. 22, the gain-type visual processing portion 73 is provided with a gain-type visual processing portion 70 that inputs the luminance signal Yin and outputs a gain signal GAIN for amplifying the luminance signal Yin, and a band limit portion 98 for limiting the band of the spatial frequency of the gain signal GAIN that is output from the gain-type visual processing portion 70. Here, in the gain-type visual processing portion 70, the spatial processing portion 2 creates an unsharp signal US from the luminance signal US, and the visual processing portion 3 creates a gain signal GAIN based on the luminance signal Yin and the unsharp signal US.

The band limit portion 98 executes band limit on the gain signal GAIN that is output from the gain-type visual processing portion 70.

The multiplication portion 6 multiplies the luminance signal Yin and the band-limited gain signal GAIN to yield a gradation-converted output signal Yout.

With this configuration as well, it is possible to create a gain signal GAIN whose spatial frequency band that can respond to the luminance signal Yin has been limited, and like the gain-type visual processing portion 71, a drop in the contrast of the output signal Yout can be suppressed even if the value (signal level) of the luminance signal Yin that has been input is changed by a value (signal level) that is significantly larger than the value (signal level) of the unsharp signal US.

It should be noted that the gain-type visual processing portion 71 can be substituted for the gain-type visual processing portion 70 of the first embodiment or the second embodiment.

It is also possible to substitute the gain-type visual processing portion 72 for the gain-type visual processing portion 70 of the first embodiment or the second embodiment.

It is also possible to substitute the gain-type visual processing portion 73 for the gain-type visual processing portion 70 of the first embodiment or the second embodiment.

Fourth Embodiment

Figure 23:
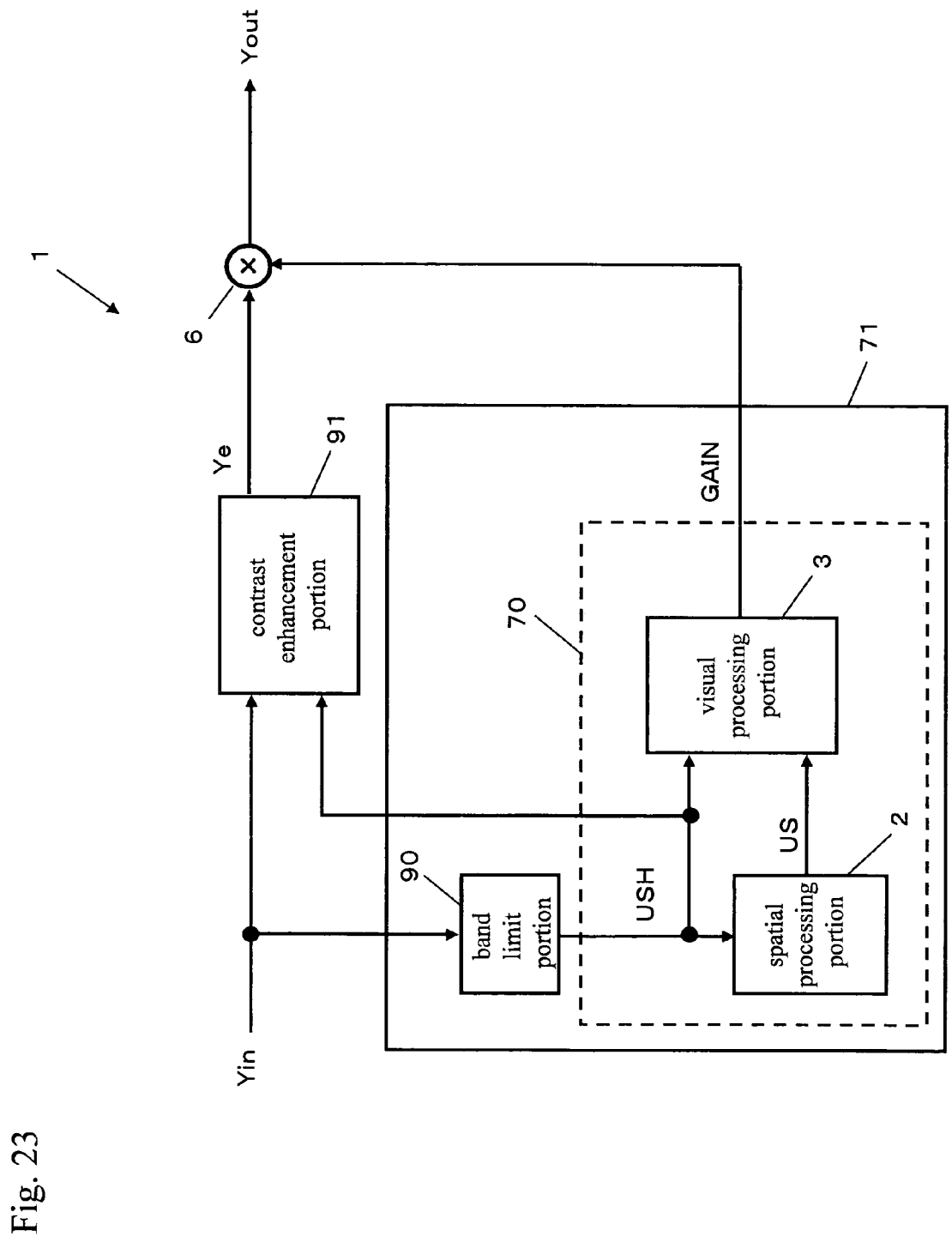
FIG. 23 is an explanatory diagram describing an example of the configuration when the visual processing device is provided with a contrast enhancement portion, in a fourth embodiment of the invention.
Figure 24:
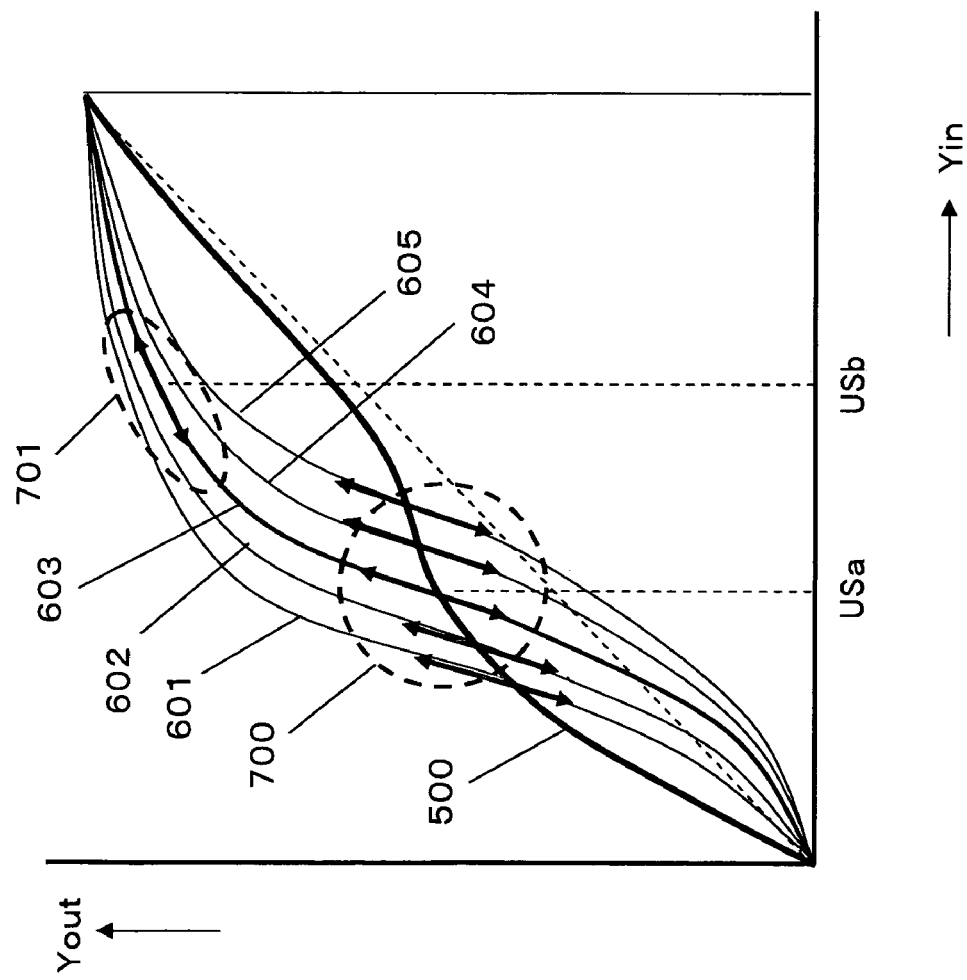
FIG. 24 is an explanatory diagram describing the grayscale conversion characteristics when contrast conversion is performed in the visual processing device of the same.
Figure 25:
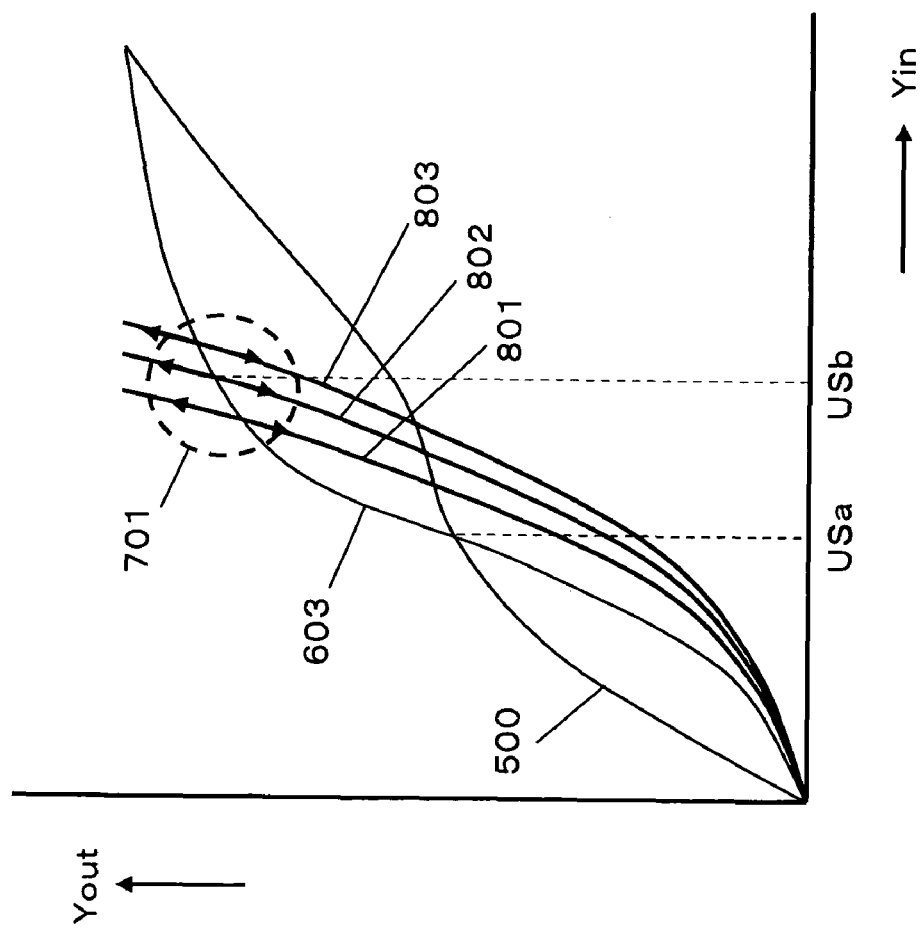
FIG. 25 is an explanatory diagram describing the characteristics of the contrast enhancement portion of the same.

Next, a configuration further provided with a contrast enhancement portion is described as a fourth embodiment of the invention using FIGS. 23 to 25.

FIG. 23 is an explanatory diagram for describing an example of the configuration when a contrast enhancement portion has been provided, FIG. 24 is an explanatory diagram describing the grayscale conversion characteristics, and FIG. 25 is an explanatory diagram for describing the characteristics of the contrast enhancement portion. Hereinafter, components that are the same as in the first through third embodiments have been assigned the same reference numerals as before and are not described in detail.

In FIG. 23, the visual processing portion 1 is further provided with a contrast enhancement portion 91 for outputting an enhanced signal Ye that is obtained by enhancing the luminance signal Yin.

This fourth embodiment describes a configuration in which the gain-type visual processing portion 70 of the first embodiment has been replaced by the gain-type visual processing portion 71.

In the gain-type visual processing portion 71, the gain-type visual processing portion 70 outputs a gain signal GAIN for amplifying the luminance signal Yin according to the band limited signal USH, whose band has been limited by the band limit portion 90. Here, in the gain-type visual processing portion 70, the spatial processing portion 2 creates an unsharp signal US from the band limited signal USH and the visual processing portion 3 creates the gain signal GAIN based on the band limited signal USH and the unsharp signal US.

The contrast enhancement portion 91 outputs an enhanced signal Ye that is obtained by enhancing the luminance signal Yin.

The multiplication portion 6 multiplies the gain signal GAIN and the enhanced signal Ye to yield an output signal Yout in which the contrast has been enhanced.

Thus, providing the contrast enhancement portion 91 allows the contrast of the luminance signal Yin to be enhanced, and allows a drop in the contrast of the output signal Yout to be suppressed even if the value of the luminance signal Yin that has been input is significantly brighter than the unsharp signal US. The contrast enhancement portion 91 will be discussed later.

First, a case in which the output signal Yout experiences a drop in contrast is described using FIG. 24. FIG. 24 is an explanatory diagram for describing the grayscale conversion characteristics when contrast conversion is performed by the visual processing device 1. The horizontal axis in FIG. 24 is the luminance signal Yin that has been input, and the vertical axis is the gradation-converted output signal Yout.

In FIG. 24, "USa" is the value of the unsharp signal US, which is the brightness information extracted from the target region 202 around the pixel in question 200. "USb" is the value of the brightness information near the pixel in question 200 that have been input at this time, and the luminance signal Yin also takes on a value near USb.

In the visual processing portion 3, the gradation curve 500 in FIG. 24 illustrates the output characteristics in a case where the value of the luminance signal Yin of the pixel in question 200 and the value of the unsharp signal US match, and is a curve that is determined by the gradation curve that has been selected based on the brightness information extracted from the target region 202 around the pixel in question 200. The change in the overall screen brightness is determined from the gradation curve 500.

The visual processing portion 3 selects the gradation curve represented by a gradation curve 603 when the value of the unsharp signal US is USa, selects a curve 601 or a curve 602 when the unsharp signal US is less than USa (the region around the pixel in question 200 is darker than USa), and selects a curve 604 or a curve 605 when the unsharp signal US is greater than USa (the region around the pixel in question 200 is brighter than USa).

In this way, the visual processing portion 3 selects the gradation curve that is represented by the gradation curve 603 when the value of the unsharp signal US is USa, and unless there is a change in the unsharp signal US, the output signal Yout for the value of the luminance signal Yin of the pixel in question 200 is output according to the gradation curve 603. Thus, with the visual processing portion 3, when the value of the luminance signal Yin of the pixel in question 200 is near USa (this corresponds to the region 700 in FIG. 24), the slope of the gradation curve 603 in the region 700 becomes steeper, and thus the change in the gain signal increases and the contrast of the output signal Yout is enhanced. However, with a configuration in which the band limit portion 90 is not provided, in the visual processing portion 3, when the value of the luminance signal Yin of the pixel in question 200 is about USb and is significantly larger than the value of the unsharp signal US, the slope of the gradation curve 603 flattens out (this corresponds to the region 701 in FIG. 24) and the change in the gain signal GAIN in the region 701 becomes small as well, and thus the contrast of the output signal Yout drops.

A method for suppressing a drop in the contrast of the output signal Yout in the region 701 is described next using FIG. 25. FIG. 25 is an explanatory diagram describing the characteristics of the contrast enhancement portion 91. The horizontal axis in FIG. 25 is the luminance signal Yin that has been input, and the vertical axis is the gradation-converted output signal Yout.

In FIG. 25, USa is the value of the unsharp signal US, which is the brightness information extracted from the target region 202 surrounding the pixel in question 200. The brightness near the pixel in question 200 is USb at this time, and the luminance value Yin also takes on a value near USb.

The visual processing portion 3 selects the gradation curve that is represented by the gradation curve 603 when the value of the unsharp signal US is USa, and unless there is a change in the unsharp signal US, the visual processing portion 3 determines the output signal Yout for the value of the band limited signal USH in which the band of the spatial frequency of the luminance signal Yin has been limited, and outputs this according to the gradation curve 603. Since the slope of the gradation curve 603 is steep near the value USa, the change in the gain signal GAIN also is large, and the contrast can be enhanced.

On the other hand, the band limited signal USH is the brightness USb near the pixel in question 200.

Thus, with the visual processing portion 3, even if the luminance signal Yin of the pixel in question 200 changes in a range around USb, which is significantly higher than the value of the unsharp signal US, the gain signal GAIN that is output by the visual processing portion 3 does not change because in that narrow region the value of the band limited signal USH is fixed at USb due to band limit. In other words, in the narrow region near the pixel in question 200, a substantially constant value (the slope near the line portion of the curve 603) is output as the gain signal GAIN. In this case, the gain signal GAIN is a substantially constant value, and thus the output signal Yout that is output is substantially proportional to the change in the signal level of the output signal Ye of the contrast enhancement portion 91. The contrast of the output signal Yout can be increased by performing grayscale conversion by multiplying the band-limited gain signal GAIN and the signal Ye obtained by the contrast enhancement portion 91 enhancing the contrast of the luminance signal Yin.

The contrast enhancement portion 91 is described next. The contrast enhancement portion 91 creates the enhanced signal Ye according to Formula II, based on the ratio between the luminance signal Yin and the band limited signal USH. Here, α is a parameter for adjusting the degree of enhancement.

$$Ye = Yin^{\alpha}/(USH)^{\alpha-1} \qquad \text{Formula II}$$

Thus, as shown in FIG. 25, when the band limited signal USH is equal to USb, the value of the luminance signal Yin can be enhanced according to the curve 802. When the band limited signal USH is less than USb, the value of the luminance signal Yin can be enhanced according to the curve 801, and when the band limited signal USH is greater than USb, the value of the luminance signal Yin can be enhanced according to the curve 803.

Setting the value of α in Formula II to greater than 1 (such as 1.5) magnifies the ratio between the value of the pixel in question 200 and the band limited signal USH, and thus enhances the contrast.

It should be noted that it is also possible for the contrast enhancement portion 91 to create the enhanced signal Ye according to Formula III, based on the difference between the luminance signal Yin and the band limited signal USH.

$$Ye = Yin + (\alpha-1) \times (Yin - USH) \qquad \text{Formula III}$$

With Formula III as well, adopting α value greater than 1 (such as 1.5) for α has the effect of magnifying the difference between the value of the pixel in question 200 and the band limited signal USH, and thus enhances the contrast.

Figure 26:
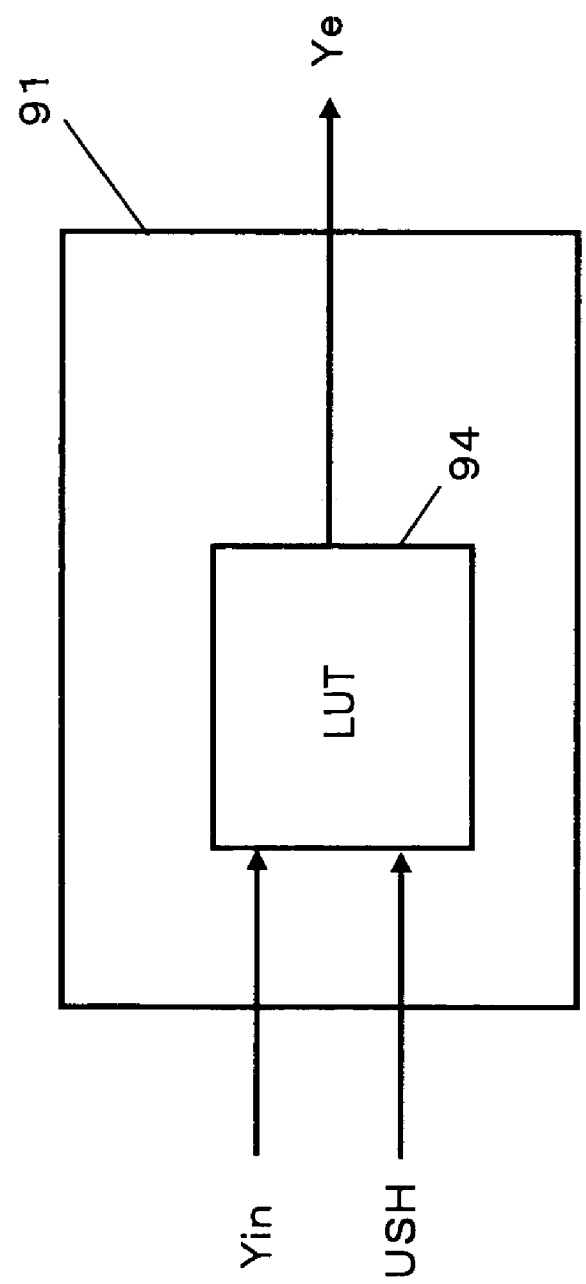
FIG. 26 is a block diagram showing the configuration of the contrast enhancement portion of the same.

As shown in FIG. 26, it is also possible for the contrast enhancement portion 91 to be provided with a 2D LUT whose elements are the luminance signal Yin and the band limited signal USH. The results of the computation according to Formula II or Formula III are found in advance and set to a LUT 94.

Thus, according to the fourth embodiment of the invention, providing the contrast enhancement portion 91 allows the contrast of the luminance signal Yin to be enhanced, and a drop in the contrast of the output signal Yout can be suppressed, even if the value (signal level) of the luminance signal Yin that has been input is changed by a value (signal level) that is significantly larger than the value (signal level) of the unsharp signal US.

Figure 27:
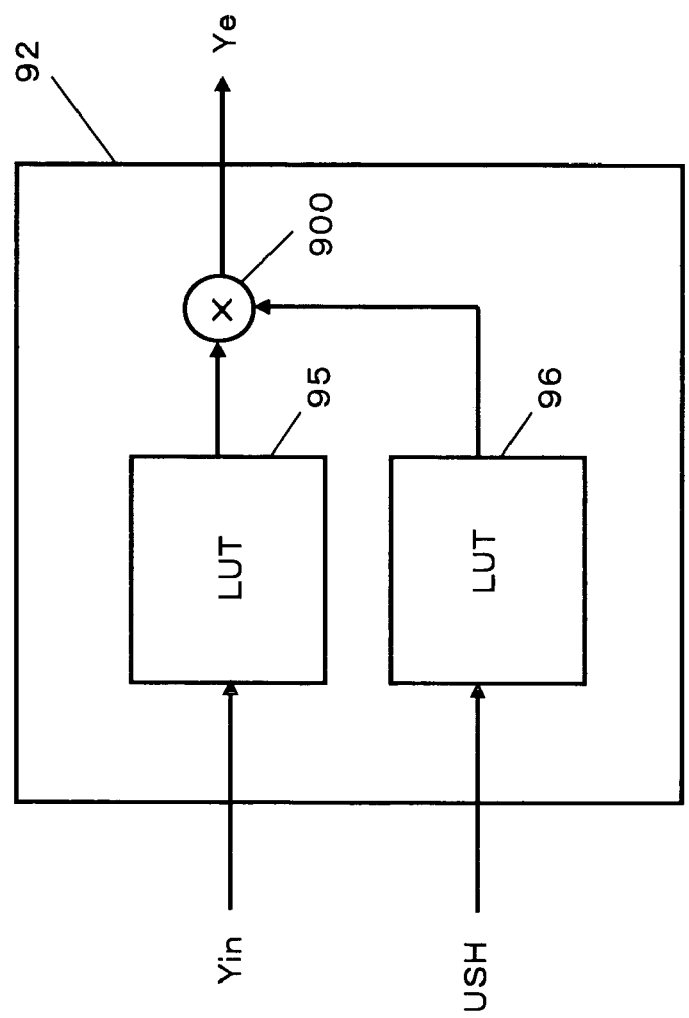
FIG. 27 is a block diagram showing the configuration of the contrast enhancement portion serving as a fifth modified example.

A modified example of the contrast enhancement portion 91 serving as a fifth modified example is shown in FIG. 27. FIG. 27 is a block diagram showing the configuration of a contrast enhancement portion 92 serving as a fifth modified example.

In FIG. 27, the contrast enhancement portion 92 employs a LUT 95, a LUT 96, and a multiplication portion 900 to accomplish the computation of Formula II. Here, the results of the computation $Yin^{\alpha}$ are set in the LUT 95, and the results of the computation $(USH)^{1-\alpha}$ are set in the LUT 96.

Figure 28:
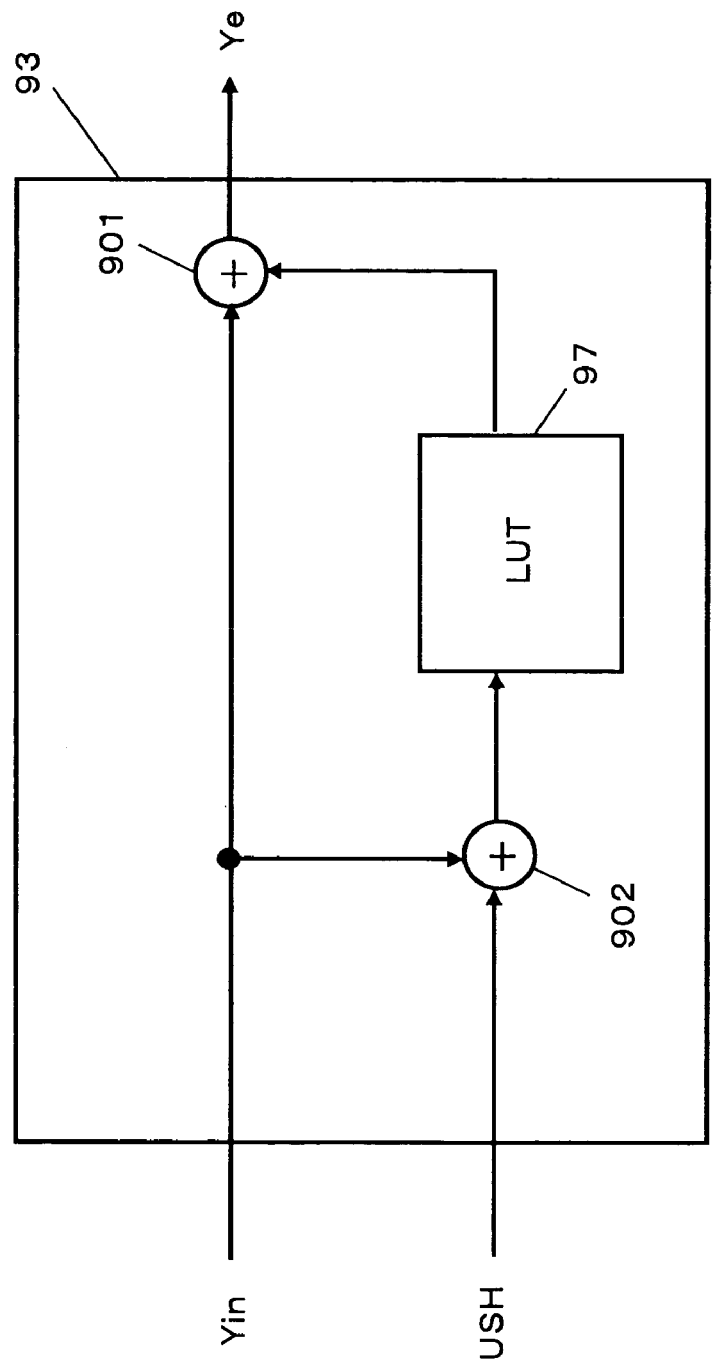
FIG. 28 is a block diagram showing the configuration of the contrast enhancement portion serving as a sixth modified example.

A modified example of the contrast enhancement portion 91 serving as a sixth modified example is shown in FIG. 28. FIG. 28 is a block diagram showing the configuration of a contrast enhancement portion 93 serving as a sixth modified example.

In FIG. 28, the contrast enhancement portion 93 achieves the computation of Formula III through an addition portion 901, an addition portion 902, and a LUT 97. Here, data on the output characteristics, such as those shown in FIG. 25, are set in the LUT 97. The horizontal axis of FIG. 29 is the input of the LUT 97, and the vertical axis is the output of the LUT 97.

Figure 29:
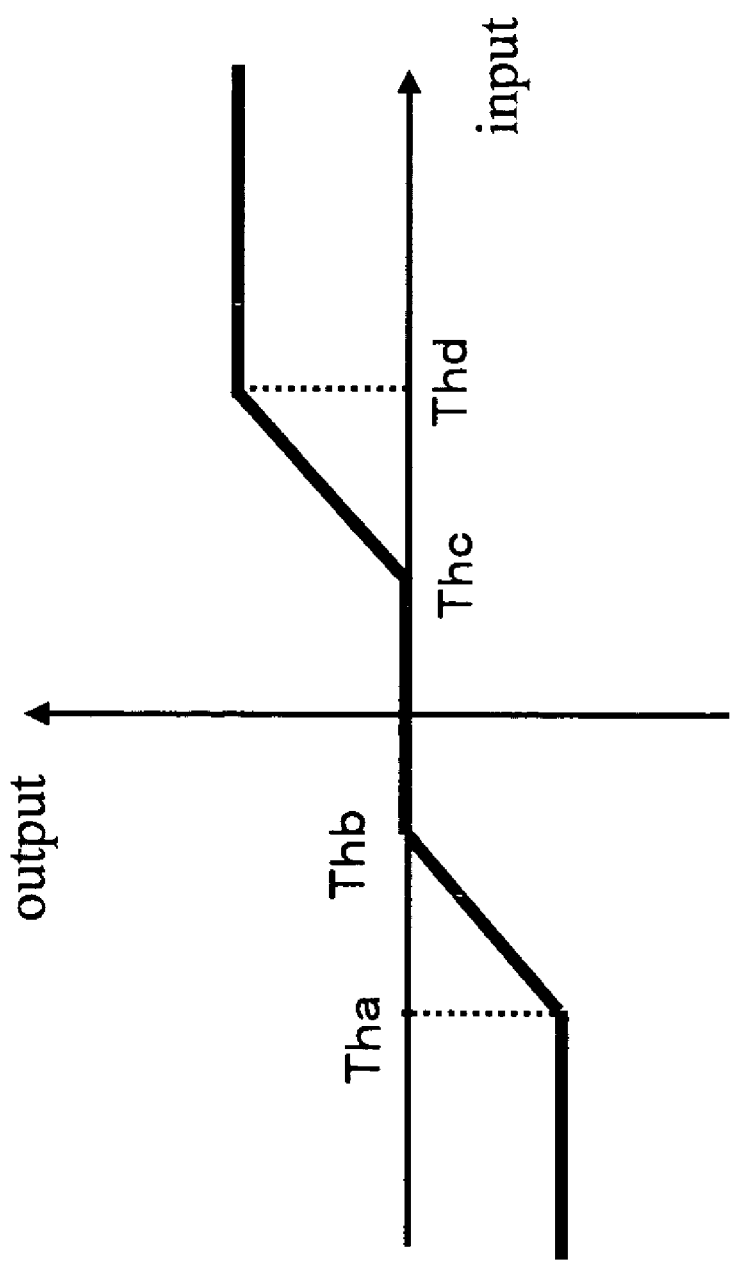
FIG. 29 is an explanatory diagram describing the characteristics of the contrast enhancement portion of the sixth modified example.

As illustrated in FIG. 29, in the LUT 97 the output is set to 0 during the period that the input is from Thb is Thc, so as to keep noise from being enhanced. Further, in the LUT 97, the output increase gradually while the input is from Tha to Thb, and likewise, the output increases gradually while the input is from Thc to Thd. To keep from over-enhancing the contrast, the output is increased until the input is Tha or Thd, and when the difference between the luminance signal Yin and the band limited signal USH is greater than this, the output becomes saturated. It should be noted that in lieu of the LUT 97, it is also possible to provide a multiplication portion and for the multiplication portion to modify the output of the addition portion 902 by a factor of (α−1).

It should be noted that the band limited signal USH that is input to the contrast enhancement portion 91 serves as the output of the band limit portion 90 of the gain-type visual processing portion 71, but this configuration is not a limitation.

Figure 30:
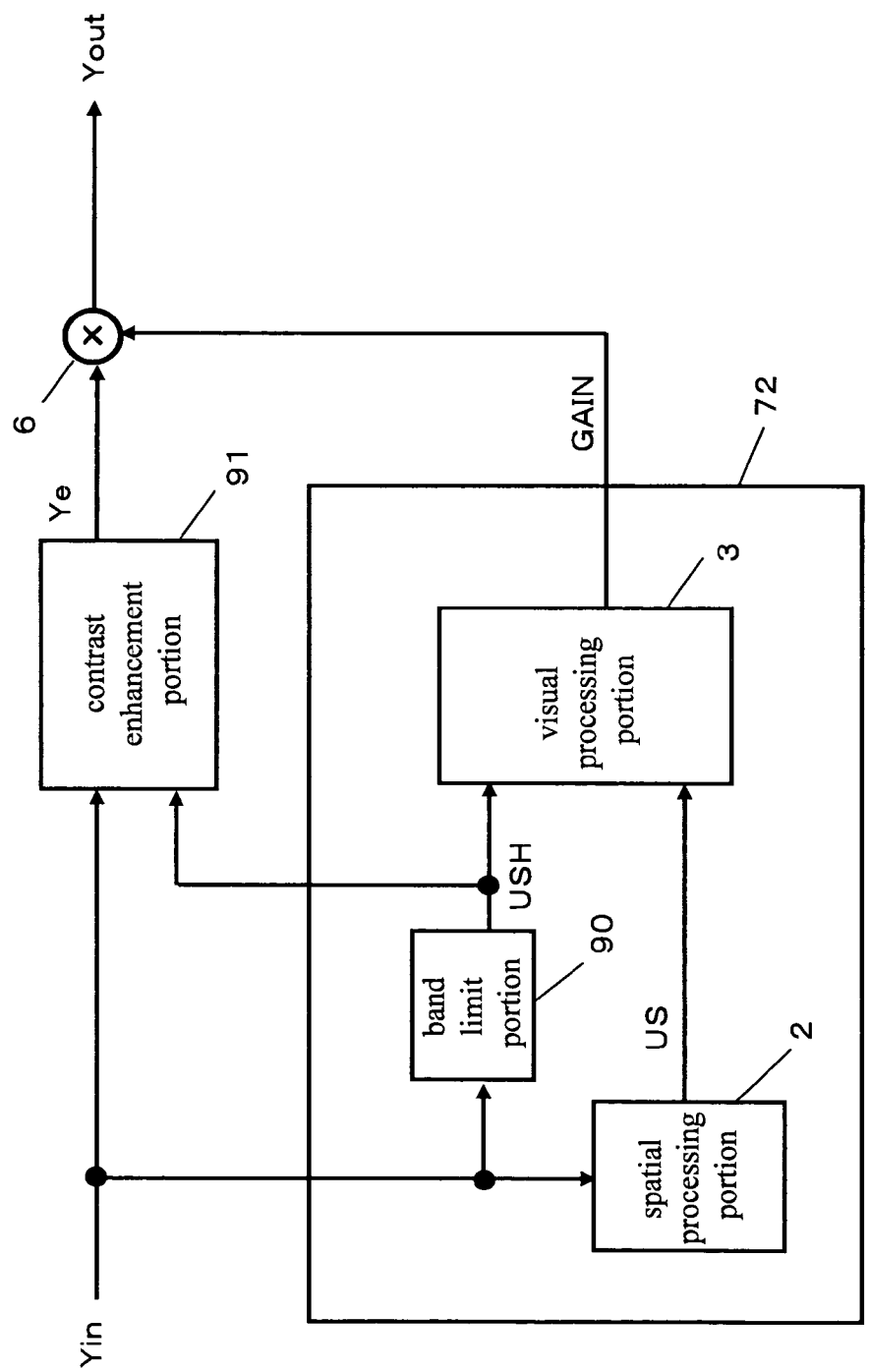
FIG. 30 is a structural diagram showing a configuration including the contrast enhancement portion serving as a seventh modified example.

A modified example 7 is a modified example of the configuration, and in the configuration shown in FIG. 30, it is possible to use the output of the band limit portion 90 of the gain-type visual processing portion 72.

Figure 31:
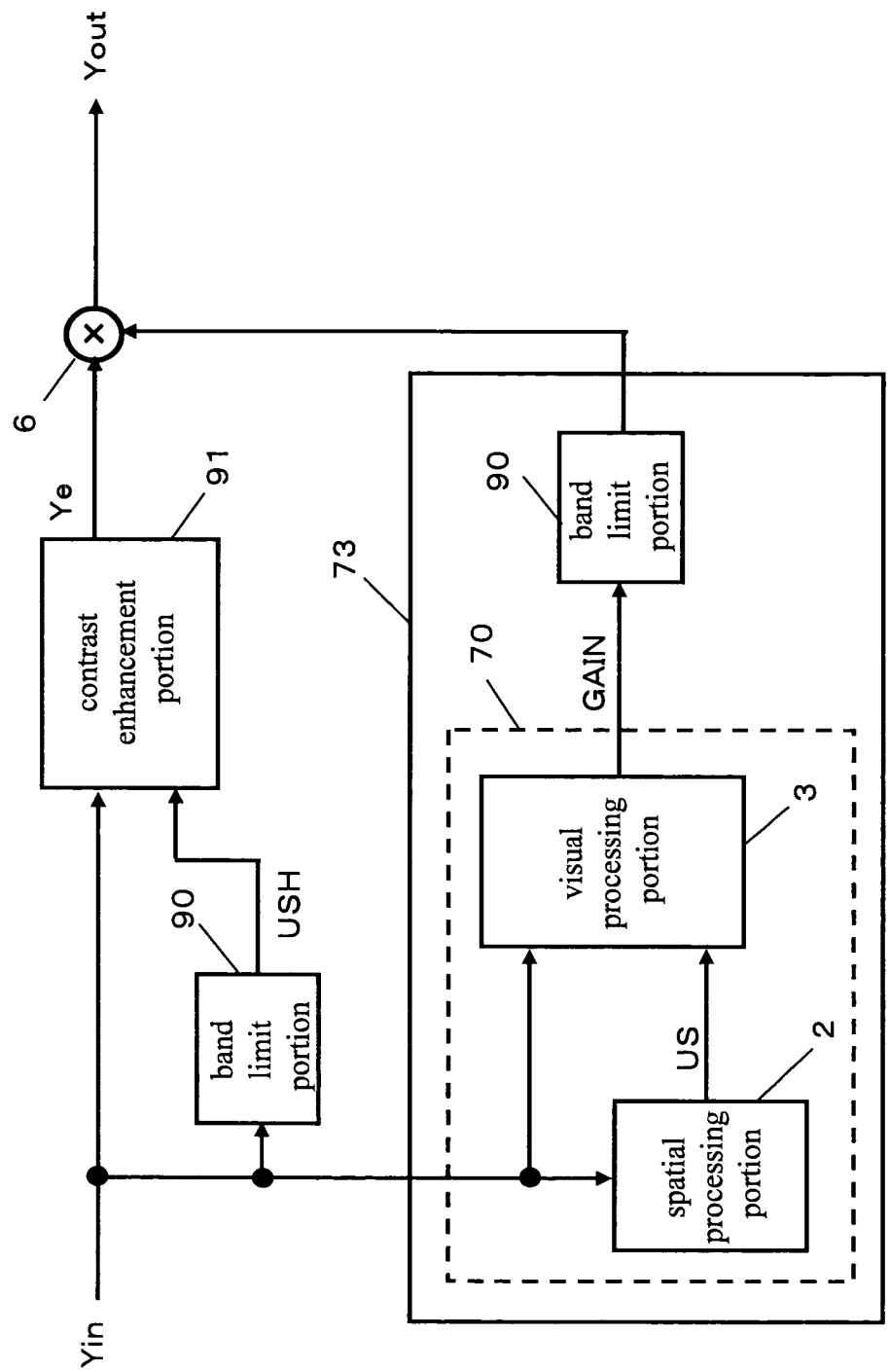
FIG. 31 is a structural diagram showing a configuration including the contrast enhancement portion serving as an eighth modified example.

A modified example 8 is a modified example of the configuration, and in the configuration shown in FIG. 31, it is possible to use the band limited signal USH of the band limit portion 90 that is provided independent of the gain-type visual processing portion 73.

Thus, according to the first through fourth embodiments of the invention, it is possible to provide visual processing devices, display devices, image-capturing devices, portable information devices, and integrated circuits, in which it is possible to inhibit color saturation and adjust the contrast of the image.

Figure 32:
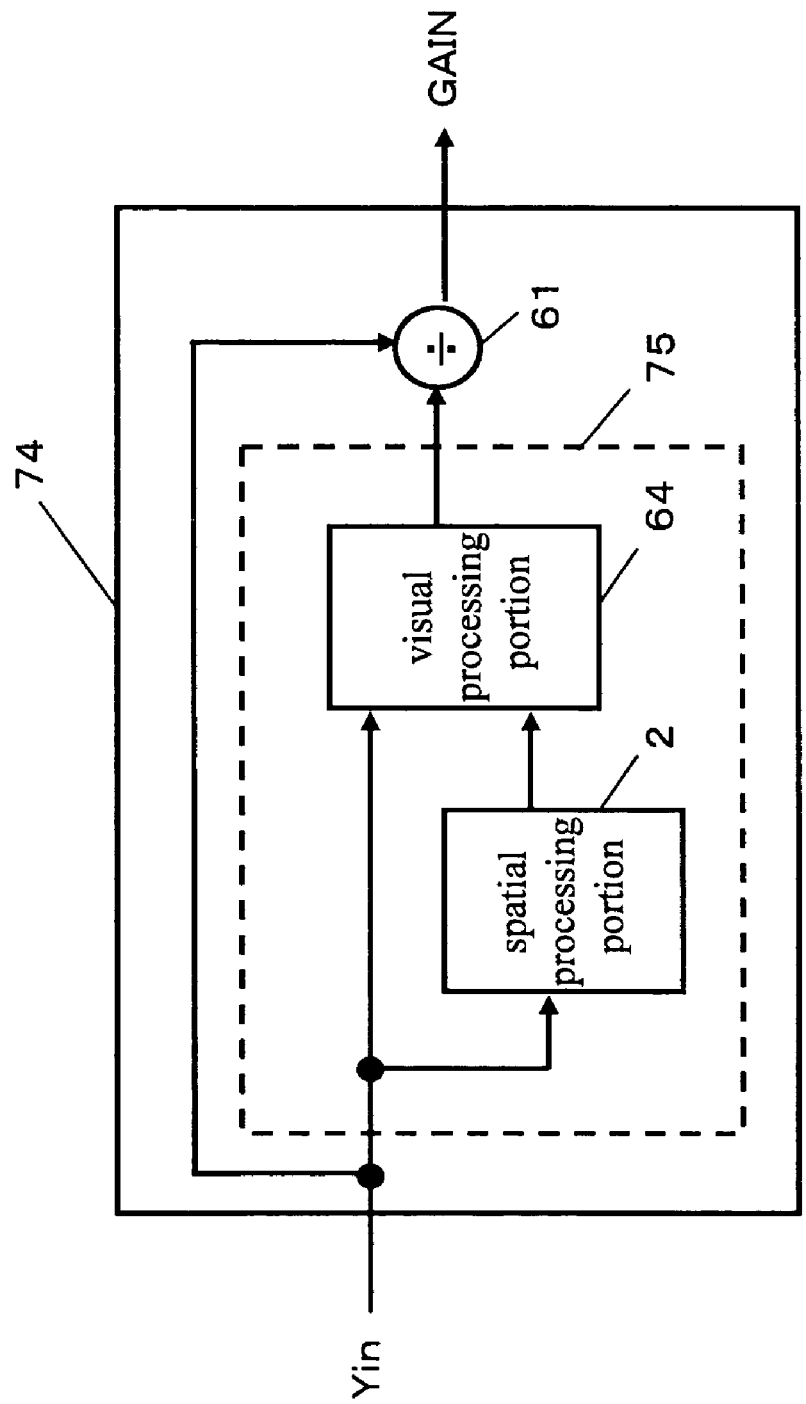
FIG. 32 is a block diagram showing another modified example of the gain-type visual processing portion according to an embodiment of the invention.

It should be noted that, as shown in FIG. 32, a gain-type visual processing portion 74 also can be achieved using a gradation-type visual processing portion 75 that outputs an output signal Yout that is obtained by converting the gradation of the luminance signal Yin.

If the gradation-type visual processing portion 75 is used, it is possible to achieve the gain-type visual processing portion 74 by providing the gradation-type visual processing portion 75 and a division portion 61 for dividing the output of the gradation-type visual processing portion 75 by the luminance signal Yin.

The gradation-type visual processing portion 75 is furnished with the spatial processing portion 2 for outputting an unsharp signal US from the luminance signal Yin, and a visual processing portion 64 that performs grayscale conversion according to the luminance signal Yin and the unsharp signal US and outputs an output signal Yout. The visual processing portion 64 outputs the output signal Yout based on two-dimensional grayscale conversion characteristics such as those shown in FIG. 2. Thus, the gain-type visual processing portion 74 has characteristics that are equivalent to those of the gain-type visual processing portion 70 of the first embodiment of the invention, and can be used as a substitute for the gain-type visual processing portion 70.

Fifth Embodiment

A visual processing device according to a fifth embodiment is described next.

Figure 33:
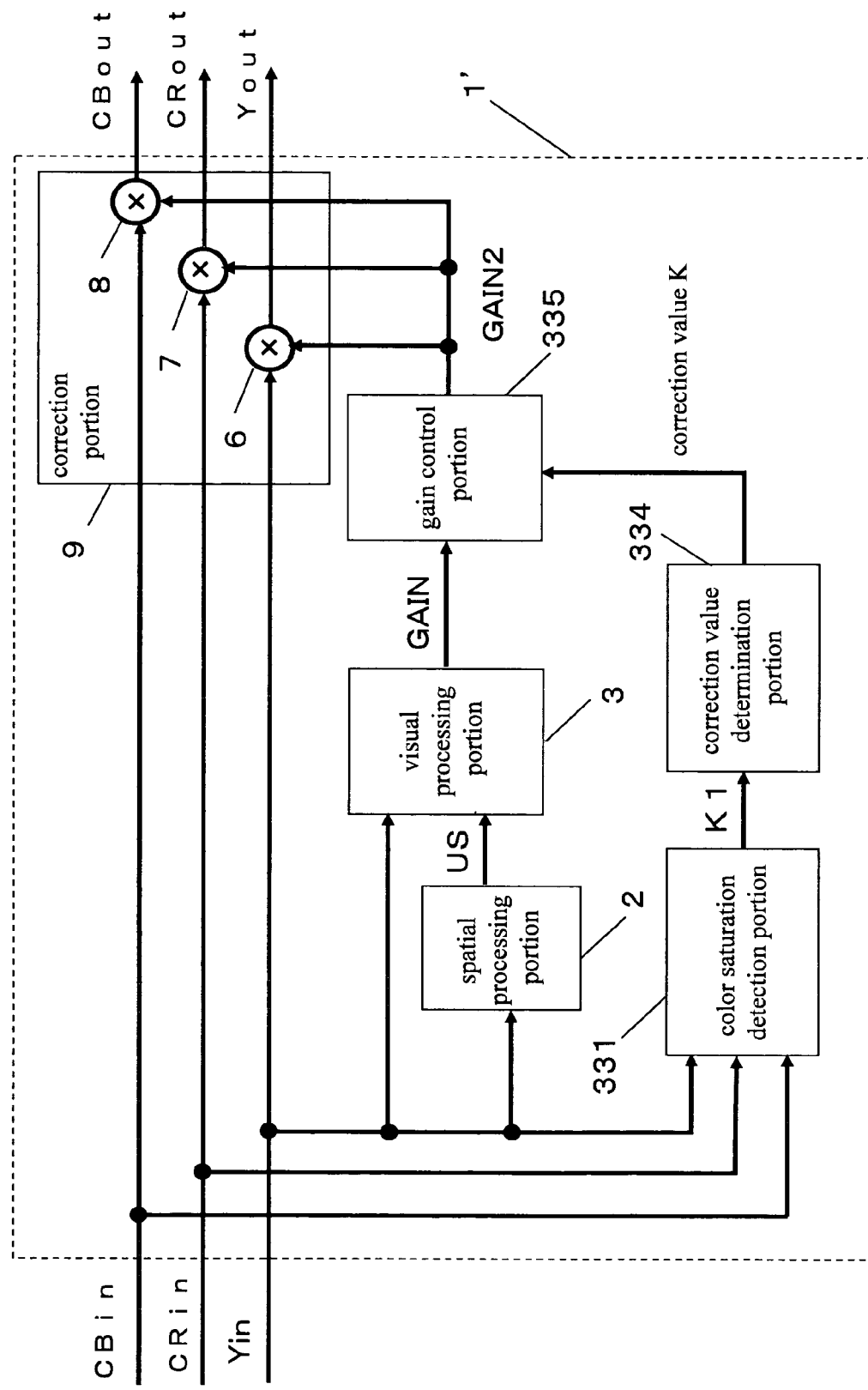
FIG. 33 is a block diagram of a visual processing device according to a fifth embodiment of the invention.

FIG. 33 is a block diagram of a visual processing device 1' according to a fifth embodiment of the invention. The visual processing device 1' performs visual processing on image signals Yin, CRin, and CBin, and outputs visually-processed images Yout, CRout, and CBout.

The spatial processing portion 2 obtains the pixel values of target pixels to be targeted for spatial processing, and pixels in the region around the target pixels (surrounding pixels), from the luminance signal Yin. It then executes spatial processing on the luminance value Yin for each pixel of the original image that has been obtained, and outputs unsharp signals US. The unsharp signals US are blur signals that are obtained by processing the luminance signals with a low-pass filter.

The visual processing portion 3 obtains the first gain signal GAIN from the luminance signal Yin and the unsharp signal US through a two-dimensional gain function, and outputs the first gain signal GAIN.

The two-dimensional gain function is set to a function in which the slope of the grayscale conversion characteristics shown in FIG. 2, for example, is the gain. Thus, by multiplying the luminance signal Yin and the output that is calculated by the two-dimensional gain function, it is possible to output input/output characteristics that are equivalent to the grayscale conversion characteristics shown in FIG. 2.

A correction value determination portion 334 calculates a correction value K for correcting the first gain signal GAIN. The correction value K corrects the image signal, enhancing or suppressing the contrast. For example, it is possible to brighten a dark image or to suppress the brightness in a bright image and thereby inhibit grayscale saturation and color saturation.

A gain control portion 335 corrects the first gain signal GAIN in pixel units using the correction value K, and outputs a second gain signal GAIN2. By correcting the first gain signal GAIN with the correction value K, it is possible to create a second gain signal GAIN2 for enhancing or suppressing the contrast without changing the first gain signal GAIN.

The correction portion 9 is made of a multiplication portion 6, a multiplication portion 7, and a multiplication portion 8, and corrects the image signal according to the second gain signal GAIN2. Due to this correction, the contrast of the image signal is enhanced or suppressed.

The multiplication portion 6 multiplies the second gain signal GAIN2 and the luminance signal Yin, and outputs a corrected luminance signal Yout. This corrected luminance signal Yout is an output equivalent to the grayscale conversion characteristics shown in FIG. 2. The multiplication portion 7 and the multiplication portion 8 multiply the second gain signal GAIN2 and the input color signals CRin and CBin, respectively, and output a corrected color signal CRout and a corrected color signal CBout.

Next, the visual processing device 1' of the fifth embodiment is described in further detail.

In this embodiment, the visual processing device 1' is set so as to have the two-dimensional grayscale conversion characteristics shown in FIG. 2. Here, the horizontal axis of FIG. 2 is the luminance signal Yin that is input, and the vertical axis is the converted luminance signal Yout.

The visual processing portion 3 is the same as that described in the first embodiment, and thus will not be described here.

The visual processing device 1' of the fifth embodiment of the invention performs image signal processing using gain signals, and by using gain signals there is the advantage that the scale of the circuit can be reduced. This matter also has been discussed already in the first embodiment, and thus will not be described here.

The spatial processing portion 2 also is the same as that described in the first embodiment, and thus will not be described here.

Figure 34:
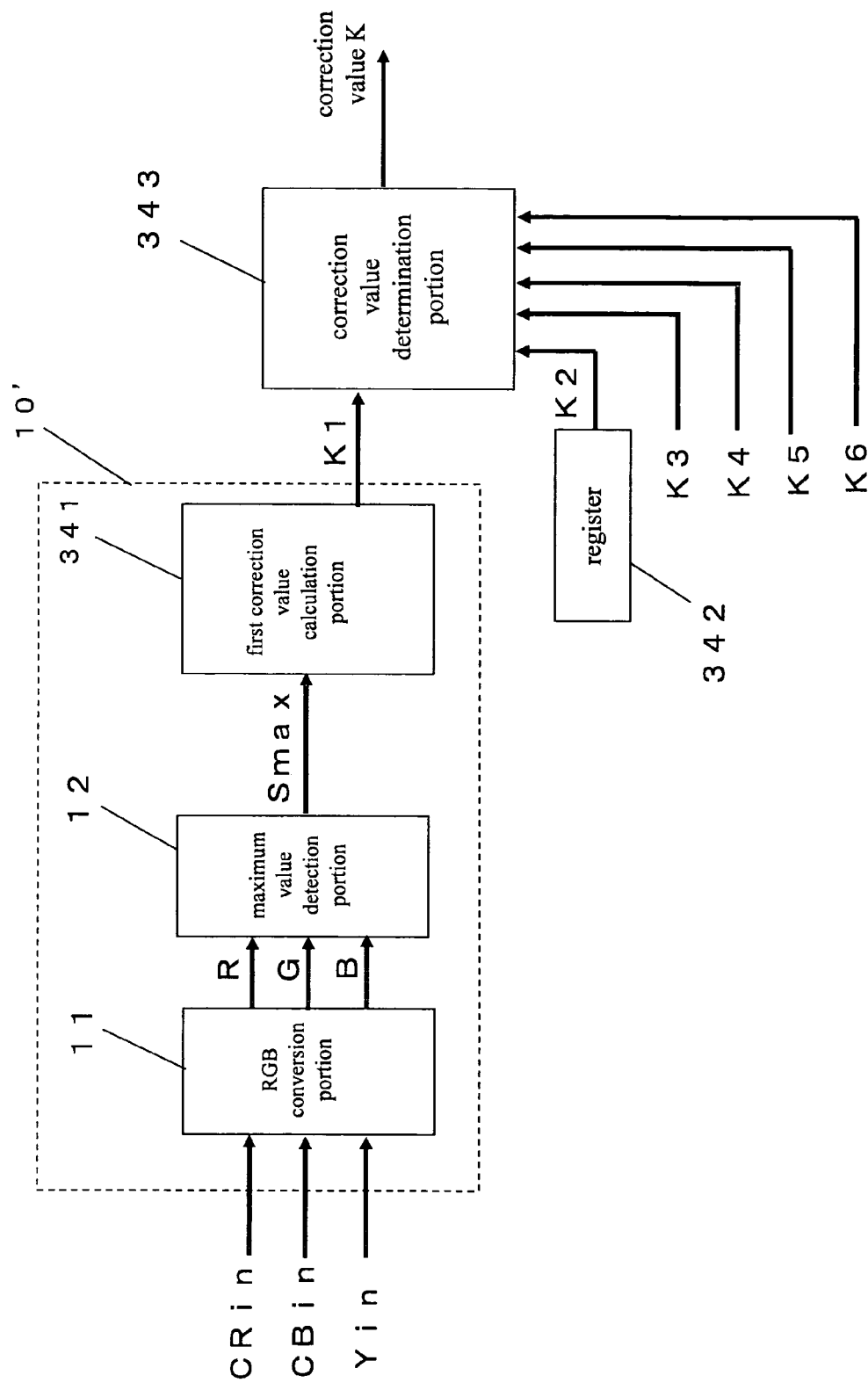
FIG. 34 is a block diagram of the color saturation detection portion of the fifth embodiment.

A color saturation detection portion 331 is described next using FIG. 34 and FIG. 35. FIG. 34 is a block diagram of the color saturation detection portion 331.

In FIG. 34, the RGB conversion portion 11 creates an RGB signal from the luminance signal Yin and the color signals CRin and CBin. The maximum value detection portion 12 detects the highest value among the R signal, the G signal, and the B signal. A first correction value calculation portion 341 calculates a first correction value K1 from the maximum value of the RGB signal that has been detected. A correction value determination portion 334 determines the correction value K in reference to the correction value K1, a correction value K2 that has been set in a register 342, and correction values K3 to K6 that have been input from the outside, and outputs the correction value K. The correction value determination portion 334 is described in detail later.

Figure 35:
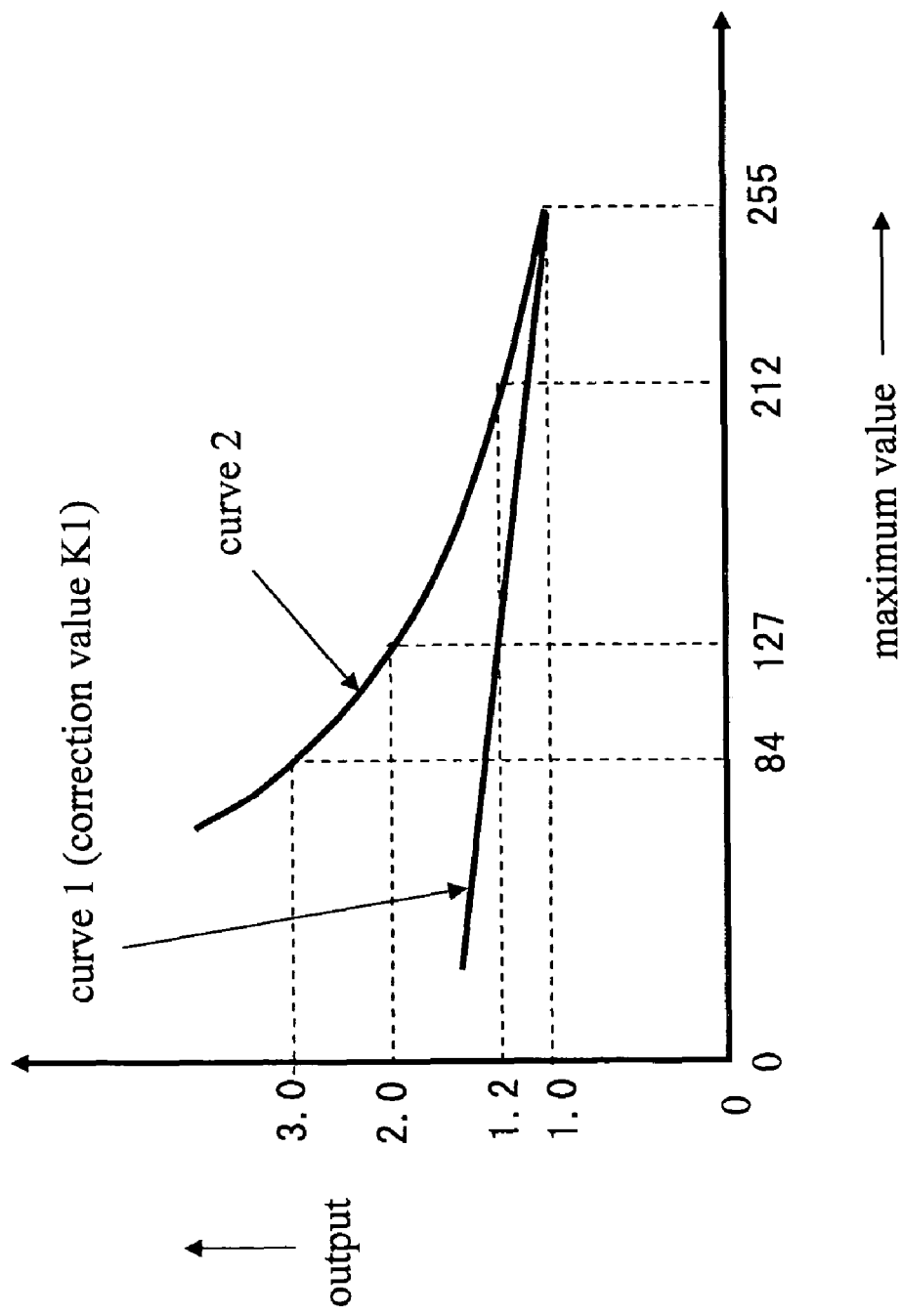
FIG. 35 is an explanatory diagram of the first correction value calculation portion of the fifth embodiment.

Specifically, the first correction value calculation portion 341 calculates a correction value K1 for each pixel of the image signal that has been input based on a curve 1 that has been set so that the maximum value of the gain signal GAIN2 after control is equal to or lower than the value of the curve 2 shown in FIG. 35. Here, curve 2 indicates the maximum value of the correction value that does not cause color saturation.

As long as the ratio of the R signal, the G signal, and the B signal of the RGB signal can be kept constant, the color will not change even if the RGB signal is multiplied by the first gain signal GAIN. However, when the maximum value of any one of the signals is saturated, the signal level cannot be increased further and thus the balance of the ratio of the RGB signals is disrupted and an unnatural color change occurs as a result. To prevent such color saturation, the maximum value of the signal level should not be exceeded, even when the maximum value of the RGB signals is multiplied by the first gain signal GAIN. For example, the maximum value after gain control may be set to 2.0 when the maximum value of the RGB signal that has been detected is 127. Similarly, the maximum value after gain control is 3.0 when the maximum value is 84, and the maximum value after gain control is 1.2 when the maximum value is 212. Here, the RGB signal is a signal with a range of 0 to 255. Thus, taking Smax as the maximum value of the RGB signal, and Kmax as the maximum value of the gain signal GAIN2 after control in which grayscale saturation and color saturation have been suppressed, Kmax=255/Smax.

In this way, grayscale saturation and color saturation can be inhibited and the color balance can be maintained by setting the correction value K1 (curve 1) to satisfy the condition of gain signal GAIN2<Kmax (curve 2). In addition, unnatural color changes do not occur in the image when its contrast is enhanced. The method of gain control employing the correction value K is discussed in detail later.

It should be noted that the curve 1 of the correction value K1 can be a straight line approximation, or a straight line that is a broken line approximation, of curve 2. When the maximum value of the RGB signal is a small value, preferably it is kept to a value that does not enhance the noise.

In this way, the Yin signal, the CBin signal, and the CRin signal are converted to RGB signals, and from the RGB signals it is possible to determine whether or not grayscale saturation and color saturation, for example, will ultimately occur in the image when displayed by a display device or the like. That is, since the signals that are ultimately displayed on the display device or the like are RGB signals, by obtaining RGB signals in advance and determining whether or not grayscale saturation and color saturation, for example, will occur in the RGB signals, it is possible to reliably know in advance the state of the image that will ultimately be displayed on the display device or the like. Thus, the procedure of obtaining the RGB signals in advance from the Yin signal, the CBin signal, and the CRin signal, and performing gain control through the correction value K based on the RGB signals that have been obtained, is effective.

The operation of the correction value determination portion 334 is described next using FIG. 36 and FIG. 37. It is also possible for the correction value determination portion 334 to receive the correction values K1 to K6 as input and perform computations to determine a correction value K that corresponds to the image type of the image signal, the characteristics of the image, and the self-diagnosis of the integrated circuit.

Figure 36:
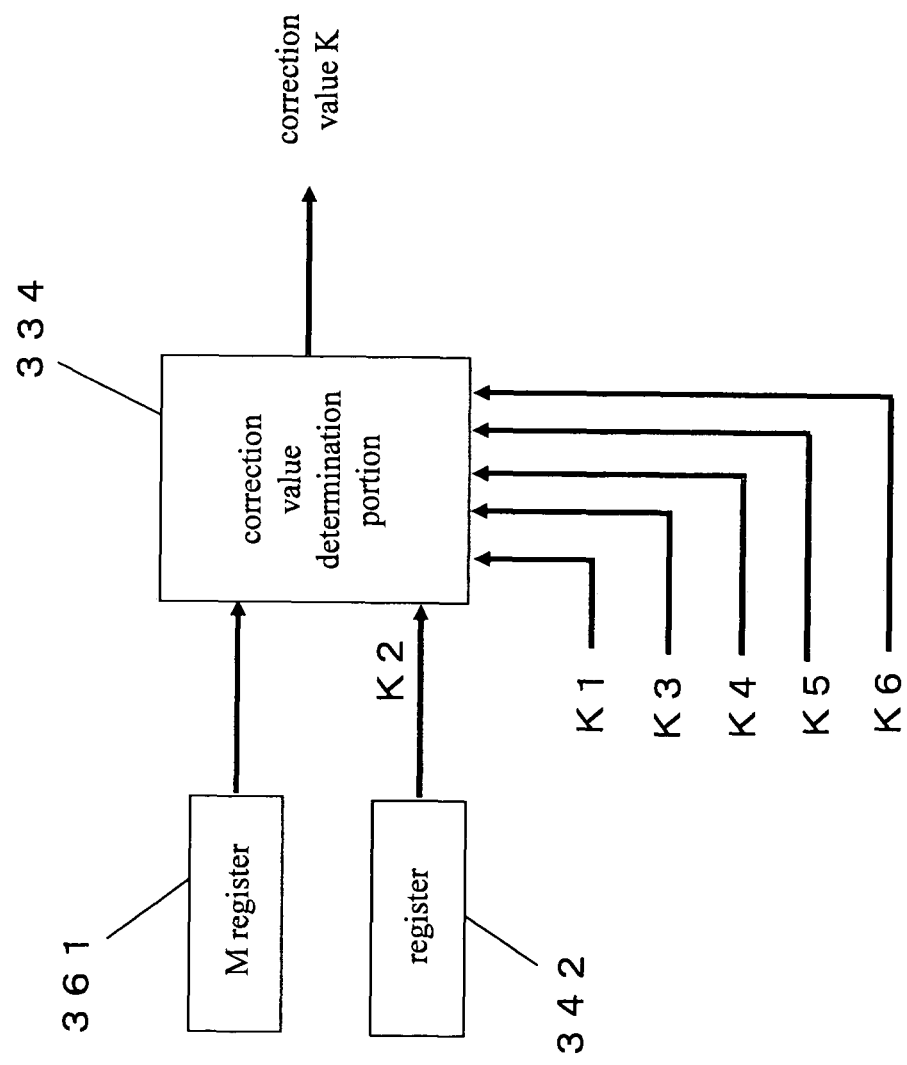
FIG. 36 is an explanatory diagram of the correction value determination portion of the visual processing device of the fifth embodiment.

In FIG. 36, the M register 23 chooses the operation mode of the correction value determination portion 334. For example, when the value 2 is set in the M register 23 as shown in Table 371 of FIG. 37, the correction value determination portion 334 inputs the value of the correction value K2, which has been set to a register 342. Thus, the correction value K is set to the constant correction value K2, and when an unsatisfactory abnormality is observed in the visually processed image, the internal signals K1 and K3 to K6 of the integrated circuit can be masked to set the correction value K2 from the outside in order to perform a self-diagnosis such as evaluating the impact of the correction value. It is also possible to forcibly set the correction value K to the correction value K2 by masking the internal signals K1 and K3 to K6, and thus it can be used as a test signal for confirming the signals in the integrated circuit.

If the M register 23 is set to the value 1, then the correction value determination portion 334 receives the correction value K1 as input and outputs K1 as the correction value K. Similarly, if the M register 23 is set to the value 3, then the correction value determination portion 334 receives the correction value K3 as input and outputs K3 as the correction value K. If the M register 23 is set to the value 7, then the correction value determination portion 334 receives the correction values K1 and K3 as input and performs a computation with K1 and K3 and outputs the correction value K. This computation can be a computation for calculating the minimum value MIN (K1,K3), or can be a computation for calculating the average value Ave (K1,K3).

Thus, the correction value determination portion 334, depending on the value that has been set to the M register 23, can select and output a signal that has been input from the outside, or perform a computation and then output the correction value K. The correction values K3 to K6 that are input from the outside are described in detail later.

It should be noted that if the correction value determination portion 334. selects and outputs a signal that has been input from the outside, then it is possible to use the correction value that has been input as it is as the correction value K, and it is also possible to obviate the correction value determination portion 334.

Next, the gain control portion 335 corrects the first gain signal GAIN with the correction value K, and outputs a second gain signal GAIN2.

The method of control through the correction value K that has been set will be described in more specific detail.

Figure 38:
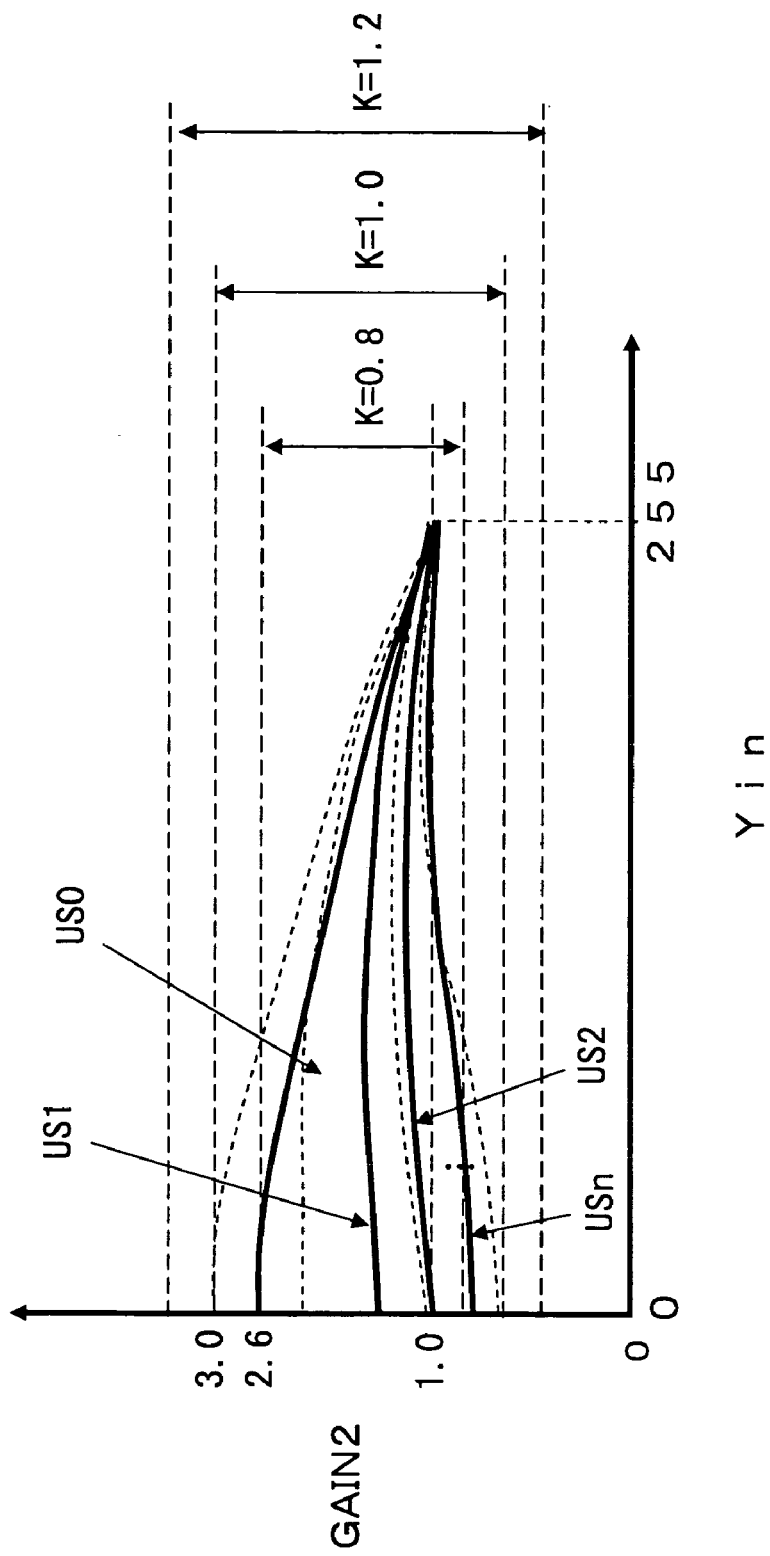
FIG. 38 is an explanatory diagram of the gain correction value for the gain characteristics in the fifth embodiment.

First, for example, as shown in FIG. 38, there exists the method of performing control by interpolating or extrapolating the gain ×1 signal and the gain signal GAIN with the correction value K (hereinafter, this is referred to as interpolation/extrapolation control). Here, interpolation or extrapolation is executed in such a manner that the gain signal GAIN2=correction value K×gain signal GAIN+(1−correction value K)×1. As regards the computation for controlling the gain signal, the computation is extrapolation if K>1 and the gain signal is enhanced, the computation is multiplication by 1 if K=1, and the computation is interpolation if 0<K<1 and the gain signal is suppressed. It is also possible to change the formula to GAIN2=correction value K×(gain signal GAIN−1)+1. In both cases, correction is performed with the correction value K so that the difference between the ×1 signal and the gain signal GAIN is either magnified or reduced.

It should be noted that color saturation can be suppressed by setting the correction value K so that GAIN2<Kmax. In terms of picture quality, if K>1 then the contrast becomes strong and is enhanced, and if 0<K<1 then the contrast becomes weak and is suppressed. To curtail color saturation, it is sufficient for 0<K<1 so as to suppress the contrast.

Figure 39:
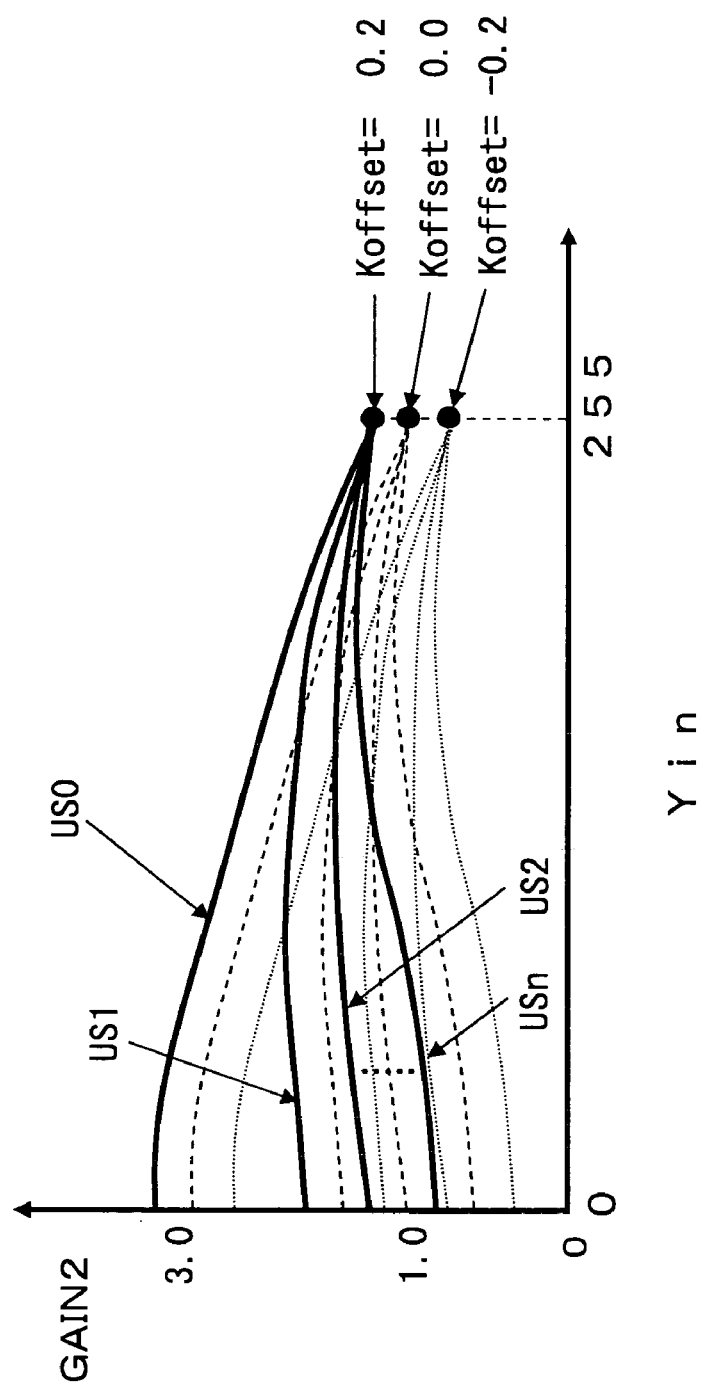
FIG. 39 is an explanatory diagram of the gain correction value for the grayscale characteristics in the fifth embodiment.

Another example of a method for controlling the correction value is to perform control by adding a control value K (Koffset) as shown in FIG. 39. Here, the gain signal GAIN2 is expressed by GAIN2=correction value K+gain signal GAIN.

Additionally, to suppress color saturation, the correction value K is set so that GAIN2<Kmax.

Thus, if K>0 then control for enhancing the gain is performed, if K=0 then no correction is performed, and if K<0 then control for suppressing the gain is performed. In terms of the picture quality, if K>0 then the contrast becomes strong and is enhanced, and if K<0 then the contrast becomes weak and is suppressed. To curtail color saturation, K<0 in order to suppress the contrast.

It should be noted that in a method for controlling amplification/attenuation using a multiplication value, GAIN2 is expressed as GAIN2=correction value K×gain signal GAIN. Further, to stem color saturation, it is also possible to set the correction value K so that GAIN2<Kmax.

In this way the gain control portion 335 corrects the first gain signal GAIN with the correction value K and outputs a second gain signal GAIN2, and thus it is possible enhance as well as suppresses the overall contrast of the image.

Next, the correction portion 9 corrects the image signal according to the second gain signal GAIN2. The correction portion 9 is made of the multiplication portion 6, the multiplication portion 7, and the multiplication portion 8.

The multiplication portion 6 multiplies the second gain signal GAIN2 and the luminance signal Yin, and outputs a luminance signal Yout. The multiplication portion 7 and the multiplication portion 8 multiply the second gain signal GAIN2 and the color signals CRin and CBin, respectively, and output color signals CRout and CBout.

It should be noted that each of the Yout signal, the CRout signal, and the CBout signal are obtained through multiplication with the same gain value, that is, GAIN2, by one of the multiplication portions (multiplication portions 6 to 8) and are output from the correction portion 9, and thus discrepancies in the output timing of the Yout signal, the CBout signal, and the CRout signal do not occur. Consequently, it is not necessary to provide separate delay means or the like for synchronizing the output timing of the Yout signal, the CBout signal, and the CRout signal.

In this way, the correction portion 9 corrects the image signal. Thus, in brightness adjustment, the correction portion 9 also increases the color signals in the areas in which it increases the luminance level, and thus the color does not appear light in these areas. Conversely, it also reduces the color signal in the areas in which it reduces the luminance level, thus the color does not appear dark in these areas. Further, by correcting the input image signal based on the second gain signal GAIN2, it is possible to inhibit color saturation in areas where the luminance level has been increased. It is also possible to control the second gain signal GAIN2 with the correction value to correct toward a brighter image so that only the darkened facial regions of people in backlit images, for example, are enhanced.

It should be noted that it is also possible for the visual processing portion 3 of the visual processing device 1' (FIG. 33) to input only the luminance signal Yin, and to output a gain signal that is equivalent to the output obtained by performing gamma conversion of the luminance signal Yin. With this configuration, the visual processing portion 3 can be constituted by a LUT storing data having one-dimensional gain characteristics. More specifically, the data stored in the LUT can be obtained by selecting a conversion curve having any one of the gain characteristics of US0 to USn in FIG. 3, or the data can be created through a one-dimensional gain function that has been set in advance. It is also possible to create the data to be stored in the LUT using a gain function that yields an output that is equivalent to the grayscale conversion curve that is found from the histogram distribution of the luminance signal in the image.

Thus, due to the visual processing portion 3 storing data based on the gain characteristics, it is possible to reduce the memory capacity more than if the gamma correction values are stored as tabulated data as they are.

Figure 40:
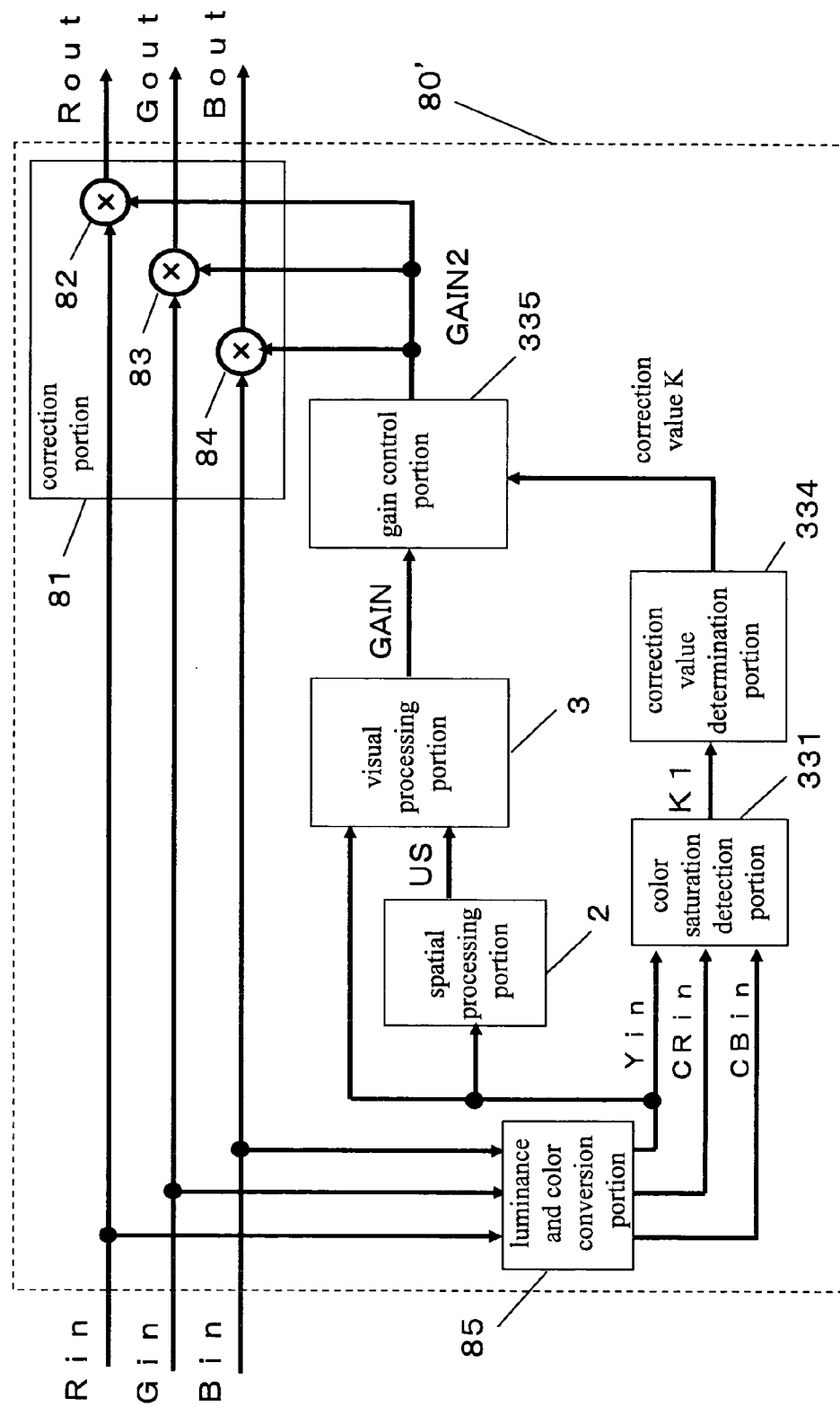
FIG. 40 is a block diagram of a first modified example of the visual processing device of the fifth embodiment.

It is also possible for the image signal that is input and output to be RGB signals, that is, primary color signals. FIG. 40 shows a block diagram of a visual processing device 80' according to a first modified example. To avoid repetition, the description of processing that is identical to that of the visual processing device 1 has been omitted. The visual processing device 80' inputs RGB signals as the image signal, and outputs RGB signals that have been corrected through visual processing.

The luminance and color conversion portion 85 converts the image signals Rin, Gin, and Bin that have been input into a luminance signal Yin and color signals CRin and CBin. Here, the luminance component information is extracted from the Rin, Gin, and Bin and created to match human vision characteristics. For example, the luminance signal Yin is Yin=0.299×Rin+0.587×Gin+0.114×Bin. The color signals (CRin, CBin) are CRin=(−0.1687)×Rin+(−0.3313)×Gin+0.5×Bin, and CBin=0.5×Rin+(−0.4187)×Gin+(−0.0813)×Bin.

The color saturation detection portion 331 (FIG. 33) calculates the correction value K1 from the converted luminance signal Yin, the color signal CRin, and the color signal CBin. It should be noted that although the RGB conversion portion 11 (FIG. 34) of the color saturation detection portion 331 creates RGB signals from the luminance signal Yin, the color signal CRin, and the color signal CBin, it is also possible to directly use the image signals Rin, Gin, and Bin that have been input. In this case, the RGB conversion portion 11 can be omitted.

The correction value determination portion 334 (FIG. 36) determines the correction value K with reference to the correction value K1. The correction value determination portion 334 selects a signal that has been input from the outside and outputs this as the correction value K, or performs a computation and then outputs a correction value K, according to the value that has been set in the M register 23.

The visual processing portion 3 receives the output of the spatial processing portion 2 and the luminance signal Yin as input, and calculates the first gain signal GAIN.

The gain control portion 335 outputs a second gain signal GAIN2 that is obtained by correcting the first gain signal GAIN that has been input with the correction value K.

The correction portion 81 is made of multiplication portions 82, 83, and 84. The multiplication portions 82, 83, and 84 multiply the second gain signal GAIN2 and the image signals Rin, Gin, and Bin, respectively, and output visually corrected RGB signals Rout, Gout, and Bout. Thus, it is possible to enhance or suppress the contrast while retaining the ratio of Rin, Gin, and Bin. Further, since control can be performed to enhance or suppress the gain signal with the correction value K, it is possible to inhibit saturation of the grayscale gradation and color saturation. It is also possible to enhance the skin color contrast in the faces of people in backlit scenes.

It is also possible for the output of the visual processing portion 3 (FIG. 33) to be changed to a difference signal of the difference between the output signal after grayscale conversion and the luminance signal Yin. A visual processing device 60 according to a second modified example is described using FIG. 41 and FIG. 42.

Figure 41:
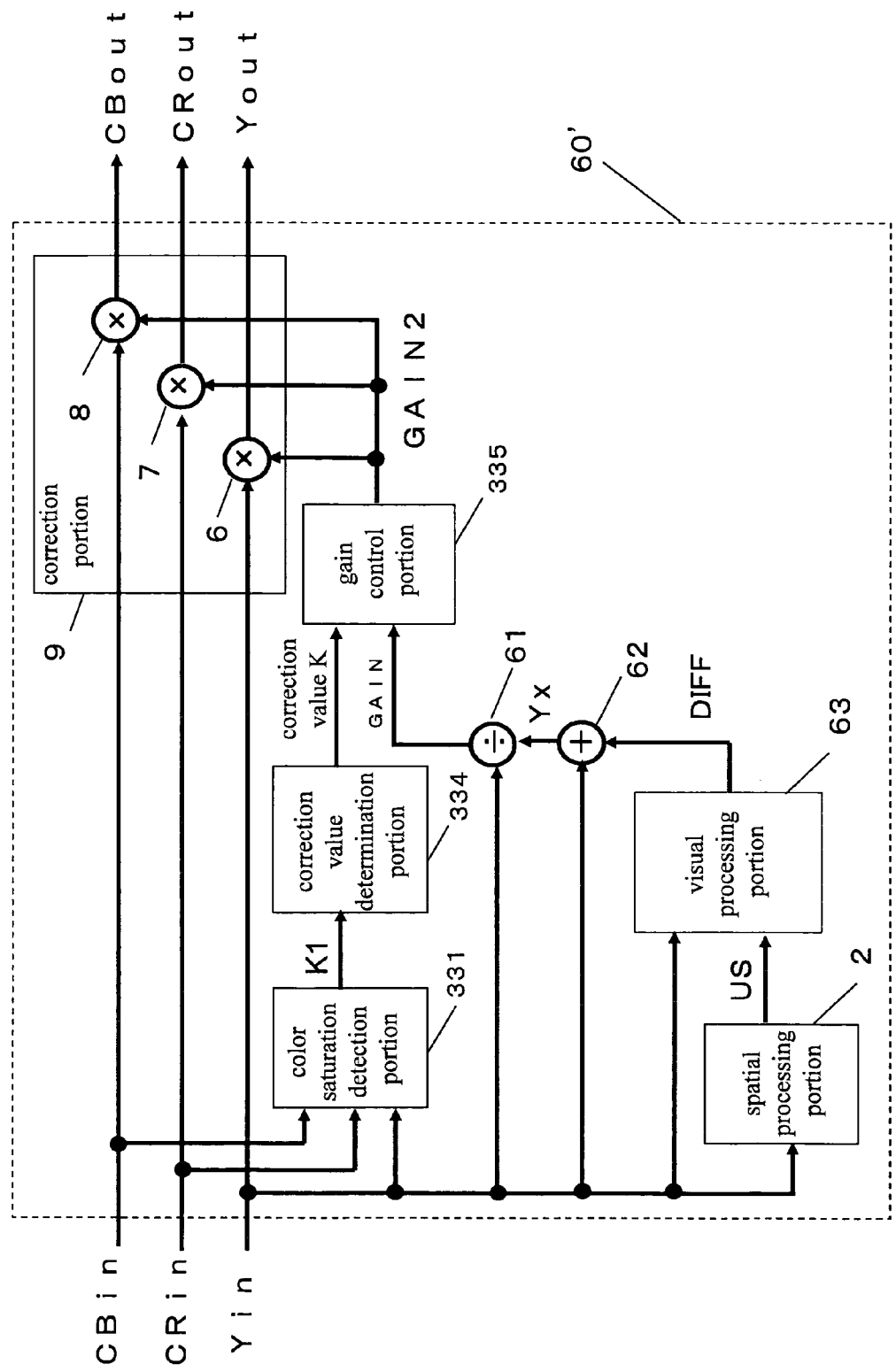
FIG. 41 is a block diagram of a second modified example of the visual processing device of the fifth embodiment.
Figure 42:
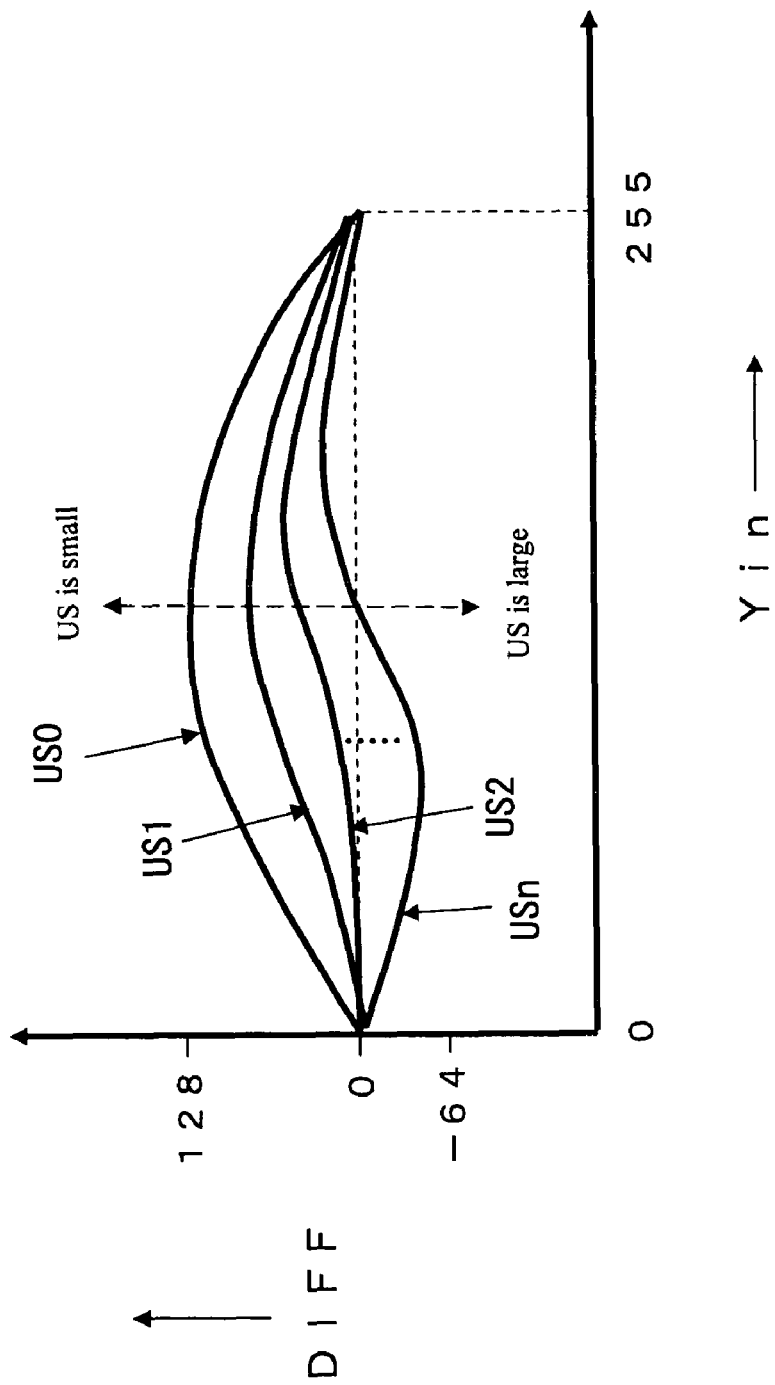
FIG. 42 is an explanatory diagram of the difference signal DIFF in the fifth embodiment.

FIG. 41 is a block diagram of the visual processing device 60' of the second modified example. The visual processing portion 63 is designed such that it outputs the difference between the output signal resulting from the grayscale conversion shown in FIG. 2 and the luminance signal Yin as a difference signal DIFF. The difference signal DIFF is the difference between the output signal resulting from the grayscale conversion shown in FIG. 2 and the luminance signal Yin, and as shown in FIG. 42, is determined based on the unsharp signal USn and the luminance signal Yin. Thus, the signal that is obtained by the addition portion 62 taking the sum of the difference signal DIFF and the luminance signal Yin is the same as the output signal resulting from the grayscale conversion shown in FIG. 2.

The addition portion 62 calculates an addition value Yx by taking the sum of the difference signal DIFF and the luminance signal Yin. The addition value Yx is a signal that is equivalent to the output signal after the grayscale conversion of FIG. 2.

The division portion 61 calculates the first gain signal GAIN by dividing the addition value Yx by the value of the luminance signal Yin. That is, GAIN=Yx/Yin. The first gain signal GAIN is equivalent to adopting the slope of the grayscale conversion curve of FIG. 2 as the gain.

The color saturation detection portion 331 (FIG. 33) calculates the correction value K1 from the converted luminance signal Yin, the color signal CRin, and the color signal CBin.

The correction value determination portion 334 (FIG. 36) determines the correction value K in reference to the correction value K1. The correction value determination portion 334 selects a signal that has been input from the outside and outputs this as the correction value K, or performs a computation and then outputs the correction value K, in accordance with the value that has been set in the M register 23.

The gain control portion 335 outputs a second gain signal GAIN2 that is obtained by using the correction value K to correct the first gain signal GAIN that has been input.

The multiplication portions 6, 7, and 8 of the correction portion 9 multiply the second gain signal GAIN2 and the luminance signal Yin, the color signal CRin, and the color signal CBin, respectively, and output the luminance signal Yout, the color signal CRout, and the color signal CBout.

It should be noted that the visual processing portion 63 can be constituted by a two-dimensional LUT or can be constituted by a one-dimensional LUT that stores a function of the luminance signal Yin and the difference signal DIFF.

By storing the difference between the output of the grayscale conversion curve and the luminance signal Yin in the LUT, the memory capacity can be reduced more than when gamma correction values of the gradation correction curve are stored.

Thus, according to this embodiment, it is possible to achieve a visual processing device 1 that can execute precise contrast adjustment on image signals that have been input and that does not cause discrepancies in the output timing of the image signals that are output. Further, by correcting the first gain signal GAIN with a predetermined correction value that has been set, the overall contrast of the image can be enhanced and suppressed. By increasing the gain with the correction value K, it is possible to enhance the facial region, for example, of people in dark areas of an image of a backlit scene, giving them an effect of illumination by auxiliary light with reflector board. On the other hand, by reducing the gain with the correction value K, it is possible to suppress grayscale saturation and color saturation at dark reds and dark blues.

Since the maximum value detection portion detects the maximum value when converting from the image signal to RGB signals, and the first gain signal is controlled based on the maximum value of the RGB signals that has been detected, it is possible to detect the level of the gain signal that will cause color saturation, and a correction value that does not result in color saturation can be calculated.

The visual processing portion 1' of this embodiment performs grayscale conversion using the gain signal. The gain signal that is output for the luminance signal Yin changes more smoothly than does the grayscale conversion signal, and thus sufficient processing precision can be ensured even if the luminance signal Yin and the unsharp signal US are decimated roughly. Thus, the bit precision of the luminance signal Yin that is input to the visual processing portion 3 can be lowered, and this allows the circuit scale of the hardware to be reduced. It is also possible to reduce the memory capacity when the visual processing portion 3 is constituted by a LUT.

Further, in the visual processing device 1' of this embodiment, having the gain characteristics be two-dimensional gain characteristics that are determined from the image signal and the unsharp signal US allows the contrast in dark regions in the image to be enhanced by raising it with the gain curve when the unsharp signal US is small, and allows the contrast in bright regions in the image to be suppressed with the gain curve when the unsharp signal US is large, and thus it is possible to perform brightness adjustment that is ideal for both dark regions and bright regions. Thus, it is possible to perform grayscale conversion such that even if the dark regions, and in particular the facial region of people, in a backlit scene enhanced up to an appropriate brightness, the background region does not become saturated.

Constituting the visual processing portion with a LUT allows different visual characteristics to be achieved by rewriting the table data. It also becomes possible to achieve complex, non-linear gain characteristics with ease.

Because the correction value K allows the effects of the visual processing to be both strengthened and weakened, it is not necessary to create gain characteristic data that correspond to a different strength of the effect. Thus, it is possible to do without preparing LUTs with data of various strengths, and this allows the memory capacity to be reduced. Additionally, since it is not necessary to replace the content of the LUT, the time for changing can be significantly shortened. Changing the correction value K in real time allows the strength of the effect to be changed for each region of the image. Specifically, it is possible to change the correction value K per frame or per pixel.

Sixth Embodiment

A sixth embodiment is described next using FIGS. 15 and 43 to 46. Components that are the same as in the second embodiment and the fifth embodiment have been assigned the same reference numerals as before and are not described in detail.

This sixth embodiment describes an example of how the visual processing device 1' determines the correction value of the first gain signal GAIN.

Figure 43:
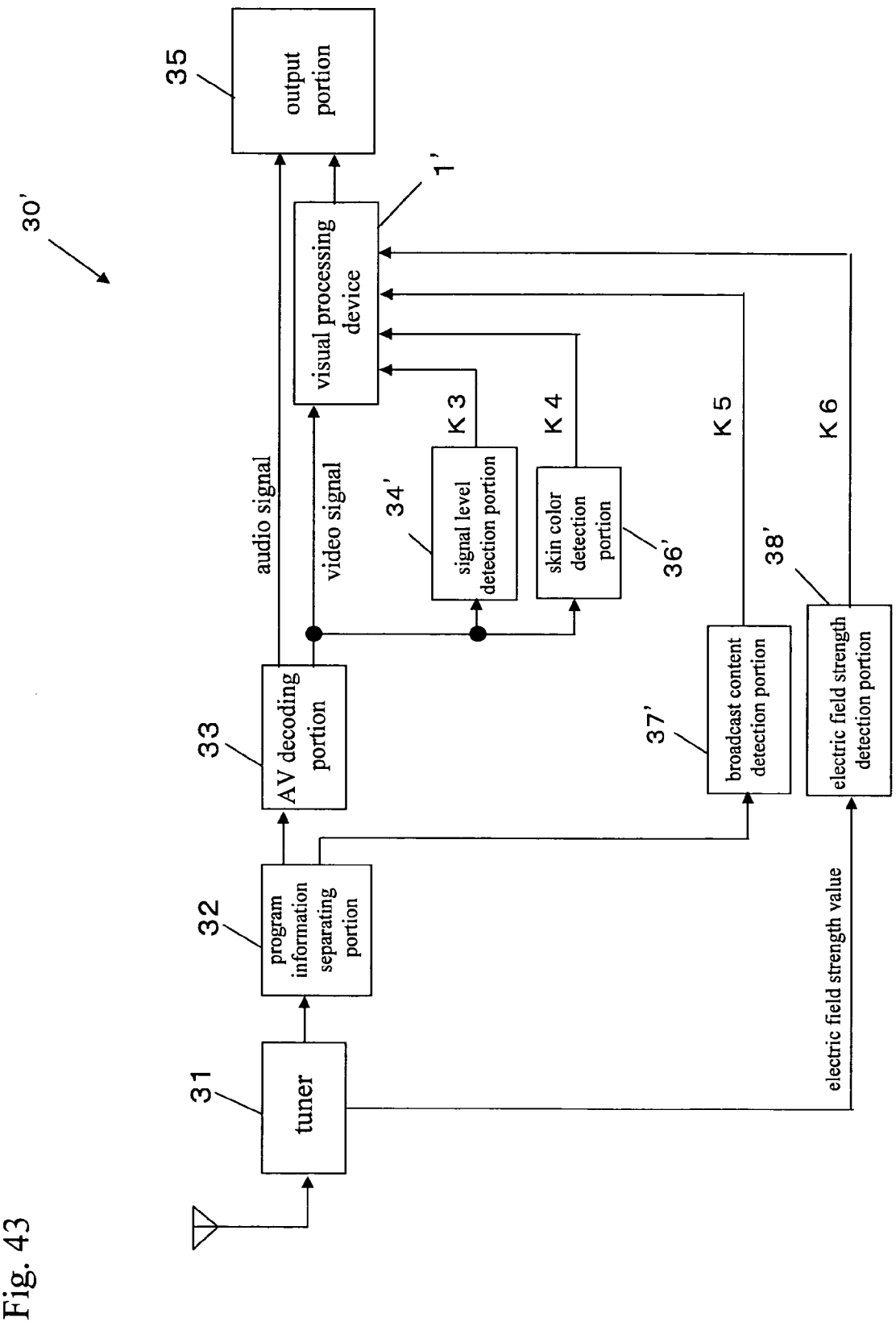
FIG. 43 is a block diagram of a display device according to a sixth embodiment of the invention.

FIG. 43 is a block diagram of a display device 30' according to the sixth embodiment of the invention.

In FIG. 43, the visual processing device 1' visually processes the video signal that is input and outputs the result to the output portion 35. The output portion 35 is for example provided with a display portion such as a CRT, a plasma display panel, or a liquid crystal panel, and a sound output portion such as a speaker, and outputs the audio signal that has been input and displays the visually processed video signal. It should be noted that it is also possible for the output portion 35 to convert the input signal to match the display colors of the display and then display it. For example, it can convert a luminance color signal into RGB signals, which are primary color signals. It should also be noted that modified examples of the visual processing device 1 are conceivable depending on the structure of the signal that is handled by the output portion 35. For example, if the output portion 35 handles luminance signals and color signals, then the visual processing device 1' (FIG. 33) is preferable, whereas if it handles RGB signals, then the visual processing device 80' (FIG. 40) is preferable. In this way, a configuration that is suited for the video signal can be used.

Next, a signal level detection portion 34' stores the luminance signal, of the video signals, in a frame memory, and computes the average value of the image signals in one frame or one field to detect the mean signal level. The correction value K3 is calculated from this detected mean signal level. It should be noted that the mean signal level can be an average value that is obtained by averaging the luminance signals, or can be a value that is obtained by averaging the various RGB signals and then finding the mean value of those average values.

For example, a case in which gain control is performed through interpolation/extrapolation control is described. An image in which the mean signal level is higher than a predetermined value PH is defined as a "bright image," and in a bright image the correction value K3 is set to 0.8, whereas an image in which the mean signal level is lower than a predetermined value PL is defined as a "dark image," and in a dark image the correction value K3 is set to 1.2. Thus, the correction value can be set based on the characteristics of the image.

A case in which gain control is performed using an offset value is described next. An image in which the mean signal level is higher than a predetermined value PH is defined as a "bright image," and in a bright image the correction value K3 is set to −0.2, whereas an image in which the mean signal level is lower than a predetermined value PL is defined as a "dark image," and in a dark image the correction value K3 is set to +0.2. Thus, the correction value can be set based on the characteristics of the image.

Thus, by correcting the gain signal to suppress the signal level in a bright image, it is possible to increase the heat resistance and curb power consumption in the display device, which is a plasma display panel, for example.

To raise the heat resistance and lower the power consumption in a plasma display panel, the drive portion is provided with a display control function of performing control on the display panel side to lower the overall brightness of the screen when the average signal level of the image to be displayed exceeds a predetermined level. This display control function operates independent of the video signal processing.

Thus, visually processing regions of a predetermined brightness in the image to enhance those regions activates the display control function, and the drive portion lowers the overall brightness of the screen, darkening even those regions that were sufficiently bright before visual processing and thus resulting in an image that is not sharp overall and has lower picture quality. In other words, there is the risk of losing the effects from the visual processing that has been performed. For this reason, the gain signal is corrected to below the mean signal level at which the display control function of the drive portion is activated so that it is possible to achieve effective contrast adjustment.

Figure 44:
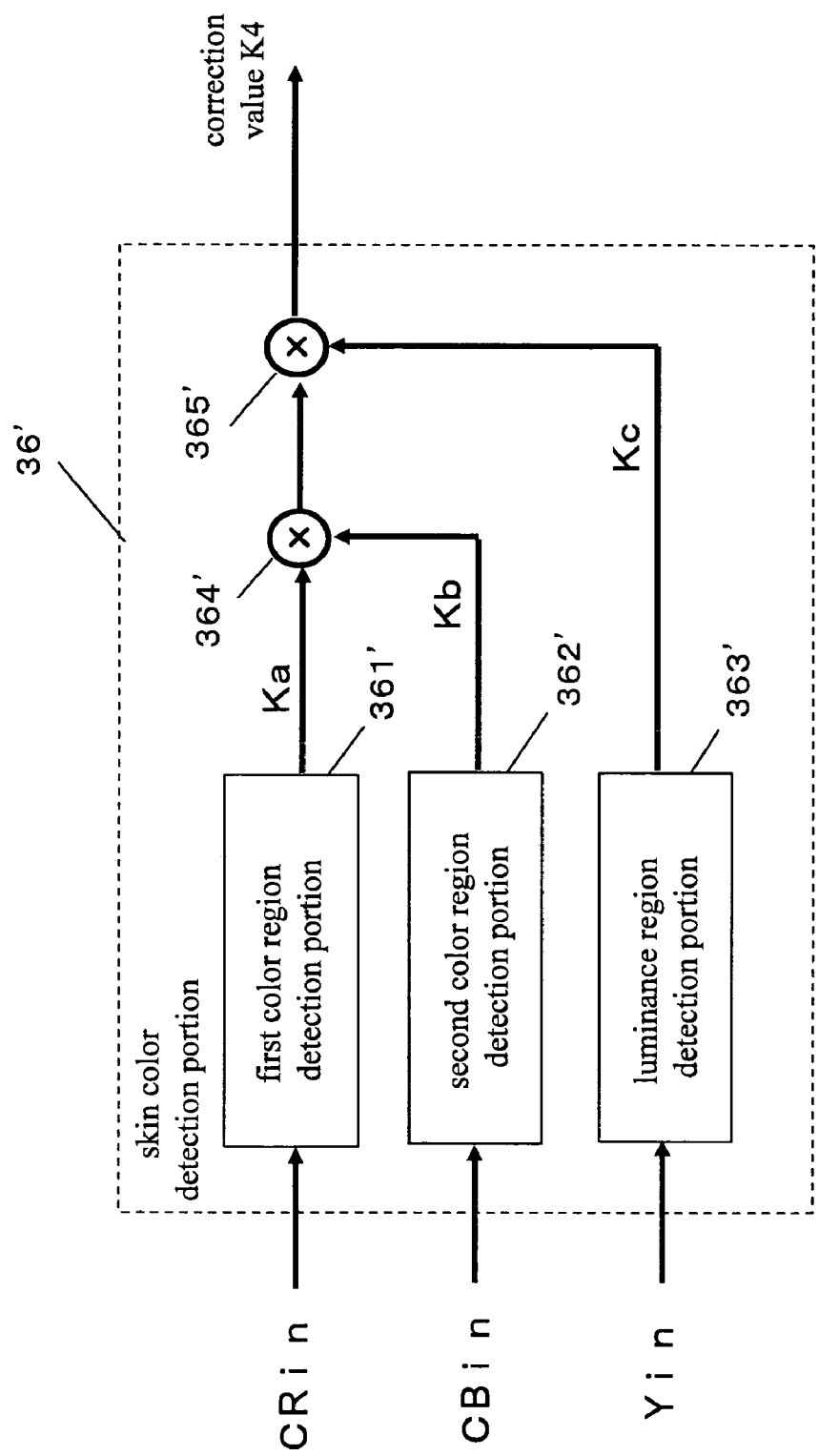
FIG. 44 is a block diagram of the skin color detection portion in the sixth embodiment.

The skin color detection portion 36' detects skin color regions from the luminance signal Yin, the color signal CBin, and the color signal CRin, and calculates the correction value K4. As shown in FIG. 44, the skin color detection portion 36' is provided with a first color region detection portion 361' that detects a predetermined first color region from the color signal CRin and outputting a weight value Ka, a second color region detection region 362' that detects a predetermined second color region from the color signal CBin and outputs a weight value Kb, and a luminance region detection portion 363' that detects a predetermined brightness region from the luminance signal Yin and outputs a weight value Kc, and the skin color detection portion 36' obtains the correction value K4 by defining the degree of likeness to skin as the product of the various weight values. For example, the correction value K4 is calculated by the multiplication portions 364 and 365 by correction value K4=Ka×Kb×Kc.

The skin color detection portion 36' detects whether the video signals (luminance signal Yin, color signal CBin, color signal CRin) that are being detected belong to the skin color region shown in FIG. 15. Thus, it is possible to set the correction value K according to the brightness of the image as well as the color. In particular, since it is possible to enhance the brightness of the skin color region of a person's face that has been darkened by shadow (effect of illumination by auxiliary light with reflector board), it is possible to inhibit face shininess, grayscale saturation, and color saturation in the skin color regions of people's faces that are already bright because they are in regions where the sun is shining.

The operation of the skin color detection portion 36' is described more specifically using FIG. 45. Here, gain control is carried out through interpolation/extrapolation control.

Figure 45A:
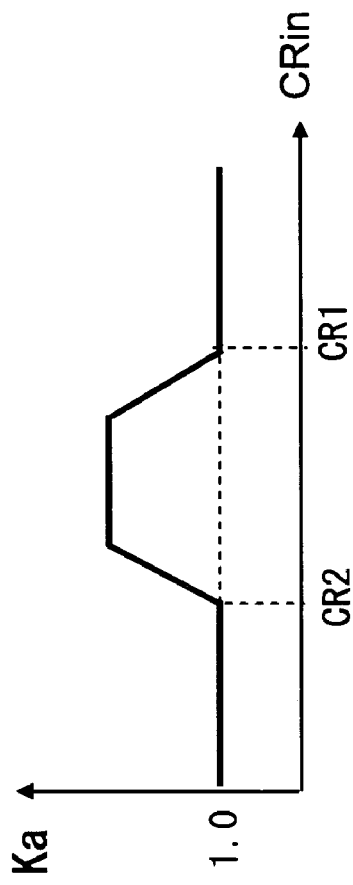
FIG. 45A is an explanatory diagram describing the weight value Ka for the color signal CR in the sixth embodiment.
Figure 45B:
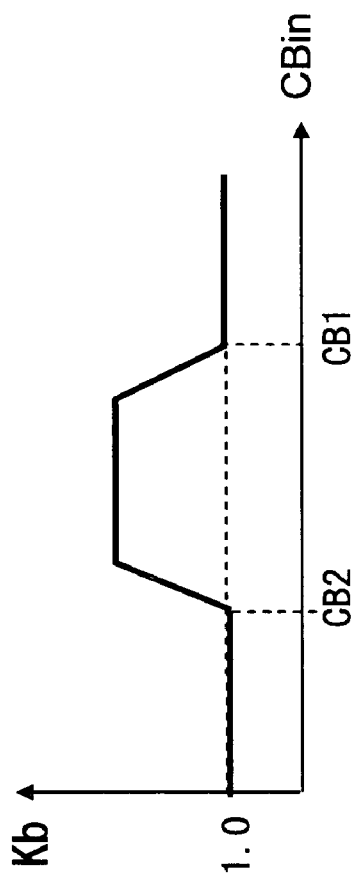
FIG. 45B is an explanatory diagram describing the weight value Kb for the color signal CB in the sixth embodiment.
Figure 45C:
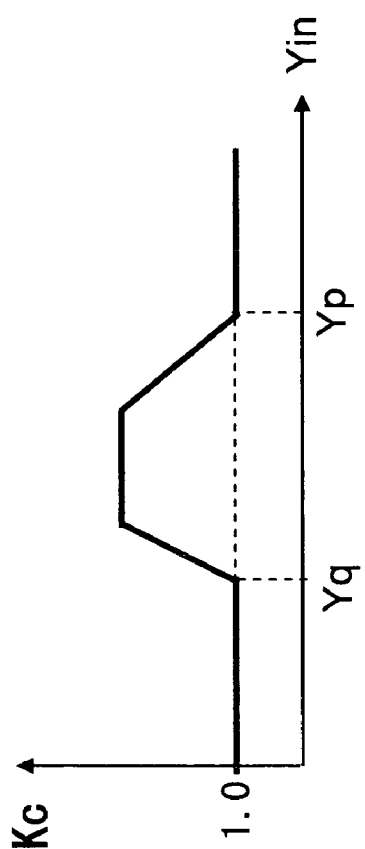
FIG. 45C is an explanatory diagram describing the weight value Kc for the luminance signal Y in the sixth embodiment.

The first color region detection portion 361' inputs the color signal CRin and outputs a weight value Ka according to the weight function shown in FIG. 45A. Similarly, the second color region detection region 362' inputs the color signal CBin and outputs a weight value Kb according to the weight function shown in FIG. 45B. The luminance region detection portion 363' inputs the luminance signal Yin and outputs a weight value Kc according to the weight function shown in FIG. 45C. The degree of likeness to skin is defined as the product of the various weight functions, and is calculated by correction value K4=Ka×Kb×Kc. The weight for the boundary of the target skin color region is changed gradually so that the color near the boundary between the skin color region and the outside does not become unnatural. It should be noted that the weight function can have the shape of a trapezoid or a triangle. Image evaluation, for example, can be employed to set the optimal function. It should be noted that it is also possible for the correction value K4 to be the smallest of value among Ka, Kb, and Kc, or it can be the average of the three.

Thus, by setting the weight value Kc to a value greater than the ×1 signal (by setting the correction value K to a large value) in skin color regions (dark regions) where the luminance value of the luminance region is Yq<luminance value<Yp, it is possible to enhance the brightness of the skin color of the face of a person that has become dark because he is in the shade, and by setting the weight value Kc for the luminance signal to a small value (setting the correction value K4 that is calculated by the skin color detection portion 36' to a small value) for the skin color of a face that is already bright in a region where the sun is shining (bright region), it is possible to keep the from appearing shiny and to inhibit saturation. Thus, it is possible to control the correction value K depending on the characteristics of the image in order to enhance or suppress the brightness.

It should be noted that the minimum values of the weight coefficients and the shapes of the weight functions can be different from one another. A case was described in which gain control is conducted through interpolation/extrapolation control, but in a case where gain control is carried out using an offset value, the same effects are attained by adopting a function where the values for K>0 in skin color regions and K=0 or K<0 in other regions have been set in advance.

The broadcast content detection portion 37' detects EPG display data that have been separated from the program information separating portion 32, and the genre information and the program description information of the data that are currently being received, and calculates the correction value K5. It should be noted that the genre information of the data and the image information also may be detected from MPEG stream information.

The broadcast content detection portion 37' detects the type of content that has been received, such as "News," "Sports," "Tabloid Show," "Movie," and "Drama" as shown in FIG. 46, and calculates a correction value K5 for each of these. Here, a case in which gain control is performed through interpolation/extrapolation control is described.

News images are captured under conditions that are not uniform and some images are dark, so in order to sharpen the images, a correction value of 1.3 is set if the content type is news. Similarly, a correction value of 1.2 is set for sports, a correction value of 1.0 is set for tabloid shows because they are filmed in studios or the like where the lighting is considered, and a correction value of 0.7 is set for movies and a correction value of 0.9 is set for dramas, because thick video images are preferable. In this way, the correction values K5 are tabulated in advance to match the content type. It is therefore possible to set the ideal correction value K5 according to the type of the image.

It should be noted that it is also possible to alter this table from the outside. The case described above is for when gain control is performed through interpolation/extrapolation control, but in a case where gain control is carried out using an offset value, the same effects are attained by setting the correction value K to K>0 to enhance the brightness, K=0 for no correction, and K<0 to suppress the brightness.

Next, the electric field strength detection portion 38' detects the strength of the electric field of the received electromagnetic wave that has been received by the tuner 31, and calculates the correction value K6 based on the strength of the electric field. A case in which gain control is conducted through interpolation/extrapolation control is described. For example, if the electric field strength is "strong," then the correction value K6 can be set to 1.2, whereas if the electric field strength is "weak," then the correction value K6 can be set to 0.8.

It should be noted that a case where gain control is conducted using a multiplication value has been described described, but in a case where gain control is conducted using an offset value, the same effects are attained by setting a value that leads to K=+0.2 if the electric field strength is "strong," and a value that leads to K=−0.2 if the electric field strength is "weak."

Thus, the correction value K6 can be set so that the noise in images with a weak electric field and a poor S/N ratio is not enhanced.

As described above, with this embodiment, the signal level detection portion 34' calculates the correction value K3 in accordance with the mean signal level that has been detected from the image signals in a single frame or a single field. The visual processing device 1' can correct the first gain signal GAIN according to the correction value K3.

Thus, the correction value can be set according to the mean signal level that has been detected, and in bright images the gain signal can be controlled to suppress the signal level of the image. By suppressing the signal level, it is possible to increase the heat resistance and curb power consumption in the display device, which for example is a plasma display panel. In addition, since it is possible to keep the gain signal below the level at which the function for lowering the overall brightness of the screen when the mean signal level of the image to be displayed exceeds a predetermined level is activated even in a plasma display panel, it is possible to achieve contrast adjustment that is effective.

The skin color detection portion 36' calculates the correction value K4 according to the degree of likeness to skin color by performing computations with the weight coefficients Ka, Kb, and Kc corresponding to the color signals and the luminance signal, which are set in advance. The visual processing device 1' can correct the first gain signal GAIN according to the correction value K4.

Thus, by adopting a weight function that increases the various weight values in predetermined color regions and luminance regions, it is possible to enhance the brightness of the skin color of the darkened faces of people in shadows, giving the skin an effect of illumination by auxiliary light with reflector board and allowing the darkness of the skin color to be removed. Conversely, it is possible to keep the skin color of already bright faces in regions where the sun is shining from appearing shiny or becoming saturated.

The broadcast content detection portion 37' calculates the correction value K5 according to the broadcast content that has been detected from the program information separating portion 32, which separates program information from the data that have been received. The visual processing device 1' can correct the first gain signal GAIN according to the correction value K5.

Thus, an optimal correction value can be set for each content type, and it is possible to set correction values that fit the contrast adjustment values necessary for the content.

The electric field strength detection portion 38' calculates the correction value K6 according to the value of the electric field strength when the tuner 31 receives image data. The visual processing device 1' can correct the first gain signal GAIN according to the correction value K6.

Thus, the correction value can be set based on the value of the electric field strength, it is possible to detect images whose electric field strength is weak and whose received data have a poor S/N ratio and then control the gain signal for the entire image, and it is possible to suppress enhancement of the noise in images with a poor S/N ratio.

The display device 30' of the invention is provided with the tuner 31 for receiving image data that have been transmitted or broadcast, the AV decoding portion 33 for decoding the image data to video signals, the visual processing device 1' for visually processing the decoded video signals and outputting the result, and the output portion 35 for displaying the visually processed video signals.

With this configuration, it is possible to achieve a display device 30' that can perform visual processing that inhibits color saturation through contrast adjustment of the image. Further, by suppressing the gain signal, it is possible to keep down the signal level in bright images and increase the heat resistance and curb power consumption in the display portion, which for example is a plasma display panel. In addition, since it is possible to keep the gain signal below the level at which the function for lowering the overall brightness of the screen when the mean signal level of the image to be displayed exceeds a predetermined level is activated, even in a plasma display panel having this function, it is possible to achieve contrast adjustment that is highly effective.

Seventh Embodiment

An example of the application of the visual processing device 1 or 1', as well as a system using the same according to a second example of the present invention are described with reference to FIGS. 47 to 50.

Figure 47:
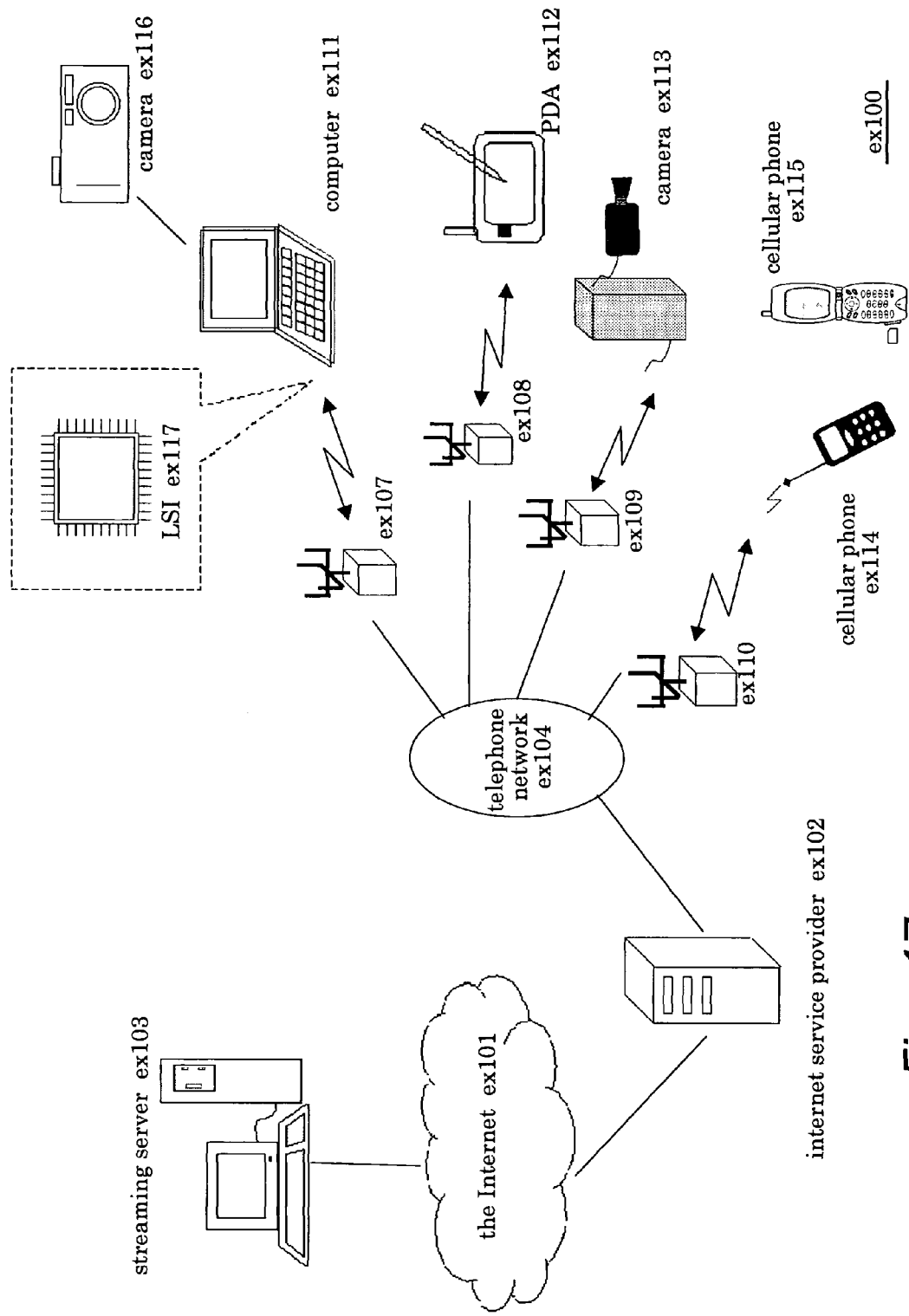
FIG. 47 is the overall configuration of a content provision system according to a seventh embodiment of the invention.

FIG. 47 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 47. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time.

To encode or decode the content, the visual processing devices may be used. For example, the computer ex111, the PDA ex112, the camera ex113, the cellular phone ex114 or the like may be provided with the visual processing devices, execute the visual processing methods, and the visual processing programs.

In addition, the streaming server ex103 may provide the two-dimensional gain data (profile) to the visual processing device via the Internet ex101. Furthermore, there may be a plurality of streaming servers ex103, and each of them may provide different two-dimensional gain data. Further, the streaming sever ex103 may be for creating the two-dimensional gain data. When the visual processing device can thus obtain the two-dimensional gain data via the Internet ex101, the visual processing device does not have to store in advance the two-dimensional gain data used for the visual processing, and the memory capacity of the visual processing device can be reduced. In addition, because the two-dimensional gain data can be obtained from a plurality of servers connected via the Internet ex101, different visual processings can be realized.

An example regarding a cellular phone will now be described.

Figure 48:
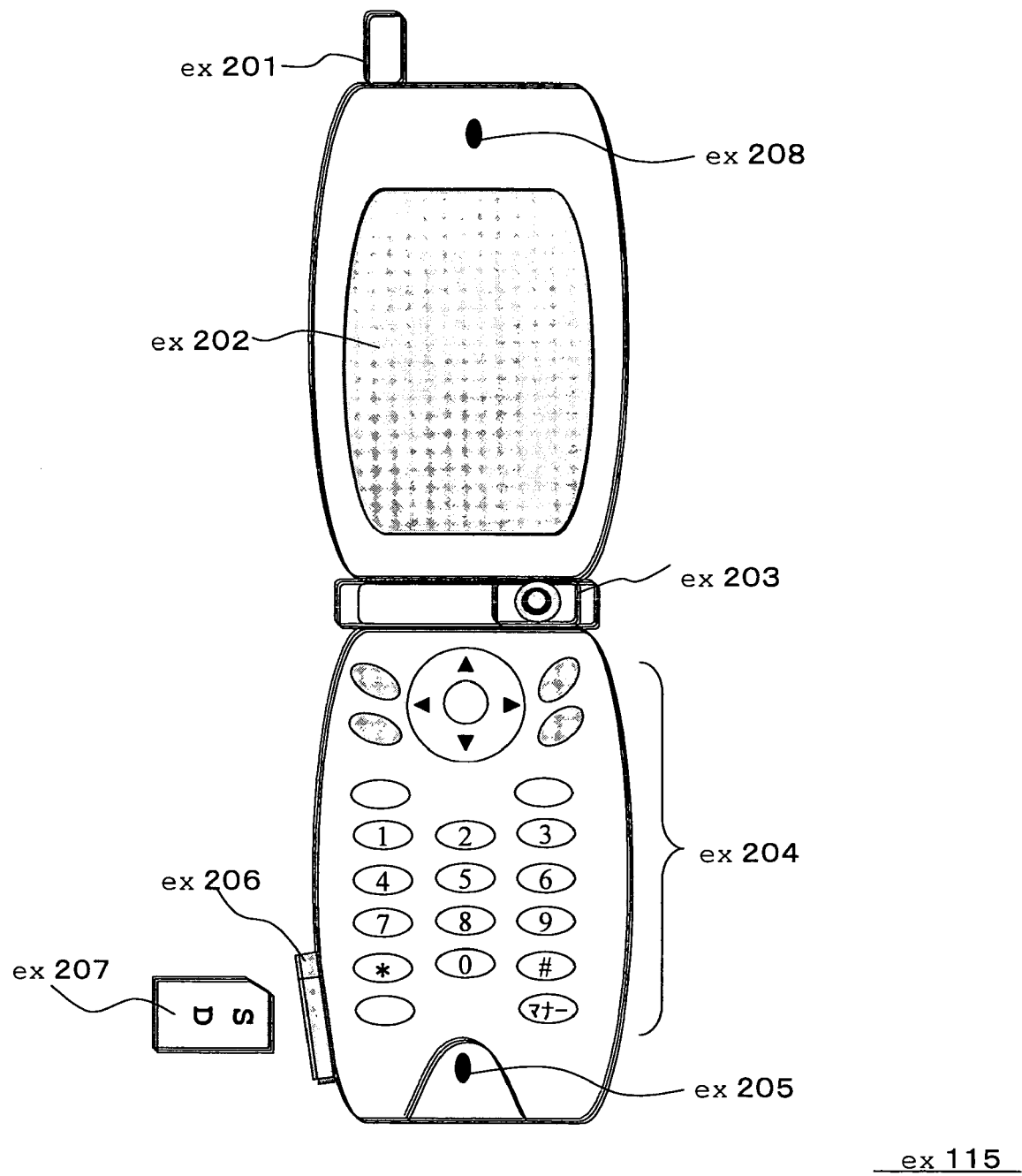
FIG. 48 is a front view of a portable telephone installed with the visual processing device according to an embodiment of the invention.

FIG. 48 shows the cellular phone ex115 that utilizes the visual processing device 1 or 1' of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) nonvolatile memory that is electronically rewritable and erasable.

Furthermore, the cellular phone ex115 will be described with reference to FIG. 49. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312 converts the image data supplied from the camera portion ex203 into the coded image data by compressing and coding the data, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data that are linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Note that the image decoding portion ex309 may be provided with the visual processing devices shown in the above-described embodiments.

Figure 50:
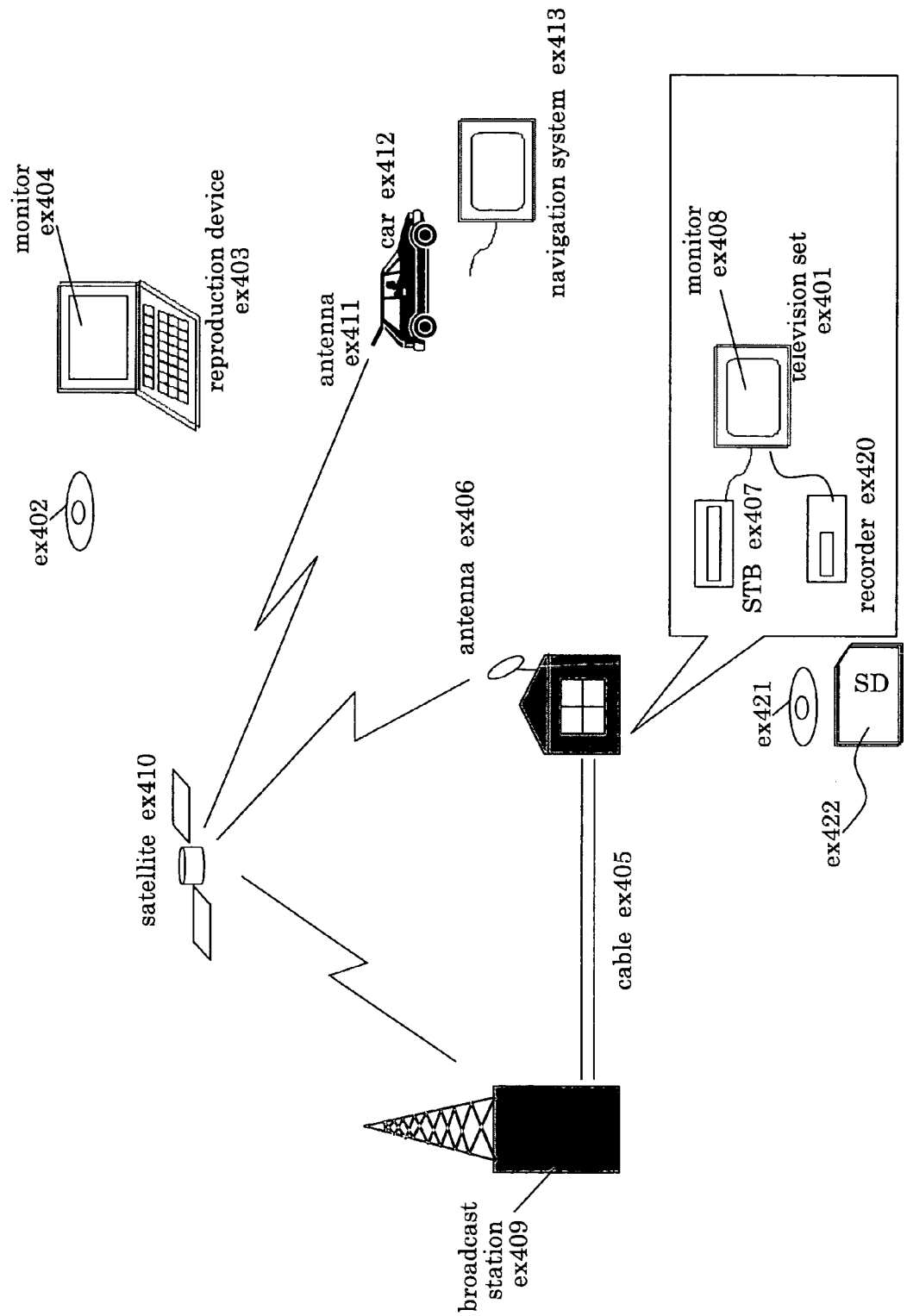
FIG. 50 is an explanatory diagram describing the overall configuration of the digital broadcast system of the seventh embodiment.

Note that the present invention is not limited to the example of the system described above. Digital broadcasting by satellite or terrestrial signals has been a recent topic of discussion. As shown in FIG. 50, the visual processing devices of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, the television set (the receiver) ex401 or the set top box (STB) ex407 may be provided with the visual processing device shown in the above-described embodiments, use the visual processing method shown in the above-described embodiments or execute the visual processing program shown in the above-described embodiments. In addition, a reproduction device ex403 for reading and decoding a coded bit stream that is recorded on a storage medium ex402 such as a CD or a DVD that is a recording medium may be equipped with the visual processing devices, the visual processing methods, and the visual processing programs shown in the above-described embodiments. In this case, the reproduced image signal and text track are displayed on a monitor ex404. In addition, it is possible to mount the visual processing devices, the visual processing methods, and the visual processing programs shown in the above-described embodiments, in a set top box ex407 that is connected to a cable ex405 for a cable television or the antenna ex406 for a satellite or surface wave broadcasting, so that the image can be reproduced on a monitor ex408 of the television set. In this case, it is possible to incorporate the visual processing devices shown in the above-described embodiments not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the visual processing devices of the present invention, it is possible to reproduce image signals recorded on a DVD disk ex421 or a SD card ex422 via the image signal processing device, so as to display on the monitor ex408.

Figure 49:
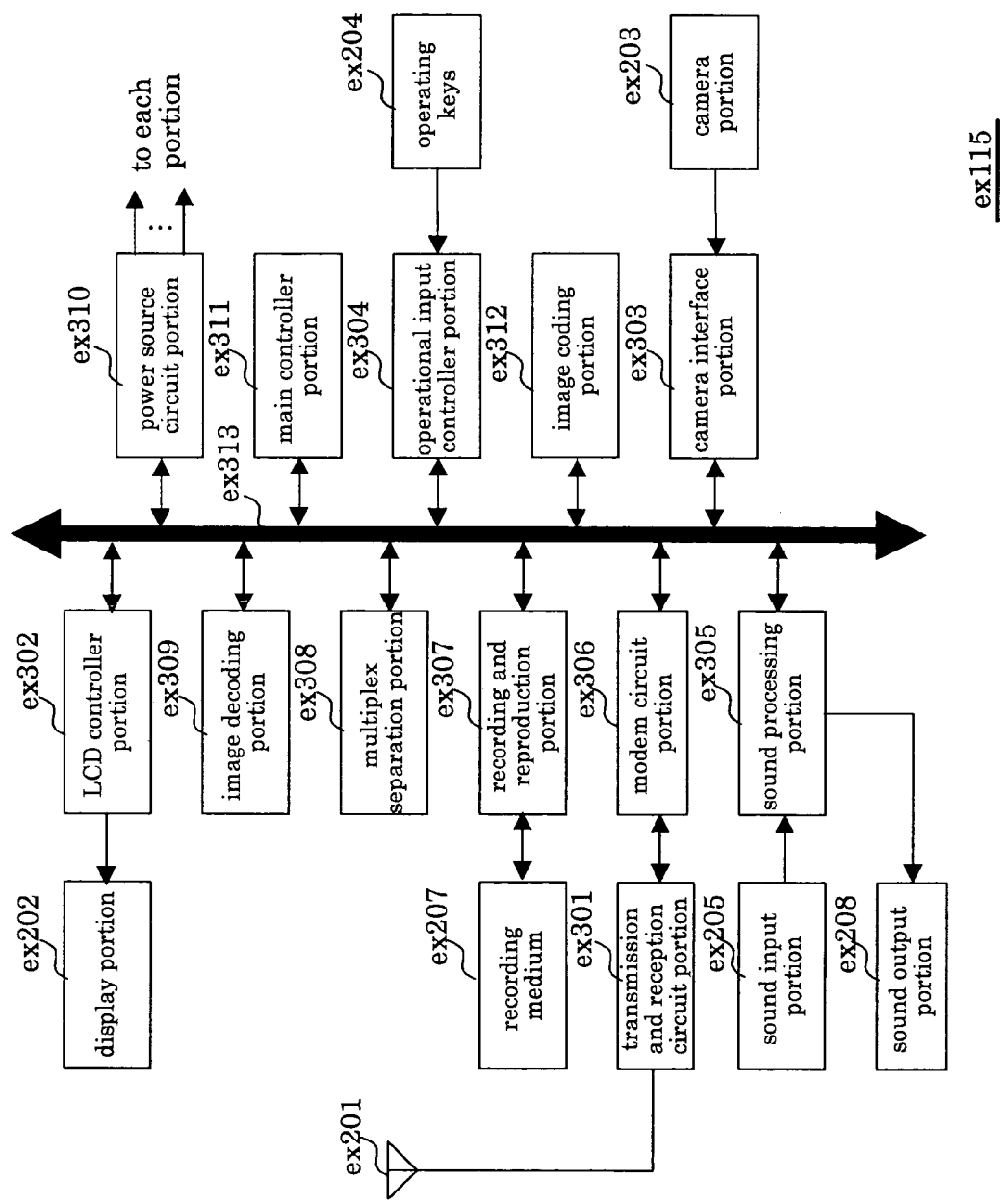
FIG. 49 is a block diagram describing the overall configuration of that portable telephone.

Note that in the structure of the navigation system ex413 shown in FIG. 49, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the visual processing devices, the visual processing methods, and the visual processing programs shown in the above-described embodiments can be used for any device and system described above, so that effects described above can be obtained.

The various functions such as the spatial processing function, visual processing function, correction function, band limit function, contrast enhancement function and the like in the visual processing device, visual processing portion, display device and system according to the present invention explained in the aforementioned embodiments may be carried out by hardware using an integrated circuit, or by software that operates using a CPU, digital signal processor and the like. Alternatively, they may be carried out by mixed processing using the hardware and software.

When the functions are carried out by the hardware, each function in the embodiments of the present invention may be realized by a separate integrated circuit, or a part or all of the functions may be realized by one integrated circuit.

In addition, the integrating circuit may be realized by an application specific integrated circuit or a versatile processing unit. For example, it is possible to use an FPGA (Field Programmable Gate Array) that is programmable after the LSI is produced or a silicon figurable processor that can restructure connection or setting of circuit cells in the LSI.

Furthermore, if another technique for integrating circuits rather than he LSI appears with the progress of semiconductor technology, then that technique may be utilized for integrating the functional blocks. Biotechnology has the potential for such technology.

Figure 51:
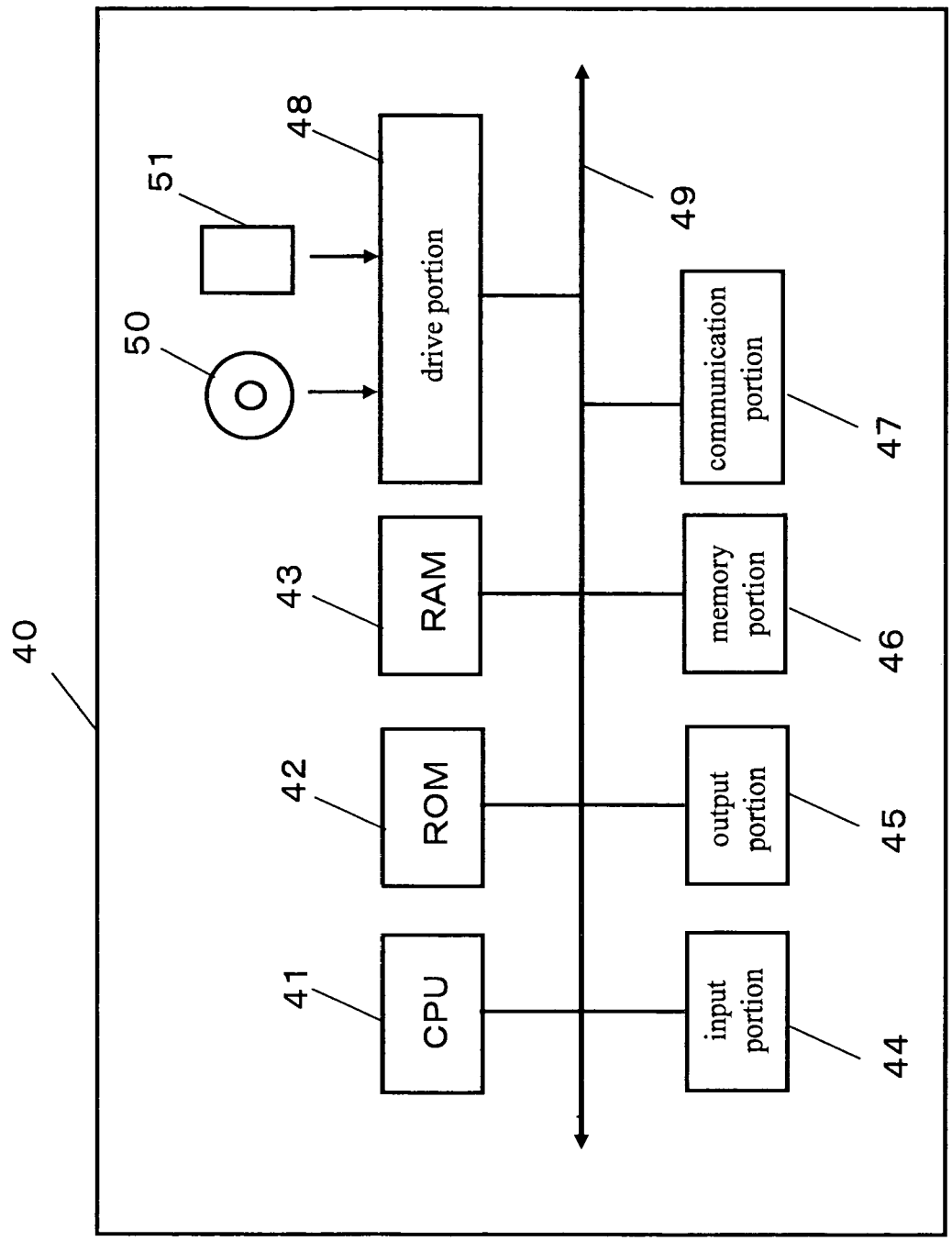
FIG. 51 is a block diagram showing the configuration of a computer according to an embodiment of the invention.
Figure 52:
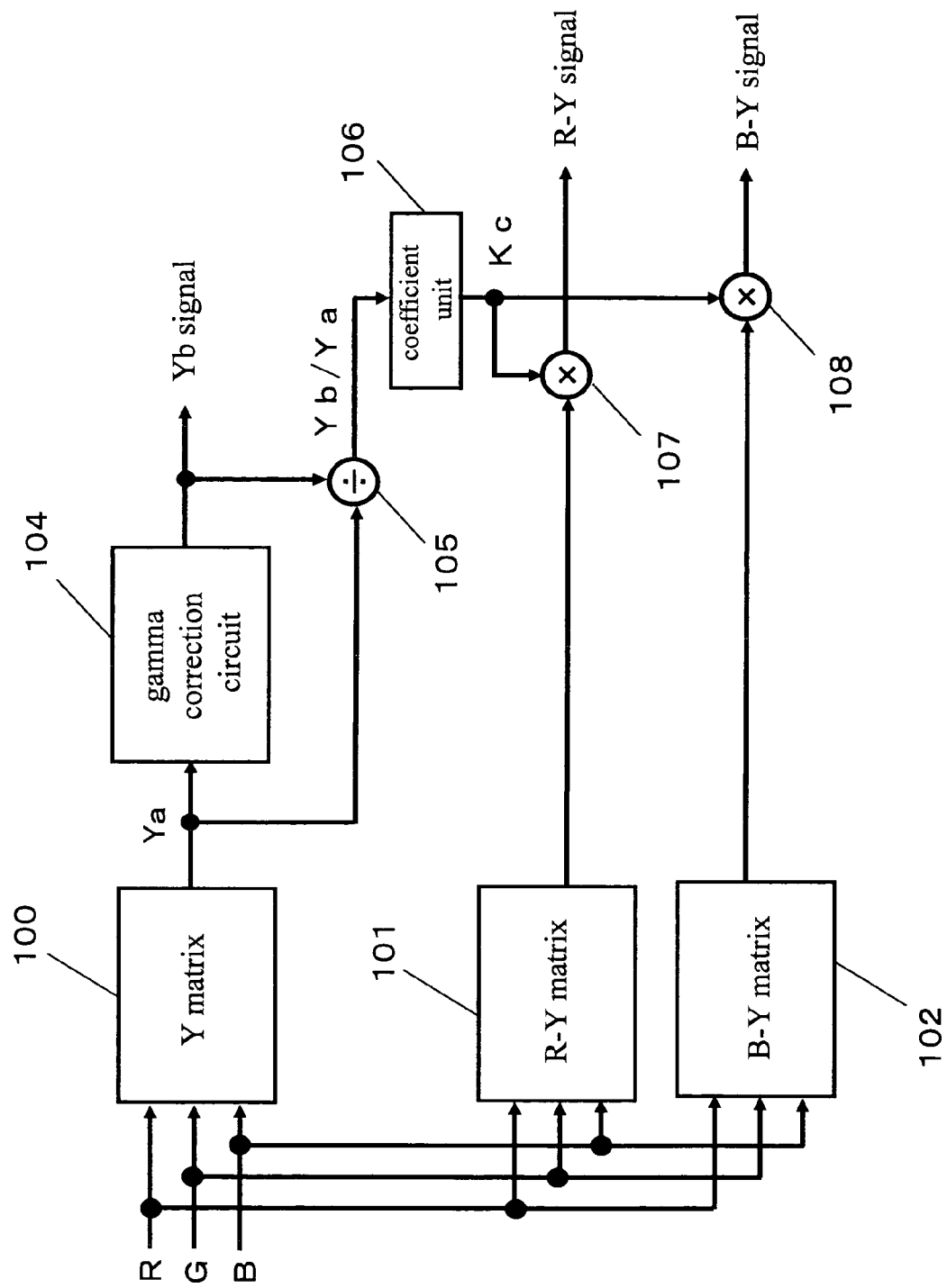
FIG. 52 is a block diagram showing the structure of a conventional contrast adjustment circuit.
Figure 53:
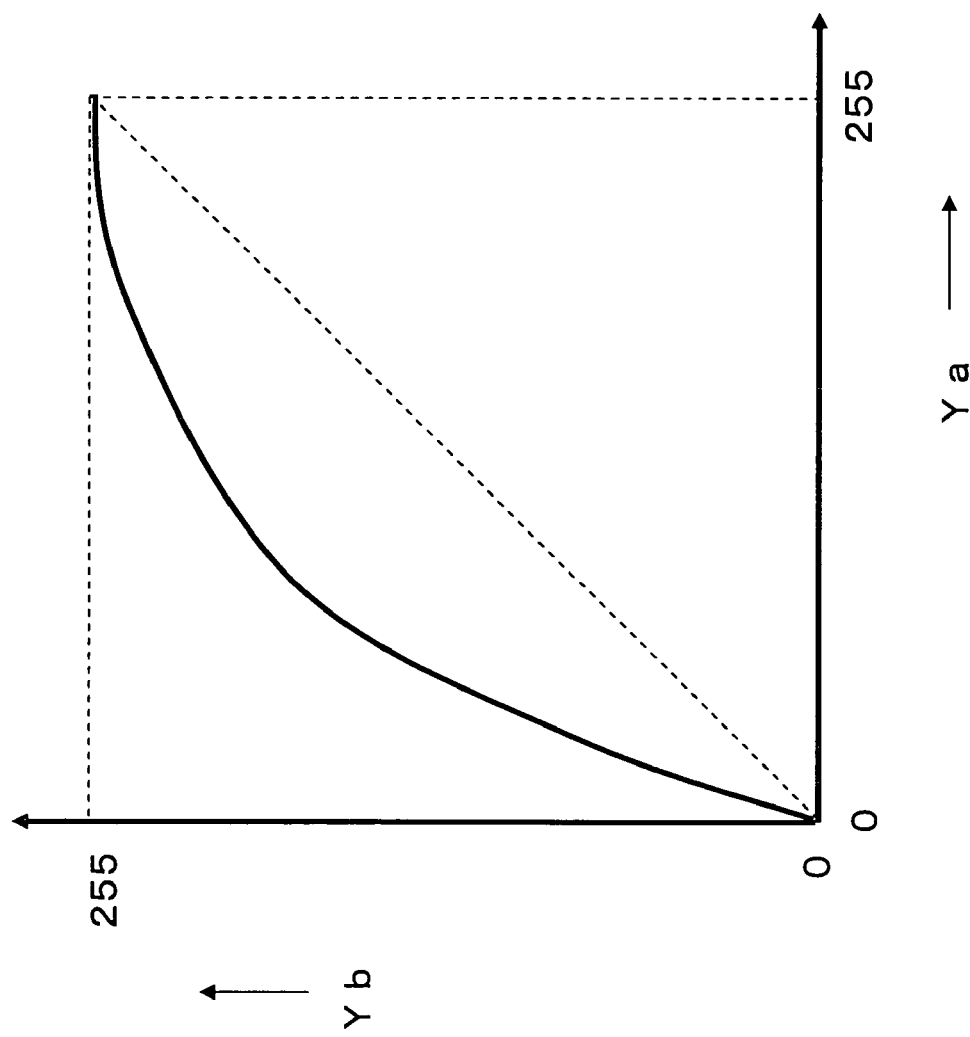
FIG. 53 is a characteristic diagram showing the characteristics of conventional gamma conversion.

Next, a case in which various functions are executed by software is described using FIG. 51. FIG. 51 is a block diagram showing the configuration of a computer 40 according to an embodiment of the invention.

In FIG. 51, the computer 40 is provided with a CPU 41 that executes the commands of various types of programs, a ROM 42 storing programs, for example, a RAM 43 holding temporarily stored data, an input portion 44 that inputs images, an output portion 45 that outputs images, and a memory portion 46 that stores programs and various types of data.

The computer 40 also can be provided with a communication portion 47 for communicating with the outside, and a drive portion 48 for suitably connecting to information storage media.

The various functional portions send and receive control signals and data, for example, via a bus 49.

The CPU 41 executes various functions according to programs stored on the ROM 42, programs stored on the memory portion 46, and programs stored on the RAM 43.

The ROM 42 stores a visual processing program and characteristic data, for example.

The RAM 43 temporarily stores data that are required for the processing of the various functions by the CPU 41.

The input portion 44 inputs images. For example, it is possible for the input portion 44 to receive electromagnetic waves to obtain broadcast image data, and decode the encoded image data that have been obtained to convert them into data that can be processed by the visual processing portion 1 or the visual processing portion 1'. Thus, by the CPU 41 executing the process steps of the visual processing portion 1 or the visual processing portion 1' on the input image data and displaying the data on the output portion 45, it is possible to achieve a digital television. It is also possible to obtain digital images directly over a wired connection.

The output portion 45 outputs the images. For example, the output portion 45 outputs to a display device such as a liquid crystal display device or a plasma display.

The memory portion 46 comprises a magnetic memory and the like, and stores software that is a program group necessary for the visual processing. Note that the programs constituting the software for the visual processing may be incorporated into the computer by the dedicated hardware in advance, or may be incorporated into the ROM 42 or the memory portion 46 in advance.

The communication portion 47 may be connected to the network and the like, and obtain the program via the network, or may install the obtained program in the memory portion 46 as necessary. In this way, the computer 40 can download the program via the communication portion 47.

The drive portion 48 appropriately connects to an information storage medium and obtains information stored therein. The information storage medium may be, for example, the disk 50 such as a magnetic disk, magneto optical disk, optical disk, or the memory card 51 such as a semiconductor memory. In addition, the program having the various functions, characteristic data and the like may be stored in the disk 50 or the memory card 51 such as the semiconductor memory, and the information may be provided to the computer 40.

A program causes the computer 40 to execute a visual processing step of outputting a first gain signal having predetermined gain characteristics in response to an image signal that has been input, a gain limit step of limiting the first gain signal with a predetermined limit value that has been set and outputting the result as a second gain signal, and a correction step of correcting the image signal based on the second gain signal.

It is also possible to further execute a spatial processing step of performing a predetermined spatial processing on the image signal and outputting the processed signal, and for a first gain signal having gain characteristics based on the image signal and the processed signal to be output in the visual processing step.

A program also causes the computer 40 to execute a spatial processing step of performing a predetermined spatial processing on the image signal and outputting a processed signal, a visual processing step of outputting a gain signal having gain characteristics based on the image signal and the processed signal, and a correction step of correcting the grayscale of the image signal based on the gain signal.

In the visual processing step it is also possible to output a gain signal in which the band of the spatial frequency that can respond to the image signal has been limited.

It is also possible for the communication portion 47 to be provided with a reception portion for receiving the broadcast image data, and for encoded image data that have been transmitted or broadcast to be decoded by the reception portion and converted to image data that can be processed by the visual processing portion 1. Thus, by the CPU 41 executing the processing steps of the visual processing device 1' on the input image data, and displaying those data with the output portion 45, it is possible to achieve a digital television.

Here, the processing steps of the visual processing device 1' can be executed on a visual processing device that corrects an image signal that has been input and outputs the result, through a visual processing step of outputting a first gain signal having predetermined gain characteristics with respect to the image signal, a gain control step of correcting the first gain signal with a predetermined correction value that has been set and outputting a second gain signal, and a correction step of correcting the image signal based on the second gain signal.

Here, as the gain control step, it is possible to execute a step of increasing or reducing the difference between the ×1 signal and the gain signal with a predetermined correction value.

It is also possible to execute the gain control step by performing a step of interpolating or extrapolating the ×1 signal and the first gain signal with a predetermined value.

It is also possible to further execute a spatial processing step of performing predetermined spatial processing on the image signal and outputting the processed signal, and to execute a visual processing step of outputting a first gain signal having gain characteristics based on the image signal and the processed signal.

The above processing steps are consecutively performed by the CPU 41 according to a program stored in the ROM 42 or the memory portion 46. Here, the 2D LUT can be temporarily stored using the RAM 43.

The program can be adopted by devices that handle images, such as information processing devices, televisions, digital cameras, portable telephones, PDAs, and game machines. The program is stored on a memory device such as a memory, a hard disk, or a ROM in a device that is installed in or connected to the device for handling images, and causes a computer to execute visual processing such as contrast adjustment of the image. The program is made available through a storage medium such as a memory card 51 or a disk 50, or through a network.

It is also possible for the visual processing device to be installed in or connected to a device that handles moving images, and processes images by frame or by field.

Other Embodiments

With conventional contrast adjustment technologies (such as the technology of JP H4-150171A), R, G, and B video signals are input and the brightness of the half tone level is changed to adjust the visual brightness of the image within the dynamic range. In this case, the correction coefficient M is the ratio of the luminance signal Y before gamma conversion and after gamma conversion, and the brightness was adjusted by multiplying the correction coefficient M with each of the R, G, and B signals and outputting the result, without changing the balance of the ratio of the R, G, and B signals. This contrast adjustment technology had the problem that when the image signal is amplified and becomes saturated, the gradation of the grayscale also becomes saturated (a predetermined signal level is reached) and this causes grayscale distortion such as pseudo borders, which worsen the picture quality.

There is also the problem that since color saturation occurs in individual pixels, lowering the overall contrast of the image in order to inhibit grayscale or color saturation in some regions of the image weakens the contrast of the color signal and results in a lighter color. This problem can be solved by a display device that is provided with a visual processing device described in a foregoing embodiment, and an integrated circuit that includes the visual processing device.

In a separate contrast adjustment technology (such as the technology of JP 2001-275015A), a gain coefficient is chosen from only a flattened signal of the image, and the image signal and the gain coefficient are multiplied to adjust the brightness of the image.

This contrast adjustment technology had the problem that adjusting the settings to increase the gain in order to brighten dark areas of the image when the signal obtained by flattening the input image is small causes the output image to overflow and become saturated, and this worsens the picture quality. This problem can be solved by a display device that is provided with a visual processing device described in a foregoing embodiment, and an integrated circuit that includes the visual processing device.

With a contrast adjustment technology in which the RGB signals are separated into a luminance signal and color signals and the contrast of the color signals is adjusted in correspondence with the adjustment of the contrast of the luminance signal, there is the problem that the signal becomes saturated when the luminance signal and the color signals whose contrast has been adjusted are converted back to RGB signals, and this has the potential to cause color saturation. There also is the problem that the color balance of the RGB signals is disrupted when color saturation occurs, causing the color to change. These problems can be solved with a display device that is provided by a visual processing device described in a foregoing embodiment, and an integrated circuit that includes the visual processing device.

With image-capturing devices, people are often backlit in video that is captured outdoors during the day because there is no lighting such as dedicated video lights, and displaying this video unchanged on a display device or the like results in people's faces appearing black when reproduced. Accordingly, there exists the technology of adjusting the brightness so that the faces of people become an appropriate brightness (such as the technology of JP 2002-185771A).

With this technology, when the region of a person's face that has become dark in a backlit image is made brighter, the luminance of the background region, which is already bright, is increased as well, and thus the luminance is limited at the largest value in the range of the signal, saturating the grayscale. There was that problem that when the grayscale is saturated (the signal level is fixed at the maximum value), grayscale distortions such as pseudo-borders occur and lower the image quality. This problem can be solved by a display device that is provided with a visual processing device described in a foregoing embodiment, and an integrated circuit that includes the visual processing device.

It should be noted that the specific configuration of the invention is not limited to the foregoing embodiments, and various changes and modifications are possible in a range that does not depart from the gist of the invention.

The visual processing device, the display device, and the integrated circuit according to the invention allow precise contrast adjustment to be executed on images, and can be utilized as a display device provided for example in car navigation devices, portable devices, information processing devices, image-capturing devices, portable information devices, digital still cameras, and game machines, and as an output device such as a projector or a printer.

What is claimed is:

1. A visual processing device comprising:
    a spatial processing portion operable to perform a predetermined spatial processing on an inputted image signal using pixels surrounding a target pixel and output a processed signal; and
    an output signal creation portion operable to output, when the processed signal and the image signal are taken as inputs, an output signal whose value monotonically decreases with respect to the value of the processed signal according to monotonically decreasing characteristics, in the case where the value of the image signal is fixed at a predetermined level, wherein the output signal creation portion includes:
a visual processing portion operable to output a gain signal determined based on the processed signal and the image signal; and
a correction portion operable to correct the image signal based on the gain signal and output the corrected signal as an output signal, and
wherein the visual processing portion performs visual processing that prevents saturation of the output signal while enhancing the contrast in a local region by outputting the gain signal whose value monotonically decreases with respect to the value of the processed signal according to monotonically decreasing characteristics in the case where the value of the image signal is fixed at a predetermined level, and the gain signal whose value approaches 1 as the image signal approaches a maximum value.

2. The visual processing device according to claim 1, wherein the gain signal does not depend on the value of the processed signal, and uniformly approaches 1 as the image signal approaches a maximum value.

3. The visual processing device according to claim 1, wherein the image signal includes a luminance signal and a color signal; and
wherein the correction portion includes:
a first correction portion operable to correct the luminance signal based on the gain signal and output a corrected luminance signal; and
a second correction portion operable to correct the color signal based on the same gain signal as the first correction portion and output a corrected color signal.

4. The visual processing device according to claim 1, wherein the image signal includes three primary color signals; and
wherein the correction portion corrects each of the three primary color signals based on a common gain signal, and outputs three corrected primary color signals.

5. The visual processing device according to claim 1, further comprising:
a gain restriction portion operable to restrict the gain signal at a set restriction value and output the restricted signal as a modified gain signal,
wherein the correction portion corrects the image signal based on the modified gain signal.

6. The visual processing device according to claim 1, further comprising:
a gain correction portion operable to output a modified gain signal based on a set correction value, the modified gain signal being an interpolated value or an extrapolated value of the gain signal and 1;
wherein the correction portion corrects the image signal based on the modified gain signal.

7. The visual processing device according to claim 5, wherein the restriction value is based on the maximum value among the three primary color signals of the image signal.

8. The visual processing device according to claim 6, wherein the correction value is based on the maximum value among the three primary color signals of the image signal.

9. The visual processing device according to claim 5, wherein the restriction value is based on at least one of the average signal level detected from the image signal in a single frame or a single field, a degree of likeness to skin color detected from the image signal, program information added to the image signal that has been communicated or broadcast, and an electric field strength value when the broadcast or communicated image signal is received.

10. The visual processing device according to claim 6, wherein the correction value is based on at least one of the average signal level detected from the image signal in a single frame or a single field, a degree of likeness to skin color detected from the image signal, program information added to the image signal that has been communicated or broadcast, and an electric field strength value when the broadcast or communicated image signal is received.

11. An image display device comprising:
the visual processing device according to claim 1, and
a display portion operable to display the output signal from the visual processing device.

12. A television device comprising:
a receiving portion operable to receive a video signal;
a decoding portion operable to decode the video signal and output an image signal;
a spatial processing portion operable to perform a predetermined spatial processing on the image signal using pixels surrounding a target pixel and output a processed signal;
an output signal creation portion operable to output, when the processed signal and the image signal are taken as inputs, an output signal whose value monotonically decreases with respect to the value of the processed signal according to monotonically decreasing characteristics, in the case where the value of the image signal is fixed at a predetermined level; and
a display portion operable to display the output signal,
wherein the output signal creation portion includes:
a visual processing portion operable to output a gain signal determined based on the processed signal and the image signal; and
a correction portion operable to correct the image signal based on the gain signal and output the corrected signal as an output signal, and
wherein the visual processing portion performs visual processing that prevents saturation of the output signal while enhancing the contrast in a local region by outputting the gain signal whose value monotonically decreases with respect to the value of the processed signal according to monotonically decreasing characteristics in the case where the value of the image signal is fixed at a predetermined level, and the gain signal whose value approaches 1 as the image signal approaches a maximum value.

13. A mobile information terminal comprising:
a receiving portion operable to receive a video signal;
a decoding portion operable to decode the video signal and output an image signal;
a spatial processing portion operable to perform a predetermined spatial processing on the image signal using pixels surrounding a target pixel and output a processed signal;
an output signal creation portion operable to output, when the processed signal and the image signal are taken as inputs, an output signal whose value monotonically decreases with respect to the value of the processed signal according to monotonically decreasing characteristics, in the case where the value of the image signal is fixed at a predetermined level; and
a display portion operable to display the output signal, wherein the output signal creation portion includes:

a visual processing portion operable to output a gain signal determined based on the processed signal and the image signal; and a correction portion operable to correct the image signal based on the gain signal and output the corrected signal as an output signal, and wherein the visual processing portion performs visual processing that prevents saturation of the output signal while enhancing the contrast in a local region by outputting the gain signal whose value monotonically decreases with respect to the value of the processed signal according to monotonically decreasing characteristics in the case where the value of the image signal is fixed at a predetermined level, and the gain signal whose value approaches 1 as the image signal approaches a maximum value.

14. A camera comprising:

an imaging portion operable to capture an image and generate an image signal;

a spatial processing portion operable to perform a predetermined spatial processing on the image signal using pixels surrounding a target pixel and output a processed signal;

an output signal creation portion operable to output, when the processed signal and the image signal are taken as inputs, an output signal whose value monotonically decreases with respect to the value of the processed signal according to monotonically decreasing characteristics, in the case where the value of the image signal is fixed at a predetermined level; and a display portion operable to display the output signal, wherein the output signal creation portion includes:

a visual processing portion operable to output a gain signal determined based on the processed signal and the image signal; and a correction portion operable to correct the image signal based on the gain signal and output the corrected signal as an output signal, and wherein the visual processing portion performs visual processing that prevents saturation of the output signal while enhancing the contrast in a local region by outputting the gain signal whose value monotonically decreases with respect to the value of the processed signal according to monotonically decreasing characteristics in the case where the value of the image signal is fixed at a predetermined level, and the gain signal whose value approaches 1 as the image signal approaches a maximum value.

15. A visual processing method comprising:

performing a predetermined spatial processing on an inputted image signal using pixels surrounding a target pixel and outputting a processed signal; and when the processed signal and the image signal are taken as inputs, outputting an output signal whose value monotonically decreases with respect to the processed signal according to monotonically decreasing characteristics, in the case where the value of the image signal is fixed at a predetermined level, wherein the step of outputting the output signal includes:

outputting a gain signal determined based on the processed signal and the image signal; and correcting the image signal based on the gain signal and outputting the corrected signal as an output signal, and wherein the step of outputting the gain signal performs visual processing that prevents saturation of the output signal while enhancing the contrast in a local region by outputting the gain signal whose value monotonically decreases with respect to the value of the processed signal according to monotonically decreasing characteristics in the case where the value of the image signal is fixed at a predetermined level, and the gain signal whose value approaches 1 as the image signal approaches a maximum value.

16. An integrated circuit executing the visual processing method according to claim 15.

17. A storage medium storing an image processing program that executes the visual processing method according to claim 15.

* * * * *